Dec. 26, 1950     N. D. PRESTON ET AL     2,535,954
AIRWAY TRAFFIC CONTROLLING SYSTEM
Original Filed March 31, 1944     17 Sheets-Sheet 1
FIG. 1.     FLIGHT PROGRESS BOARD
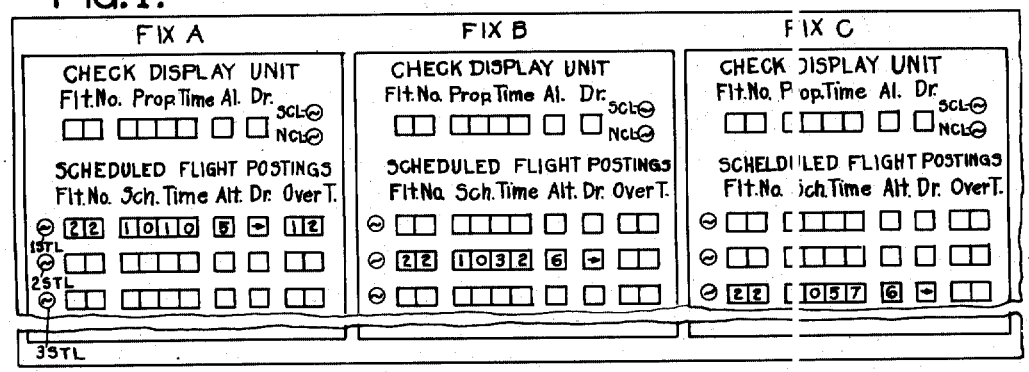
FIG. 2.     FLIGHT OPERATOR'S CONTROL BOARD
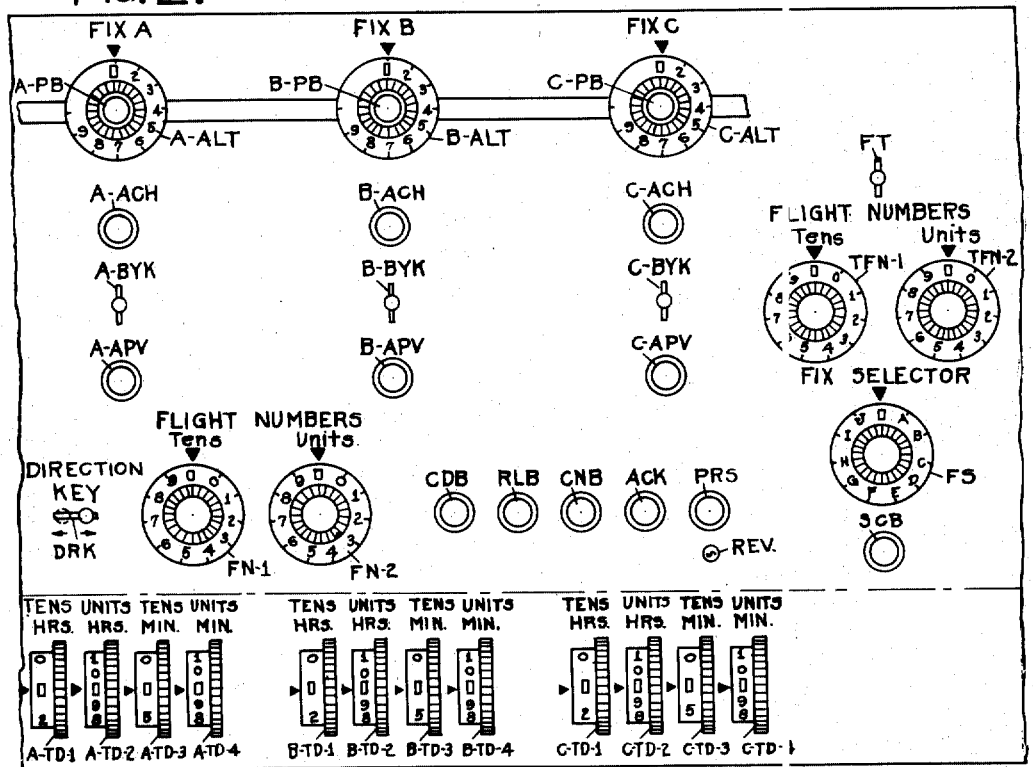
FIG. 1A.
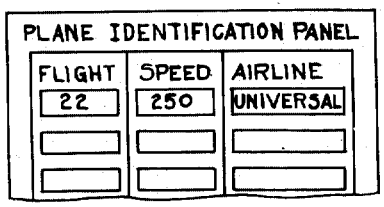
*INVENTORS*
N. D. Preston and F. B. Hitchcock
BY Neil D. Preston,
THEIR ATTORNEY.

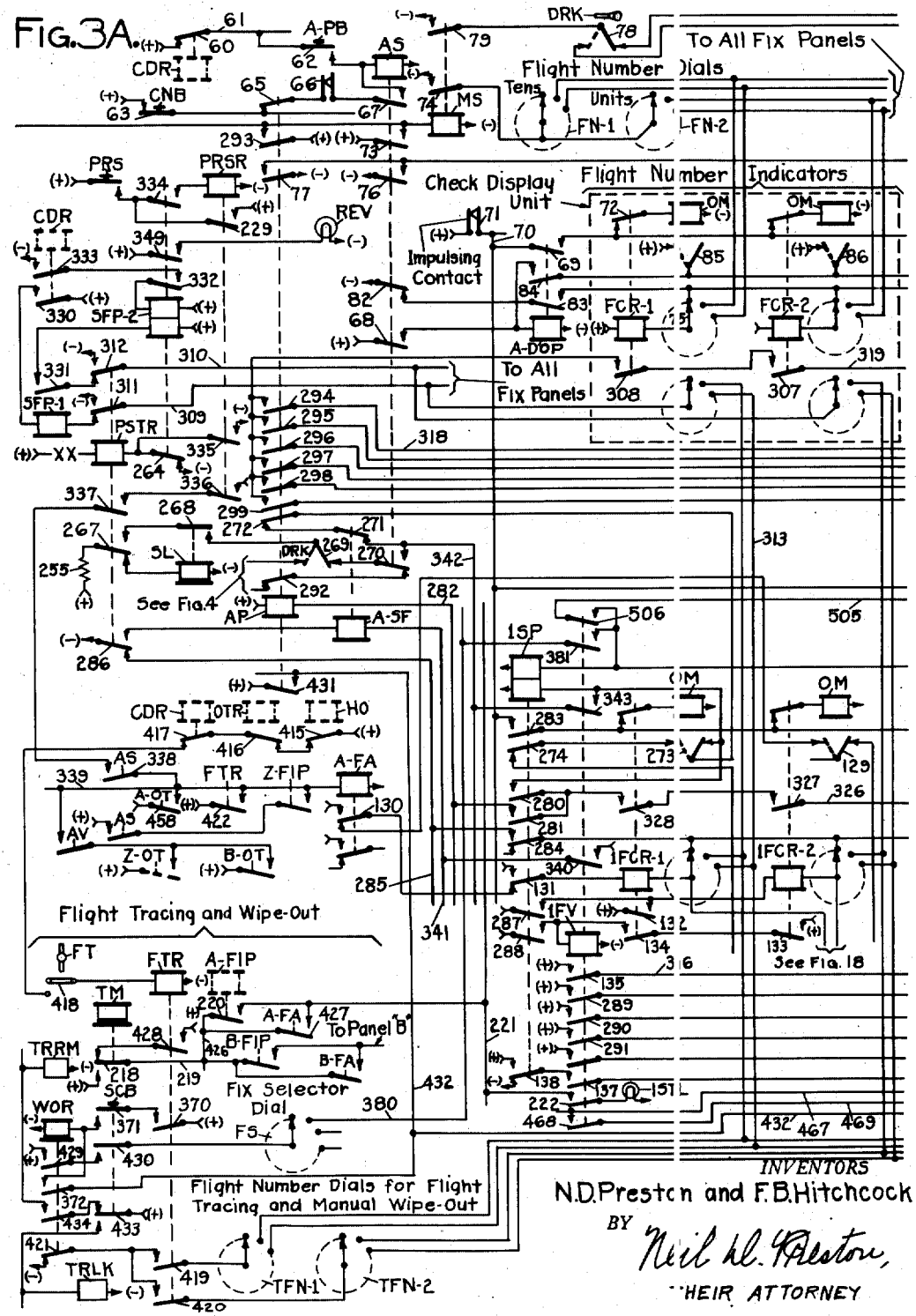

Dec. 26, 1950    N. D. PRESTON ET AL    2,535,954
AIRWAY TRAFFIC CONTROLLING SYSTEM
Original Filed March 31, 1944    17 Sheets-Sheet 5

INVENTORS
N.D.Preston and F.B.Hitchcock
BY
THEIR ATTORNEY

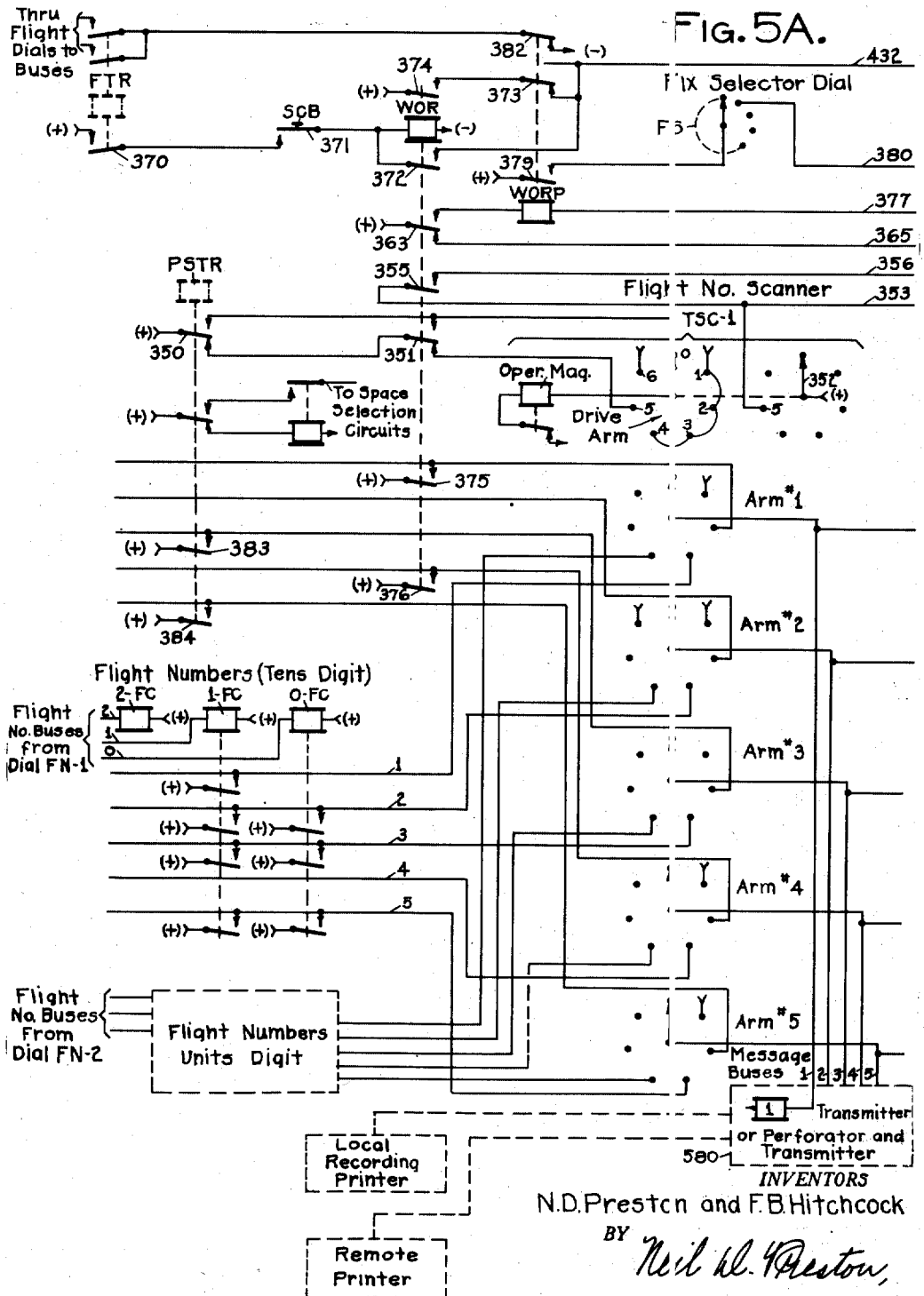

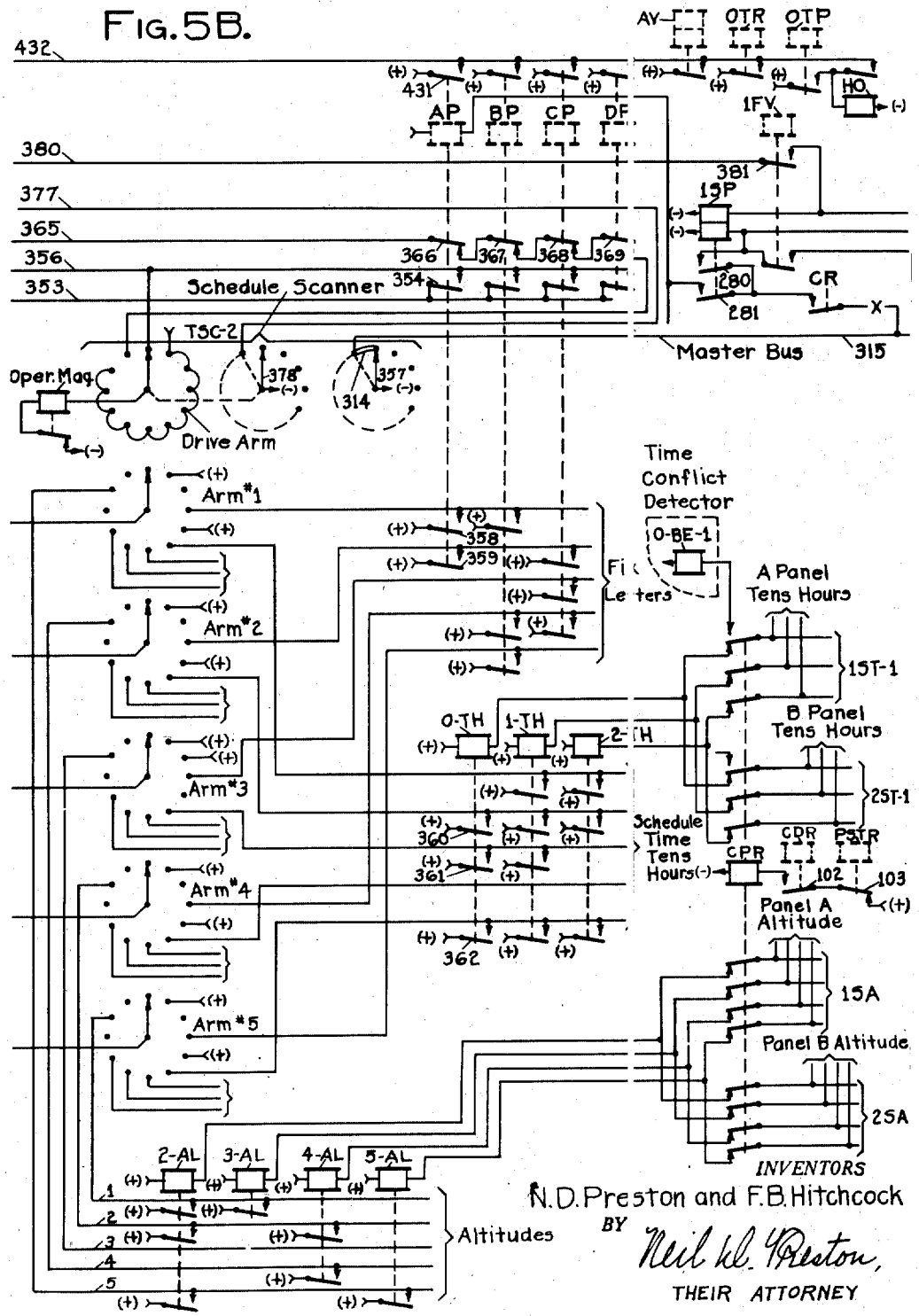

Dec. 26, 1950          N. D. PRESTON ET AL          2,535,954
                  AIRWAY TRAFFIC CONTROLLING SYSTEM
Original Filed March 31, 1944                17 Sheets-Sheet 8

INVENTORS
N.D. Preston and F.B. Hitchcock
BY
Neil D. Preston,
THEIR ATTORNEY

INVENTORS
N.D. Preston and F.B. Hitchcock
BY Neil D. Preston,
THEIR ATTORNEY

Dec. 26, 1950 N. D. PRESTON ET AL 2,535,954
AIRWAY TRAFFIC CONTROLLING SYSTEM
Original Filed March 31, 1944 17 Sheets-Sheet 10
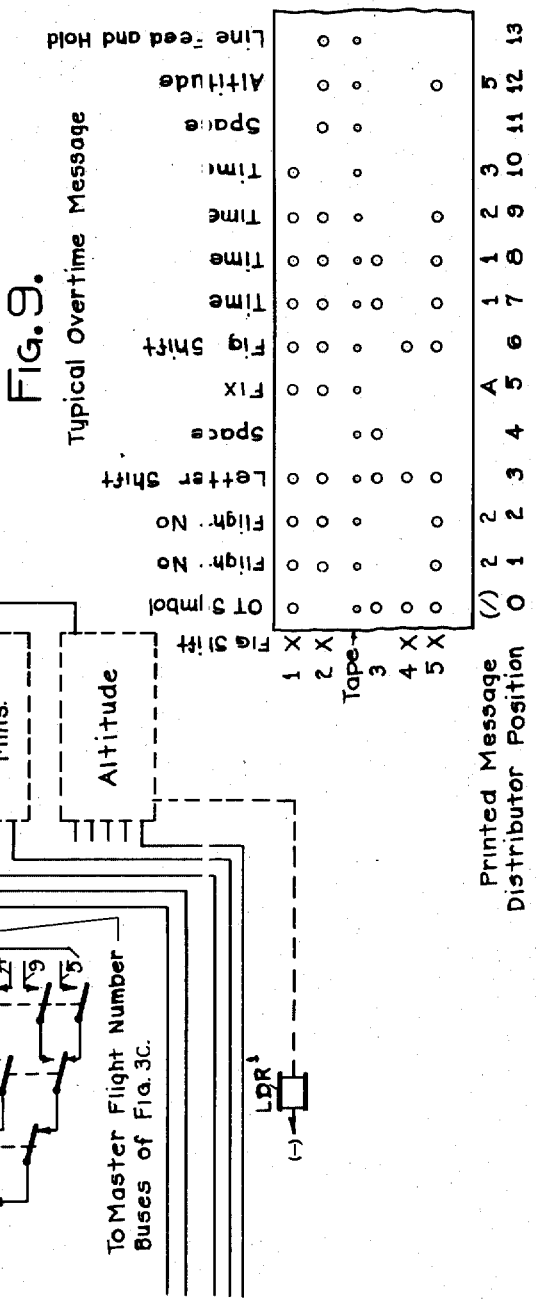
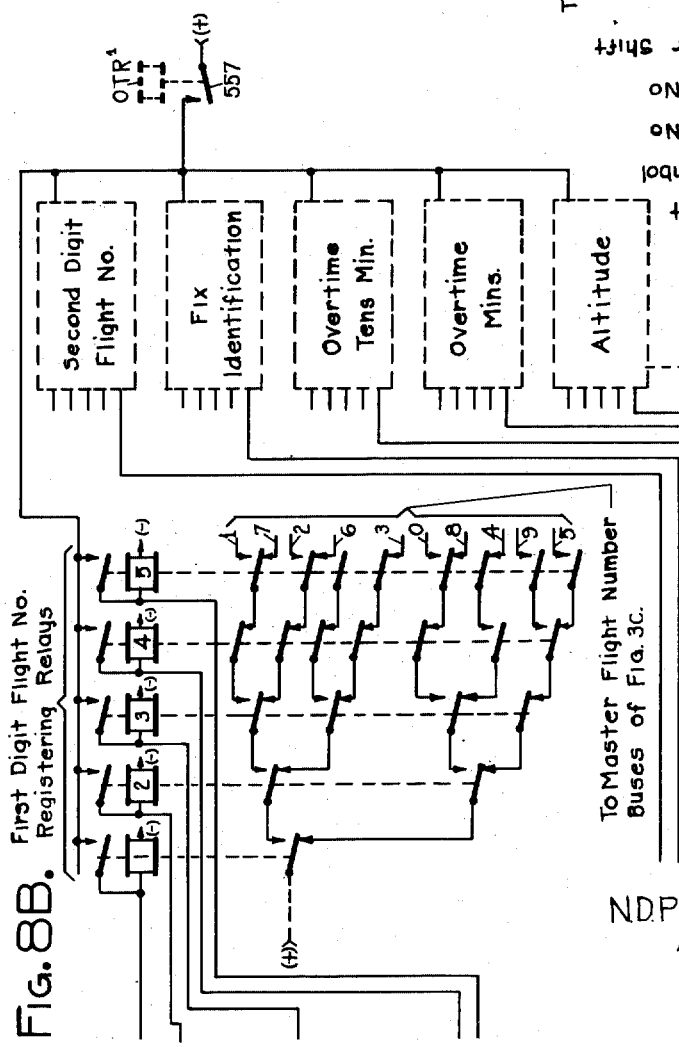
INVENTORS
N.D.Preston and F.B.Hitchcock
BY
*Neil D. Preston*
THEIR ATTORNEY Dec. 26, 1950  N. D. PRESTON ET AL  2,535,954
AIRWAY TRAFFIC CONTROLLING SYSTEM
Original Filed March 31, 1944  17 Sheets-Sheet 11

INVENTORS
N.D. Preston and F.B. Hitchcock
BY
Neil D. Preston,
THEIR ATTORNEY

Dec. 26, 1950 N. D. PRESTON ET AL 2,535,954
AIRWAY TRAFFIC CONTROLLING SYSTEM
Original Filed March 31, 1944 17 Sheets-Sheet 14

INVENTORS
N.D.Preston and F.B.Hitchcock
BY Neil W. Preston,
THEIR ATTORNEY

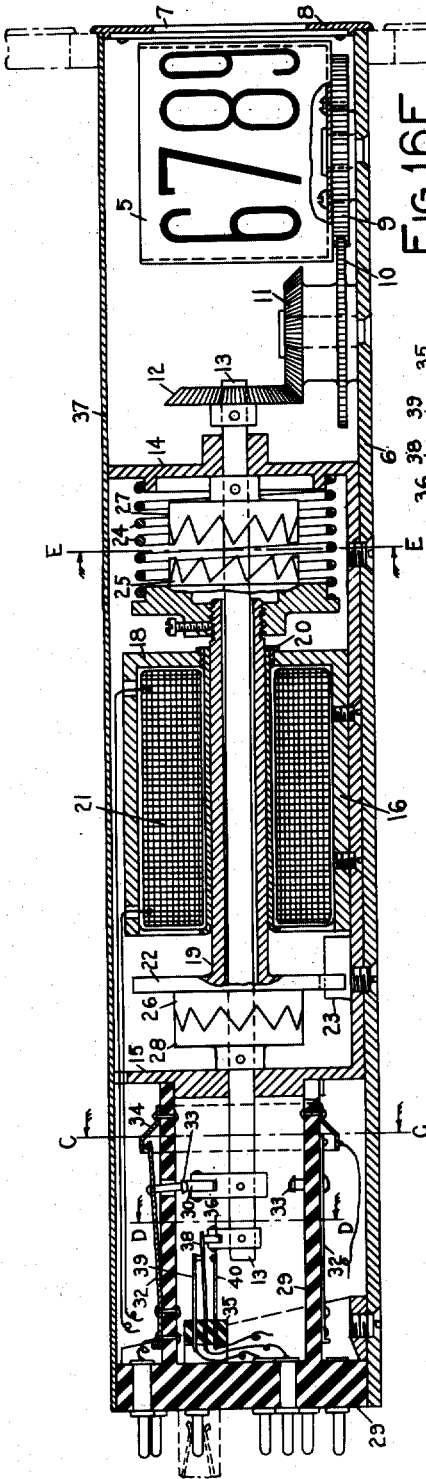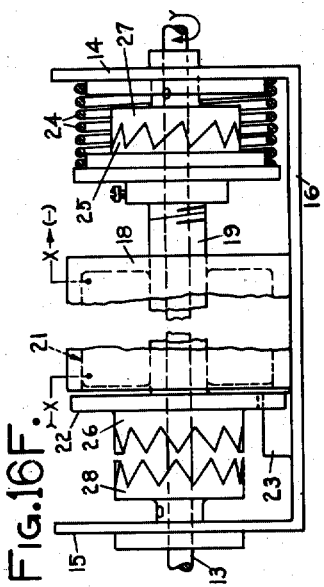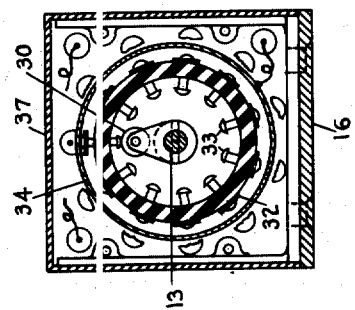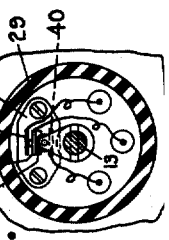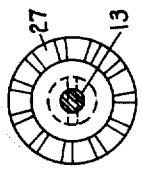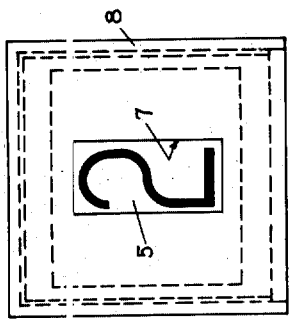

Patented Dec. 26, 1950

2,535,954

UNITED STATES PATENT OFFICE 2,535,954

AIRWAY TRAFFIC CONTROLLING SYSTEM

Neil D. Preston and Forest B. Hitchcock, Rochester, N. Y., assignors to General Railway Signal Company, Rochester, N. Y.

Original application March 31, 1944, Serial No. 528,926. Divided and this application January 16, 1946, Serial No. 641,588

54 Claims. (Cl. 177—353)

This invention relates to systems for controlling traffic on airways, and more particularly to an airway traffic control system for scheduling flights on airways defined by radio ranges and having established radio fixes or markers.

This application is a division of our copending application Ser. No. 528,926 filed March 31, 1944, now Pat. No. 2,439,862, dated April 29, 1948.

In connection with this invention, it is assumed that every plane operating on the regular airways (except at certain excluded low altitudes) will be required to have a suitable authorization or clearance from a traffic control center to fly at allocated altitudes between designated fixes at certain scheduled times, and that the progress of each flight will be shown by communicating with the control center in some suitable manner, the usual form of overtime report giving the identification of such plane and its time and altitude as it arrives at or passes over each of the fixes in its route.

The primary object of this invention is to provide a system for facilitating and safeguarding the scheduling of flights and issuance of clearances, in order to permit prompt, accurate and complete advance planning of flight schedules so as to avoid congestion at terminals and the like and to maintain a suitable time or space separation between flights in the interests of safety.

Considering generally the contemplated organization and plan of operation of the system embodying this invention, and without attempting to define the nature and scope of the invention, it is proposed to provide a flight progress board in the traffic control center on which electrically operable changeable indicators may be set by suitable manual and automatic control so as to display the desired data of flight identification, estimated time, altitude, direction and the like for flight schedules which have been authorized by issuance of suitable clearances, the data of such scheduled flights as it is posted on this flight progress board being kept up to date and changed to show the progress of each flight by operating time indicators to display the overtime as reported for each fix and also automatically wiping out the entire posting belonging to the flight in question for the next fix in the rear.

It is proposed to provide for use with such a flight progress board suitable manual or automatic control means for setting up and displaying, preferably in check display units associated with the respective fix panels of the flight progress board, the data for a proposed or tentative flight plan or schedule, including an estimated time of arrival of this flight at the established fixes in the proposed route as determined in a suitable manner by manual or automatic calculation. Before such tentative or proposed flight schedule is approved and posted on the flight progress board, the estimated time and altitude as proposed for each fix in the route has to be visually or automatically checked against the times and altitudes posted for all of the prior scheduled flights in such a manner as to detect any conflict in time and altitude at these fixes, and also for each interval between such fixes, thereby determining that there is sufficient space or time separation between the proposed flight at all points of its route and all prior scheduled flights to prevent collisions if the authorized schedules are maintained. Although such features of conflict detection may be effected by automatic means as disclosed and claimed in the above mentioned parent application, it is thought expedient to simplify the present disclosure by omitting the details of the automatic conflict detecting means. For this reason, the features of conflict detection will be explained only in a general way in this divisional case.

When a proposed flight schedule has been set up, and checked in this manner for time and altitude conflict and is found to be acceptable, such schedule is communicated to the pilot to constitute his authorization to fly at the altitudes and times specified. While such schedule or clearance may be communicated to the pilot and verified in any desired manner, it is proposed to provide as part of this system automatic means for converting the data of the proposed flight schedule as approved into a Teletype code during the operation of posting this data on the flight progress board, and for utilizing such code to transmit Teletype messages over line facilities to any desired point for communication to the pilot by radio or the like, and also to operate a local printer for the purpose of making a printed record of each flight schedule.

It is also proposed to provide for checking such communication of each approved flight plan or schedule to the pilot by having him report back to the control center by radio, telephone, or Teletype facilities the complete schedule as he has it before him, and by checking such schedule as reported by the pilot against the settings of the indicators on the flight progress board to detect any discrepancies due to errors in communication, to thereby verify that all of the altitudes and times for the fixes in the schedule to be used by the pilot exactly conform with what is set up on the flight progress board and to what is used as a basis for detecting conflict with other flight schedules.

This feature of checking flight plans or schedules is not disclosed in this application, since it is being disclosed and claimed in another divisional application, Ser. No. 703,764, filed October 17, 1946, now Patent No. 2,481,239, September 6, 1949. This flight verification feature is herein mentioned merely to indicate the scope of a complete system embodying the present invention.

The proposed system also includes provisions for revising or cancelling flight schedules in whole or in part, for distinctly identifying the postings on the flight progress board relating to any particular flight so as to trace the route or schedule of that flight, and for automatically posting the overtimes and performing the wipe-out function in the rear in response to Teletype codes, together with various other auxiliary features designed to speed up and facilitate the automatic and the manual operations of the system.

An important characteristic of the system of this invention as a whole is that all of the parts and circuits have been specially arranged and organized to provide for positive actuation of the changeable indicators and other movable elements in the system in response to the energization of circuits and in accordance with the principle of failure on the side of safety, so that any bad contact, broken wire, or other circuit failure will be at once manifested by an abnormal operation of the system, whereby no false posting or like dangerous condition can occur due to apparatus failures and remain unknown to the flight controller or other responsible person at the traffic control center. For example, each changeable indicator is operated to the indicating position called for by the closure and energization of a circuit characteristic of that position; and if the indicator should fail to move, or should fail to stop in the proper position on account of a bad contact or broken wire, the posting operation then in progress ceases, and there is an abnormal stalling of the system at once manifesting the apparatus failure. Similarly, the time and altitude automatic conflict detecting means (disclosed in the parent application referred to above) has been organized so as to cause the energization of relays only if certain circuits are intact and no conflict exists, rather than close the circuits when there is a condition of conflict; and hence a bad contact or a broken wire does not create a false and dangerous condition, but rather a condition of failure on the side of safety.

Other attributes, operating characteristics, and advantages of the system of this invention will be in part apparent, and in part pointed out as the description progresses.

In describing the invention in detail, reference will be made to the accompanying drawings, in which similar letter reference characters are used to designate similar parts throughout the various figures, in which like letter reference characters have been made generally distinctive by the use of distinctive preceding or succeeding numerals, and in which:

Fig. 1 illustrates a flight progress board organized in accordance with the present invention for displaying proposed and scheduled flight data by the setting of changeable indicators;

Fig. 1A illustrates the organization of a plane identification panel;

Fig. 2 illustrates a flight operator's control board having manually positioned dials, buttons and keys as well as the setting dials of a calculator;

Figs. 3A, 3B, 3C illustrate the schedule and overtime posting circuits for controlling the changeable indicators of a typical panel included in the flight progress board;

Figs. 5A and 5B illustrate the apparatus and circuits employed for converting the data of a scheduled flight into Teletype code for operation of a local Teletype printer for record purposes and for operation of a remote Teletype printer for communication with a pilot or intermediate radio operator;

Fig. 6 shows in diagrammatic and table form a typical schedule clearance message produced by the schedule code transmitter of Figs. 5A and 5B;

Fig. 7 shows in a diagrammatic and table form a typical schedule wipe-out message produced by the schedule code transmitter of Figs. 5A and 5B;

Figs. 8A and 8B illustrate the apparatus and circuits employed for automatically posting overtime reports as received over Teletype line facilities;

Fig. 9 shows in diagrammatic and table form a typical overtime message received over the Teletype facilities and used in automatic overtime posting in connection with Figs. 8A and 8B;

Figs. 16A to 16F illustrate the structure of a changeable indicator as proposed for use in connection with the system of the present invention;

Figure 3B:
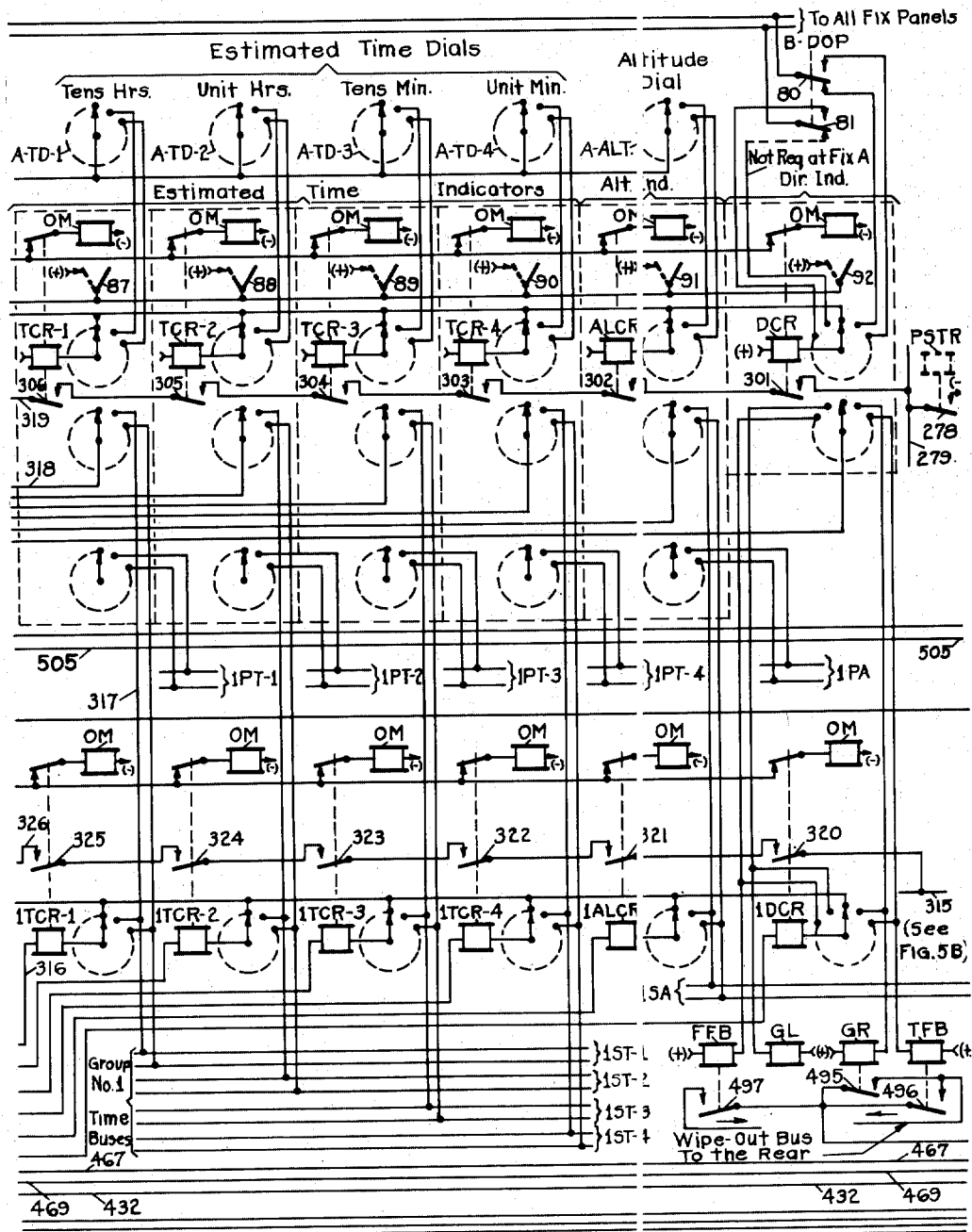

In order to facilitate an understanding of the operation of the system, and as a matter of convenience in illustrating a specific embodiment of the invention in the accompanying drawings, the relays and circuits particularly relating to the different functions or steps in the operation of the system have been shown separately by themselves in the different figures, and the association and interconnection between these different groups of circuit drawings are indicated by diagrams and use of like reference characters. Also, the relays, scanners, and various other component devices of the system have been illustrated in a diagrammatic or conventional manner in the drawings, the contacts of relays in some instances being shown at different places than the operating coils or windings. Likewise, arrows with the symbols (+) or (—) are used to indicate connections to opposite terminals of a suitable battery or other convenient source of operating current.

In connection with the nomenclature used in the description of the system of this invention, it will be noted that like letters will be employed to denote apparatus of similar functions and that preceding numerals in general will designate the registration space of a fix panel with which such apparatus is associated while a following or succeeding numeral will designate the digit or element of that space. Also, for facilitating an understanding of the system, the letters A, B and C are respectively assigned to three successive fixes of an airway and the use of these letters preceding a reference character denotes that the associated device belongs to the fix designated by such preceding letter. There are of course certain exceptions to this general organization of reference character assignments in order to maintain simplicity in the use of reference characters for such a complex system.

GENERAL ORGANIZATION OF THE SYSTEM

Figure 17:
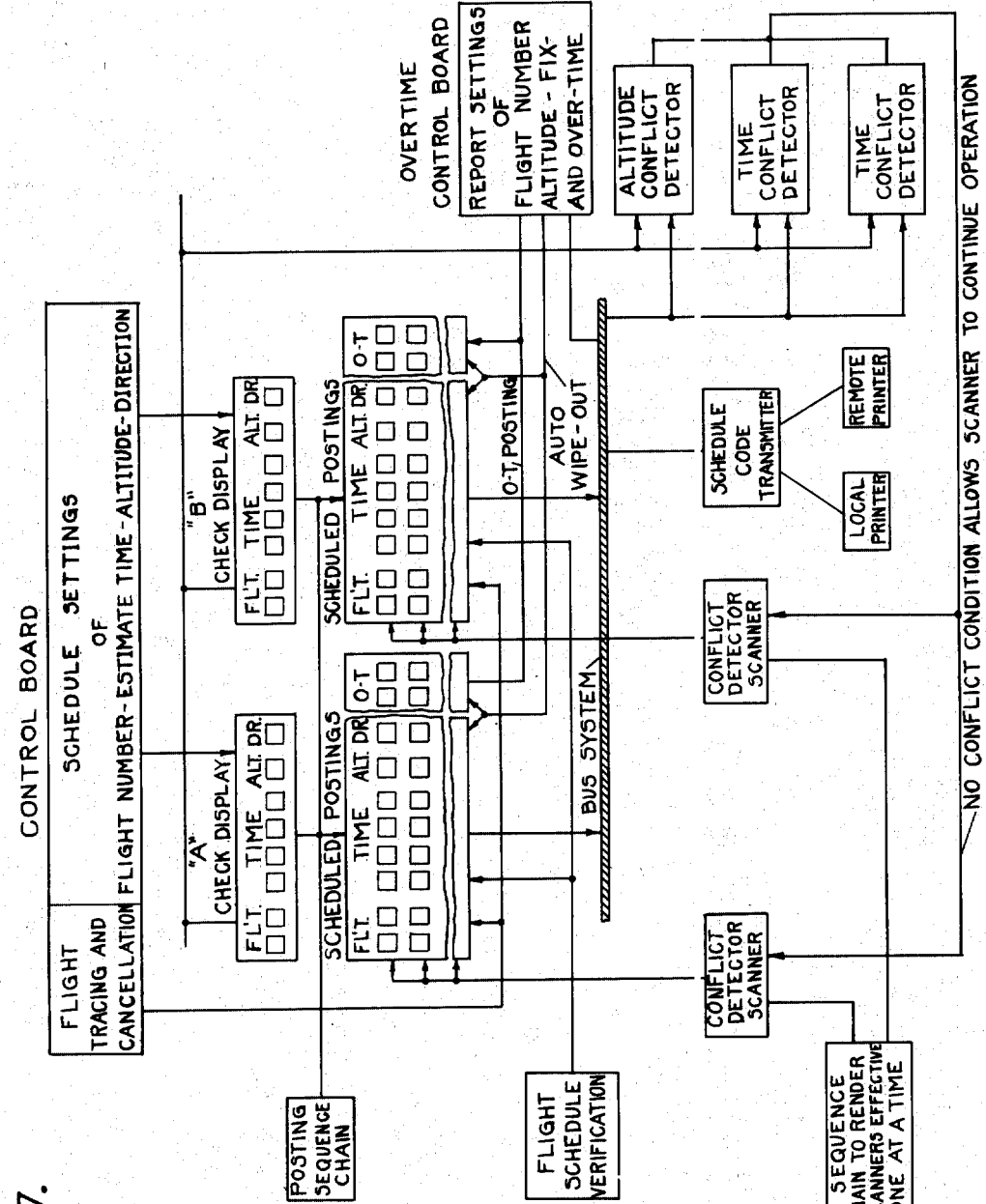
Fig. 17 shows a diagram of the system organization, the lines of this diagram merely indicating functional interrelations rather than any actual circuits.

Before considering in detail the contemplated operation of the system and describing typical examples of such operation, it would appear to be expedient to indicate some of the more significant component parts and make a brief survey of the general organization of the system diagrammatically illustrated in Fig. 17.

*Flight progress board.*—The flight progress board may be said to be the predominant element of the system and the one with which the other component parts are operatively associated. For the purpose of simplifying the drawings, the invention has been shown applied to a small portion or sector of one airway comprising radio fixes or markers conveniently identified by letters A, B and C; but it should be understood that the invention may be applied to any desired number of fixes and to various arrangements of airways as will be discussed more in detail later.

The flight progress board comprises a plurality of fix panels, one for each fix; and Fig. 1 illustrates such panels for the three fixes A, B, and C of the simplified airway layout assumed. Each of these fix panels comprises a schedule posting portion, and a group of changeable indicators for proposed flight plans, conveniently termed check display units. The posting portion of the fix panel comprises a number of horizontal rows or tiers of electrically operable changeable indicators, the number of rows depending upon the density of traffic and the maximum number of flight schedule postings required at any given time. The check display unit for each fix panel comprises a single row of similar changeable indicators.

The changeable indicators in each horizontal row or registration space in a fix panel are operated electrically by manual or automatic remote control from a normal blank position to selected indicating positions to display the desired letter or figure to represent the significant data for a flight plan or schedule. As illustrated, the flight data in a posting space comprises: (a) flight identification by numbers, or combinations of letters and numbers, shown for two digits only; (b) estimated scheduled time at the fix in question provided by four indicators to give the time on a twenty-four hour clock basis; (c) the altitude allocated to the flight at the fix shown by one indicator; (d) the direction of movement of the flight with respect to the arrangement of the fix panels shown by one indicator exhibiting an arrow symbol or equivalent; and (e) arrival or overtime at the fix in question as reported by the pilot and indicated by two indicators in minutes and tens of minutes. It is to be understood that four digits of overtime could be provided if desired.

The check display unit includes the same type of indicators, and for the same data groups except for overtime; and the indicators for the flight number, and for the time and altitude are preferably arranged in the same vertical column with corresponding indicators in the schedule posting portion of the fix panel. The various vertical columns of indicators are identified by suitable markings on the panel.

It is contemplated that a suitable plane identification panel such as shown in Fig. 1A, will be associated with the flight progress board to display on removable display cards, or by suitable remotely controlled changeable indicators, the cruising speed, the airline, type of plane, personnel and other desired pertinent data relating to the particular flight to which a given flight number as used on the flight progress board has been arbitrarily assigned. In other words, it is contemplated that the flight identifying number appearing in the postings of flight schedules will not be the complete registration number of a plane, but some number chosen to designate a flight having a schedule; and the complete registration number of the plane, name of pilot, cruising speed and any other desired item of information is obtained by referring to the plane identification panel. This proposed arrangement is, of course, optional but serves to reduce the number of indicators required on the flight progress board to represent all of the desired information with respect to the flights, more particularly it removes the cruising speeds from the flight progress board. In selecting the flight numbers to be assigned to the different flights, it is assumed that the flight operators for different control areas will cooperate to use like numbers for regularly scheduled flights passing through a plurality of control areas.

*Changeable indicators.*—Various types of indicators may be used in the circuit organization constituting this invention, such as disclosed for example, in the application of O. S. Field and S. N. Wight, Serial No. 489,776, filed June 5, 1943, now Patent No. 2,378,294, dated June 12, 1945, in which the indicating drum and position contacts of each unit are operated from a driven shaft by energization of an electro-magnetic clutch. Another form of self-propelled indicator unit, the same as shown in our copending application, Serial No. 617,504, filed September 20, 1945, now Patent No. 2,481,730, September 12, 1949, is illustrated in Figs. 16A to 16F, and comprises an indicator drum 5 (see Fig. 16A) mounted to turn on a vertical axis supported in the lower frame member 6 of the indicator unit. The numbers, letters, or other desired symbols on the periphery of this drum are exhibited in its different positions through the opening 7 in a suitable mask 8 forming the face plate of the indicator unit (see Figs. 16A and 16B). The indicator drum 5 is connected by spur gears 9 and 10, and also bevel gears 11 and 12 to an operating shaft 13 extending longitudinally of the unit and supported on bearings in the end members 14 and 15 of the operating element 16 secured to the base member 6 by screws or the like.

The self-propelling driving mechanism or operating element 16 for turning the shaft 13 and the indicator drum 5 to the different positions comprises an operating magnet or solenoid 18 having its core 19 mounted loosely on the driving shaft 13, and supported in a suitable non-magnetic sleeve 20 is the coil or winding 21. The armature 22 at one end of the core is guided by a fixed stop 23 in a notch in said armature, or in a similar manner, so that the armature and core are prevented from turning. The armature and core are biased in one direction, toward the left as shown, by a coil spring 24. Toothed discs 25 and 26 fastened to the ends of the armature-core 19 cooperate with toothed collars 27 and 28 respectively, which collars are fixed to the driving shaft 13, in such a manner that the energization and deenergization of the solenoid and reciprocation of the armature-core will drive the shaft 13 step by step and move the indicator drum 5 to its different active positions.

Figs. 16A, 16E and 16F illustrate one arrangement of teeth suitable for this purpose, assuming the indicator to have ten active positions and a blank position; and the cooperating discs 25 and 26 with their respective collars 27 and 28 formed with eleven teeth and eleven spaces so that each energization and subsequent deenergization of the solenoid will move the indicator drum 1/11 part of a revolution from one indicating position to the next. The parts are shown in the normally deenergized position of the solenoid in Fig. 16A with the disc 26 on the core cooperating with the collar 28 to hold the indicator in its then existing position. Upon energization of the solenoid and movement of the core toward the right, the teeth on the disc 25 engage the teeth on the collar 27 to turn the shaft through an angle sufficient to bring the points of the teeth on the collar 28 beyond the points of the teeth on the disc 26 in the direction of rotation as shown in Fig. 16F. Thus, upon deenergization of the solenoid and movement of the armature core to the left by the spring 24, the toothed disc 26 cooperates with the collar 28 to shift the shaft 13 through an additional angle sufficient to bring the indicator to its next active position.

With reference to Fig. 16A it will be seen that the toothed disc 26 and the toothed collar 28 have teeth which are exact counterparts of each other and each tooth has the same angle of slope on both sides. On the other hand, it will be seen from Figs. 16A and 16F that the toothed disc 25 and the toothed collar 27 have teeth which evenly engage each other, but the angle slope on one side of a tooth is different than the angle of slope on the other side. This angle is suitably chosen so as to cause the off-setting of the teeth points of 25 and 27 as shown in Fig. 16A while the solenoid is deenergized, and so as to cause the off-setting of teeth points of 26 and 28 as shown in Fig. 16F while the solenoid is energized and the armature core is moved to the right against the bias of spring 24. Fig. 16E is a section taken on lines E—E of Fig. 16A looking in the direction of the arrows with certain parts removed and shows the off-setting of the base of the teeth with respect to their points. The purpose of this difference in slope on the opposite sides of the teeth for the right-hand end of the driving mechanism is to give an inherent direction of rotation to the mechanism.

The indicator unit is provided with one or more sets of position contacts, and empty-full contacts opened and closed as the indicator is moved out of its blank position. The position contacts are preferably of the same type disclosed in the Field and Wight application Serial No. 489,776 (Patent No. 2,378,294) above mentioned, comprising contact fingers arranged in the form of a barrel and supported by an insulated member 29 and operated from the inside by a roller 30 connected to the driving shaft 13. The empty-full contacts may also be supported on the same insulated member 29 and operated by another roller 36.

With reference to Fig. 16A and Fig. 16C it will be seen that the contact fingers 32 are located around the barrel portion of the support member 29 which is made of insulating material. Each of these fingers 32 is provided with a pusher arm 33 which is engaged by the roller 30 to move its respective finger. Normally, these fingers 32 rest against the barrel portion of support member 29 but when the pusher of a finger is engaged by the roller 30, that finger is pushed outwardly to cause its contact point at the end of the finger to engage a circular ring 34 to make contact for the particular position then assumed by the indicator. Fig. 16C is a sectional view taken on lines C—C of Fig. 16A and from these two figures it can be seen that each contact finger is to be connected to a separate plug member mounted on the support member 29, and similarly the circular ringer 34 is also connected to a plug member.

The empty-full contacts are supported on a bracket 35 mounted on the support member 29 and the center movable contact 38 is actuated by a separate roller 36 to a position to contact the upper empty contact 39 while the indicator is standing in the blank position illustrated in Figs. 16A and 16C. When the indicator assumes any other position, the center movable contact 38 is released by the roller 36 and it assumes a back point position for contacting the full contact 40. The Fig. 16D is a section taken on lines D—D of Fig. 16A to show an end view of the empty-full contact arrangement. Each of the three empty-full contacts 38, 39 and 40 is suitably connected to a plug member mounted on the support member 29.

It is noted that the base 6 of the indicator unit provides supporting means for the display drum 5, the gear wheels the drive mechanism 16, and the contact support barrel 29. A cover 37 to which is attached the mask 8 fits over the indicator unit and completely encloses it on the top and both sides, in such a way that the operating mechanism and contact structure are completely enclosed in dust-proof compartments in spite of the fact that the opening 7 does not have a transparent insert. Such a transparent insert may of course be provided if desired, but it is contemplated that the display drum 5 shall be illuminated from an external light source the intensity of which may be readily controlled, and transparent inserts are omitted to avoid any possible trouble that might be caused by reflection.

The indicator units for the various rows or spaces of the panel are supported on a suitable frame or mounting structure providing in effect cells into which the indicator units may be inserted; and each indicator unit is preferably made quickly detachable as a whole for repair or replacement purposes by employing a plug coupler of suitable construction and shown in a diagrammatic manner in Fig. 16A to connect the wires of the indicator units with the external buses and wires of the system.

The same general type of indicator unit is employed for the registration or posting spaces and for the check display units in the fix panels of the flight progress board, and are also employed in the specific embodiment of the invention illustrated as part of the automatic time conflict detector.

For the purposes of the present disclosure, each indicator structure is considered to have eleven positions as above described, with a display drum bearing the particular data which that indicator is to display. But it is characteristic of all indicator display drums that they have a blank normal position.

The flight number display drums are provided with the numerals 0 to 9 in their operated positions, and this is also true of the unit minutes and unit hours schedule time, as well as over-time unit minutes.

The display drums for the tens of minutes schedule time and the over-time tens of minutes have the numerals 0 to 5, while the tens of hours schedule time have only the numerals 0, 1 and 2.

In the case of the altitude display drums, the numerals 2 to 11 are used, and thus a single indicator can display the levels or altitudes most commonly used for commercial transport purposes. But it is to be understood that two indicators can be used for each space of a posting panel to display the altitude on the basis of units and tens, if a greater number of altitudes than ten is desired.

The direction indicator display drums each have four arrows, two for one direction and two for the opposite direction; and for convenience in the disclosure, these arrows pointing to the right are assumed to be next adjacent the blank position in the direction of rotation of the drums, while the arrows pointing to the left are assumed to be in the last two operated positions.

These various indicators, which have vacant positions, have bus and circuit connections to their contacts only for those positions that are used, while the vacant positions are merely left disconnected and idle. Because of the control provided for the various indicators, these indicators having vacant positions automatically pass by such positions just as if they were not there, which will of course be better understood as the description progresses.

*Flight controller board.*—Fig. 2 illustrates schematically the elements for one specific arrangement of a suitable control board or panel to be used by the flight controller or operator in connection with setting up a tentative or proposed flight schedule. Such a proposed flight schedule comprises the flight number, direction and altitude allocated for each established fix in a proposed route, together with the estimated arrival time at these fixes. In the arrangement illustrated, the fixes involved in the proposed route are designated by actuation of fix identification push buttons A—PB, B—PB, etc., preferably located at points on a geographic layout or diagram of the airways corresponding with the location of such fixes. Each fix identification button A—PB, etc., is provided with certain contacts shown conventionally in the circuit diagram for restoration purposes later described, which are opened when the button is pulled out. The altitude allocated to the proposed flight at each fix is determined by positioning an altitude dial on the airway diagram, which as illustrated may be conveniently arranged around the fix identification push button. The flight number is set up on suitable master setting dials FN—1 and FN—2; and the direction is selected by shifting a direction key DRK to the right or left.

The estimated arrival time at the fixes, using the known cruising or air speed for the plane in question and correction factors for wind direction and velocity to obtain the effective ground speed, together with such other time correction factors as may be desired, may be determined in any desired manner, and set up as four digits of a time on time setting dials TD—1, TD—2, TD—3 and TD—4 for each of the fix panels and having the legend of "Estimate Time Dials" in Fig. 2. These estimated times for the different fixes may be prepared by assistant controllers using any suitable calculating equipment to facilitate their calculation and accumulation of time intervals to be added to the proposed base time to obtain such time estimates. The system of this invention is also equipped to be used with any form of automatic or semi-automatic calculator, such as disclosed in our application Ser. No. 537,312, filed May 25, 1944, now Patent No. 2,484,462, October 11, 1949, or the prior application of Wight and Field Ser. No. 470, 018, filed December 24, 1942, now Pat. 2,459,399 dated January 18, 1949.

The flight controller's board also includes other manually operable flight number setting dials and a fix selecting dial for flight tracing and cancellation, and a number of spring-return push buttons and stay-where-put operating keys, some relating separately to the individual fix panels. The purposes and functions of these various manually operable buttons and keys are more conveniently described later in describing the various features of the operation.

*Structure of setting dials.*—The various setting dials for flight number, altitude, fix selection, and estimate time have been shown as having normal blank positions to which they are automatically restored at the end of each posting operation. This assures that the operator must set all dials required for a proposed flight schedule in order to have such proposed schedule properly set up in the check display and in no case can a dial be accidentally or inadvertently left in a prior position.

Figure 12:
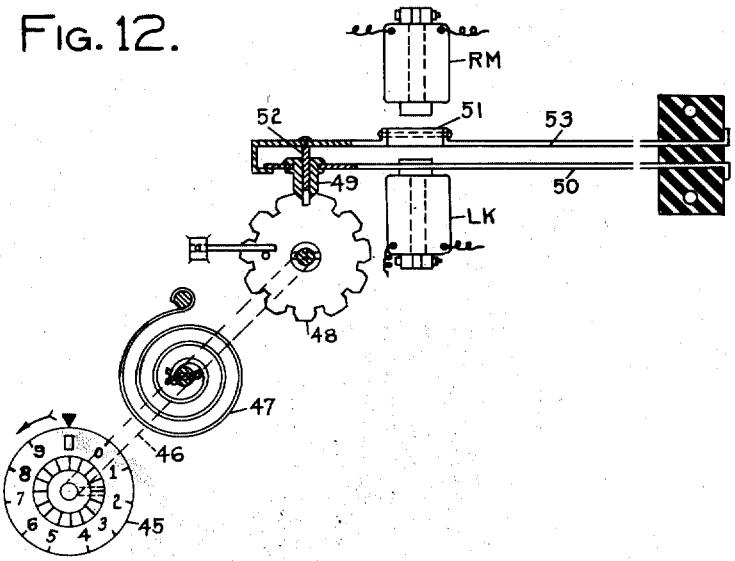
Fig. 12 illustrates the structural organization of the self-restoring dials proposed to be employed on the control board in accordance with the present invention.
Figure 13:
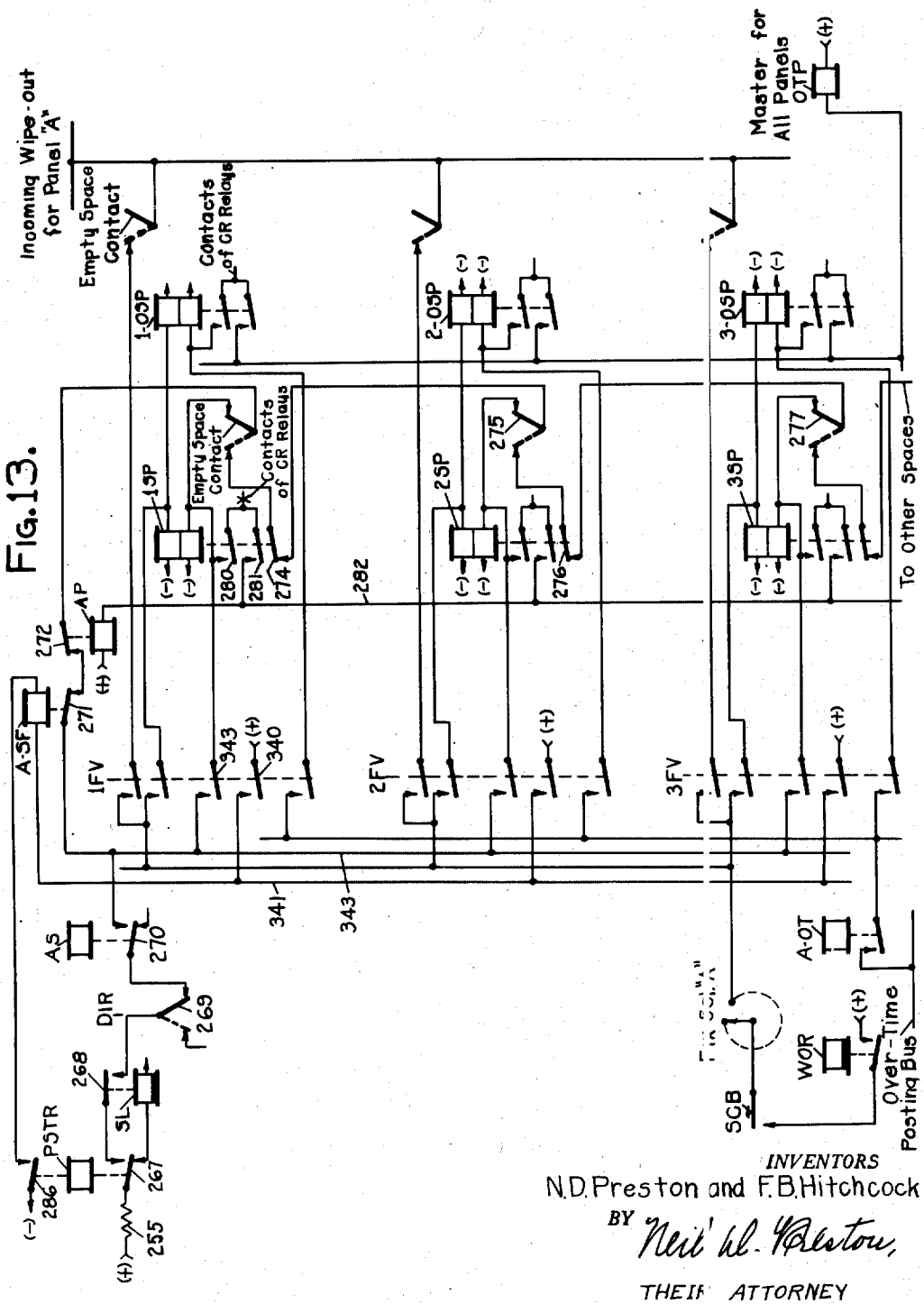
Fig. 13 illustrates in simplified form the circuits for a plurality of registration spaces of a fix panel to show more clearly the manner of vacant space selection employed in Figs. 3A, 3B and 3C.

These various dials may be made self-restoring and constructed in any suitable manner to accomplish the desired results, but for the purpose of the present disclosure one specific structure of a typical flight number setting dial has been disclosed in Fig. 12. The setting dial 45 is connected to a shaft 46 upon which a restoring spring 47 is attached so as to cause the dial 45 to be biased in a clockwise direction, while it may be set to the desired position by rotating it in a counter-clockwise direction. Also on this shaft 46 is a notched lock wheel 48 having the same number of notches that the dial 45 has positions. The outer portion of these notches are rounded or countersunk so as to be engaged by a round faced detent 49 which is held in position by spring 50 and thus provides that the setting dial 45 will remain in any position to which it is actuated in spite of the spring 47, but still may be actuated relatively easily to any desired position. Also, mounted on shaft 46 is one or more sets of contacts (not shown in Fig. 12) for controlling the energization of buses and the like, as diagrammatically illustrated in Figs. 3A, 3B and 3C for the flight number dials, for example.

Figure 4:
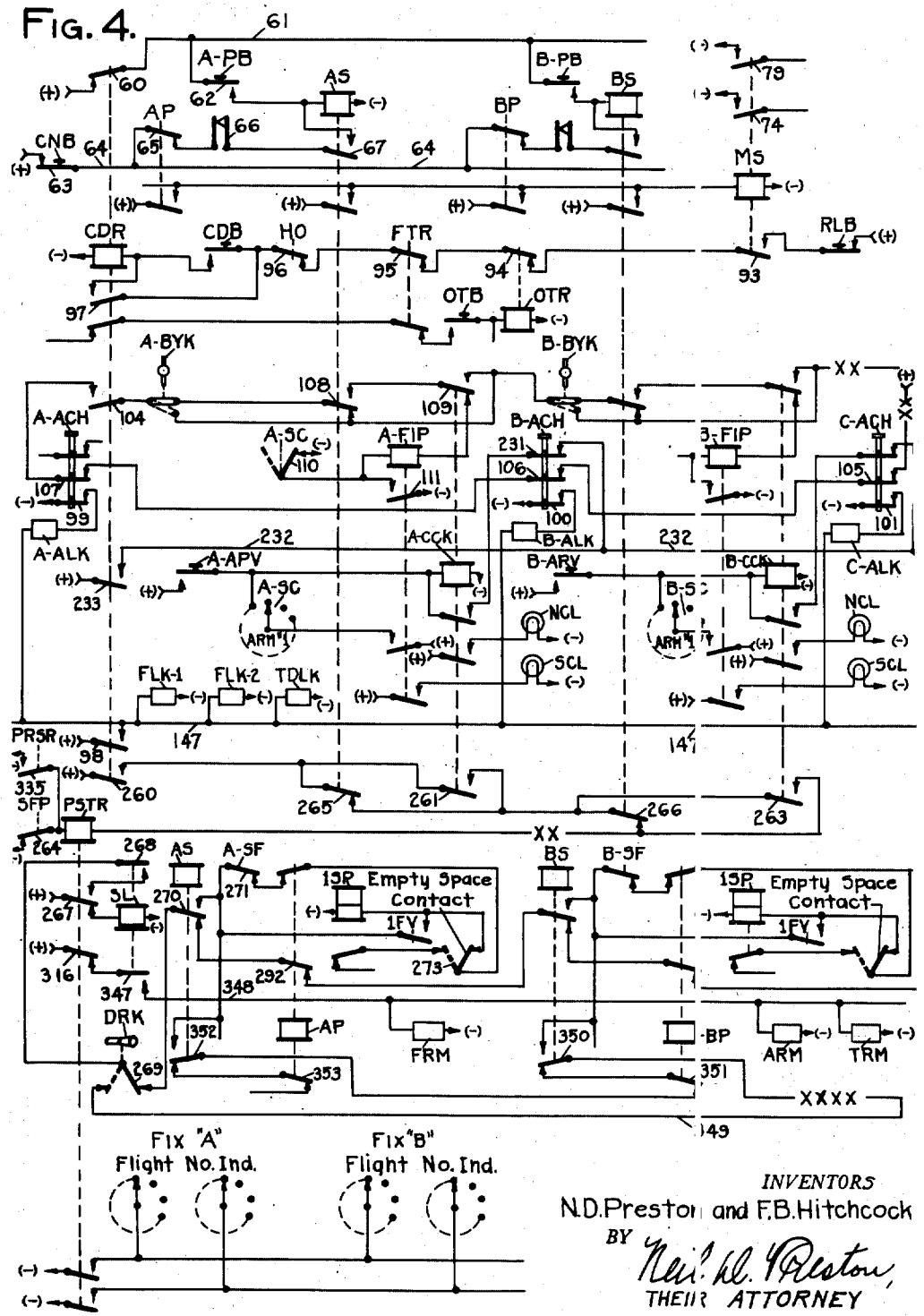
Fig. 4 illustrates the sequence circuits for determining the sequence of conflict detection and posting as between the different fix panels of the flight progress board.

When the setting dial 45 is in an actuated position and the system is set into operation for automatic conflict detection by the actuation of the button CDS, then the lock magnets LK on each of the dials are energized by circuits shown in Fig. 4. The energization of the lock magnet LK of Fig. 12 attracts the armature 51 in a downward direction moving the lock plunger 52 into the base of the notch of the locking wheel for the position in which it is then set to positively prevent the setting dial from being manually moved to another position.

At the end of the posting operation the lock magnets are deenergized allowing the lock plunger to assume a normal position by reason of spring 53 and momentarily thereafter the release magnets RM are energized during the pick-up time of the slow acting relay SL as shown in Fig. 4. As seen in Fig. 12 the energization of the release magnet RM attracts the armature 51 upwardly moving both the lock plunger 52 and the holding detent 49 away from engagement with the lock wheel 48 so that the setting dial 45 freely moves in a clockwise direction by the tension on its restoring spring 47 to its normal blank position determined by a suitable stop. Following the momentary energization of the release magnet RM, the lock wheel 48 is again engaged by the holding detent 49 and the setting dial is then in readiness for another setting operation.

*Automatic conflict detection.*—The general organization of means for providing the automatic time and altitude conflict detection comprises a scanner for each fix panel having a number of different contact arms, each having at least as many different positions as there are posting or registration spaces in the associated panel.

The details of such conflict detecting means may be found in the parent application above referred to; but it is believed sufficient for an understanding of the present invention to merely describe such automatic conflict detecting means in a general way with reference to Figs. 4 and 17 which illustrates the relationship of such means to the system as a whole. The various position contacts of the time and altitude indicators in the several fix panels are connected to a bus system comprising group 1 and group 2 buses for reasons later explained; and the time and altitude indicators of the check display units are similarly connected to a proposed schedule bus system having group 1 and group 2 buses. A sequence group of relays, shown in Fig. 4 serves in the manner discussed in detail later to render the check display units and the posting units in certain selected fix panels effective to govern the energization of these bus systems. An altitude conflict detector, and two time conflict detectors are associated with these bus systems and cooperate to govern the operation of the conflict detection scanners so as to perform the desired functions for time and altitude conflict detection as later described in general with respect to Fig. 17.

*Schedule code transmitter.*—Another component part of the system as illustrated, but optional, comprises relays and scanners as diagrammatically shown in Figs. 5A and 5B for converting the data for an approved flight schedule into a Teletype code for actuation of a conventional transmitter or perforator, and thereby actuating a local printer for record purposes, and any desired number of remote printers.

Figure 3C:
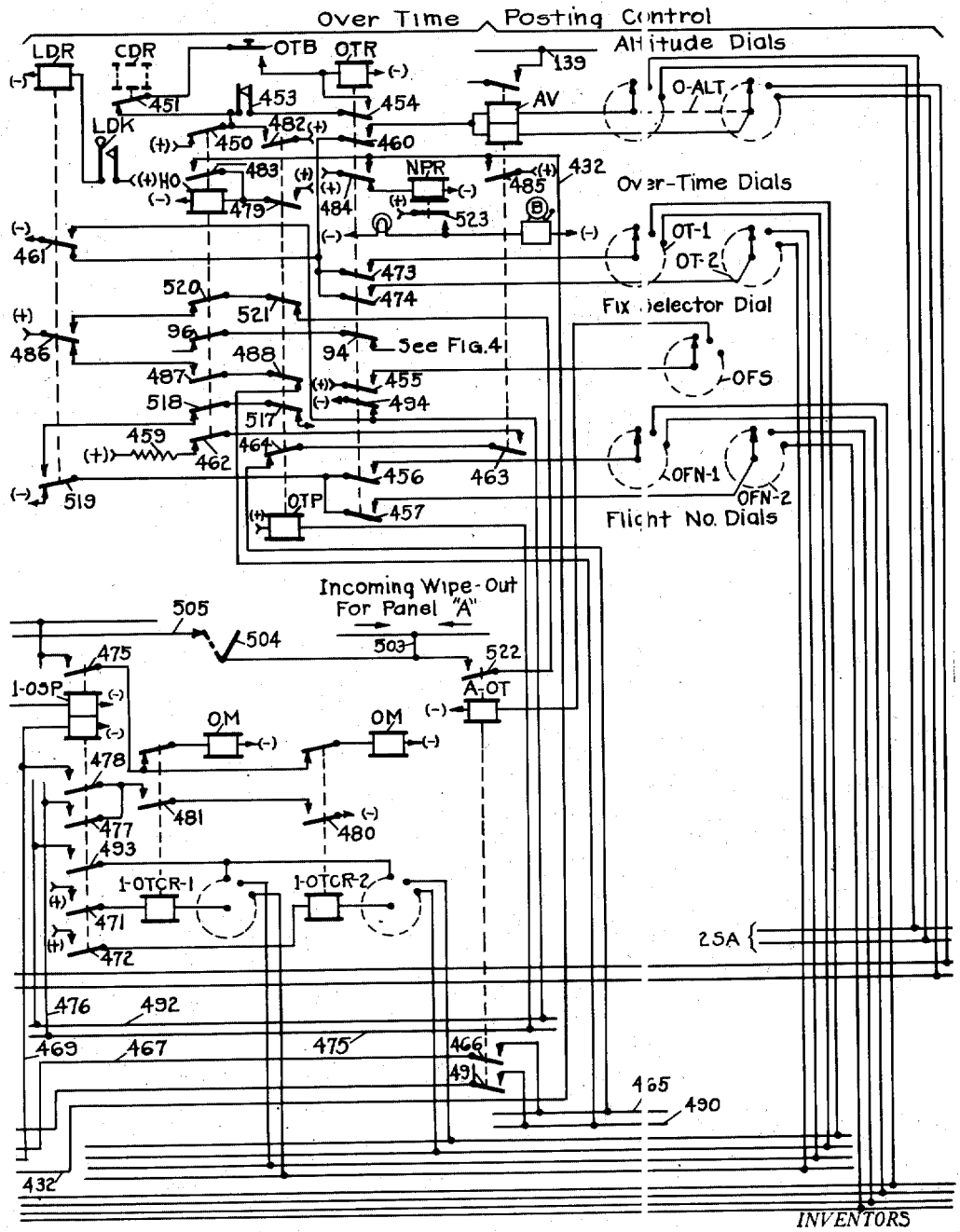
Figure 8A:
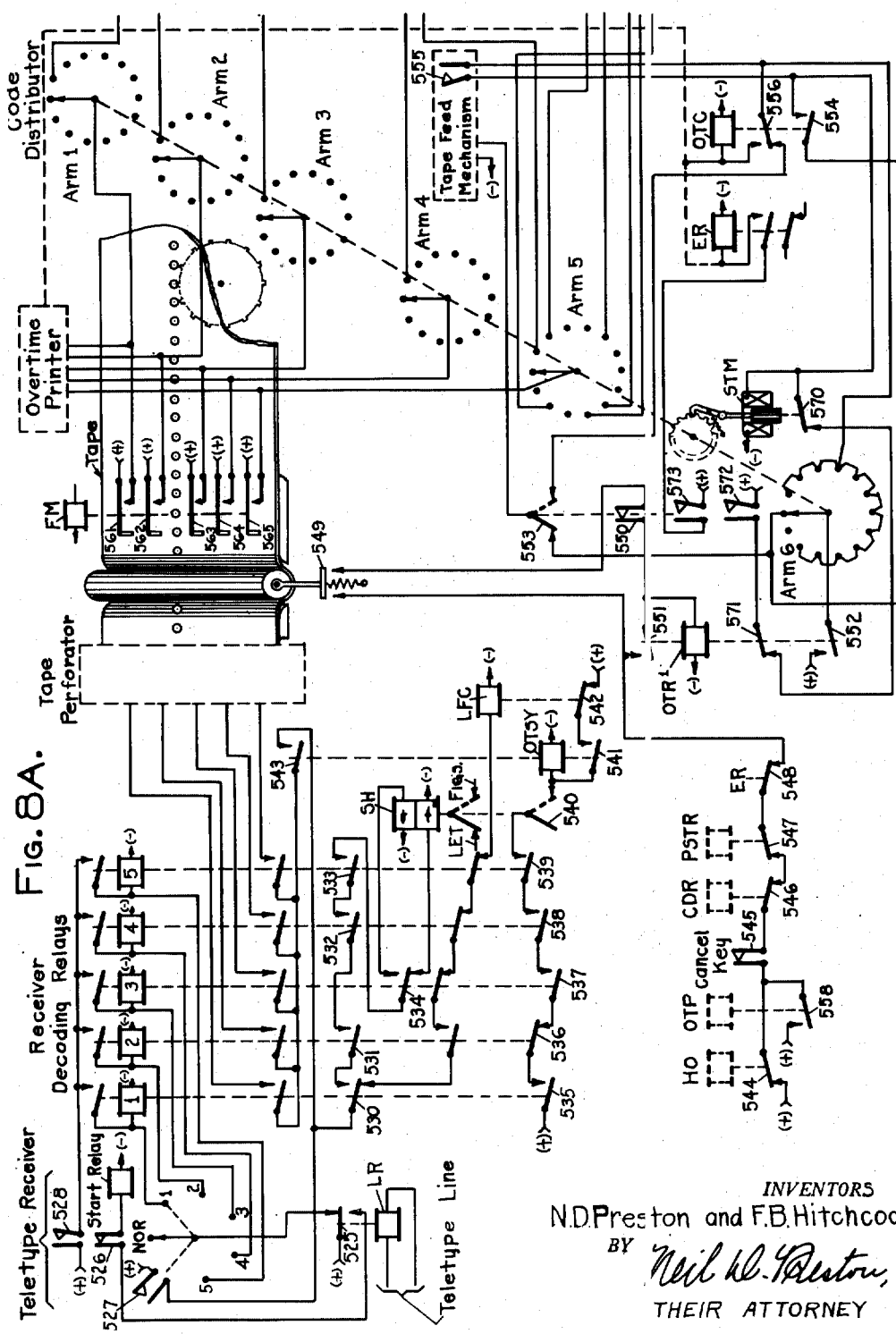

*Overtime posting and wipe-out.*—The posting of a scheduled flight is kept up-to-date by posting the overtime, as reported by the pilot as he passes each fix, in the corresponding fix panel, at the same time automatically wiping out the entire posting for this same flight in the next panel in the rear. The pilot's overtime report of fix designation, flight number identity, altitude and overtime may be manually set up on setting dials for this purpose, as shown in the arrangement of Figs. 3A, 3B and 3C, or such overtime reports in the form of a Teletype code may be automatically decoded by suitable means, as shown in Figs. 8A and 8B, so that the overtime posting and automatic wipe-out operation normally occurs without human intervention.

GENERAL OPERATION

The operation of the specific embodiment of the invention illustrated with respect to the various features and functions, more particularly the stages in the procedure of scheduling flights, will now be discussed in detail on the basis of certain assumptions representing typical instances of such operation.

*Proposed flight schedule.*—Assume for purposes of discussion that the flight controller receives a request for approval of a proposed flight plan, or for a suitable schedule to be made up by the controller, starting at fix A and going to fix C. This request will include the essential data with regard to the plane in question, including its cruising speed. The flight controller assigns a flight number to this flight, unless perhaps it is a regularly scheduled flight having a regular number. He then sets up this flight number on the flight number setting dials FN—1 and FN—2 on his control board.

The request for a clearance will give the origin and destination, and may include a preferred choice of altitudes for some or all of the fixes in the route dependent upon circumstances and the procedure adopted. Anyway, the flight controller sets the master direction key DRK and the altitude dials ALT for the respective fixes. The estimated arrival time at the fixes B and C, using the base departure time of fix A, for a plane having the cruising speed specified are determined by manual or automatic calculation, and then set up on the "estimate time dials" for these fixes.

With the data for the proposed flight schedule thus set up, the flight controller then actuates the push buttons A—PB, B—PB and C—PB for fixes A, B and C to identify these fixes as involved in the route, whereupon the appropriate data for these fixes is at once automatically displayed in the corresponding check display units.

Referring to Figs. 3A, 3B and 3C, and considering this operation of exhibiting the proposed flight data in the check display unit of fix panel A as typical of the like operation for all of the other panels, when push button A—PB is actuated, a fix identifying stick relay AS is energized by a circuit from (+), through back contact 60 of a conflict detection initiating relay CDR, master bus 61, back contact 62 of button A—PB, relay AS, to (—). This relay AS is maintained energized by a stick circuit from (+), through front contact 63 of cancel push button CNB, master bus 64, back contact 65 of a panel relay AP, normally closed contacts 66 of button A—PB opened when pulled out, front contact 67 of relay AS, winding of relay AS, to (—).

The energization of the relay AS and closing of its front contact 68 picks up a display operating relay A—DOP for the fix panel A in question, which in turn closes its front contact 69 to connect the master pulsing bus 70 to an operating bus for the indicators of this check display unit. This master pulsing bus 70 is intermittently energized by impulsing contacts 71 illustrated conventionally and operated by a motor-driven chopper or similar interrupter, so as to provide intermittent energization of the operating magnets or solenoids OM of the indicator units at the desired uniform and efficient rate.

Referring to the first indicator at the left in the check display unit in Fig. 3A constituting the first digit of flight number, the contact arm of its position contacts as shown diagrammatically is connected to a correspondence relay FCR—1 which connects through its back contact 72 the pulsing bus for the check display unit to the operating magnet OM of this indicator. The buses connected to the contact points with which this contact arm cooperate in the different indicating position of this indicator, only two of which are shown, are connected to the master buses for the first digit of the flight number, which master buses are in turn connected to contact points of the flight number setting dial FN—1. The energization of relay AS and the closing of its front contact 73 energizes a master bus to pick up a master setting relay MS, which in turn closes its front contact 74 connecting (—) to the contact arms of the flight number setting dials FN—1 and FN—2.

By reason of these circuit connections, when relay A—DOP closes its front contact 69 to energize the pulsing bus, the operating magnet OM for the indicator in question is intermittently energized and starts movement of the indicator drum and position contacts from the blank position to the various indicating positions in succession. Assuming, for example, that the flight number setting dial FN—1 is in the position for the number 1, then when the left-hand indicator in question has been moved to the position to display the number 1, a circuit is completed to energize the correspondence relay FCR—1 through the contact arm 75 of this indicator in the number 1 position, through the corresponding position bus, flight number setting dial FN—1 in the number 1 position, through the front contact 74 of relay MS, to (—). Consequently, as soon as the indicator assumes the indicating position corresponding with the position of the setting dial, the correspondence relay FN—1 is energized, and the circuit to the operating magnet OM is broken, thereby stopping and holding the indicator in the desired position.

The other indicators in the check display unit are operated in a similar way to positions corresponding with the particular buses energized in their respective sets of buses from the setting contacts on the control board. In this connection, it will be noted that the flight number indicators of each fix panel are governed from master buses connected to the master flight number setting dials FN—1 and FN—2, which are connected to (—) through front contact 74 of relay MS. The indicators for the four digits of the estimated proposed time and for the proposed altitude for each fix panel are governed from sets of buses connected to dials individual to their fix panel, and these dials (estimated time dials and altitude dial) are supplied with negative energy (—) through front contacts of the corresponding fix identifying relays, such as front contacts 76 and 77 of relays AS and AP respectively for panel A.

The control buses for the direction indicators are energized from master buses connected to (—) through contacts 78 of the direction key DRK and front contact 79 of relay MS; but these control buses are also governed in a special way to be selectively energized so that the direction indicators will assume different positions for the same direction of flight dependent upon whether or not the flight schedule includes the next adjacent fix in the particular order or sequence adopted for conflict detection scanning of the fix panels later explained. Referring to Fig. 3B and considering the direction indicator therein illustrated as typical, this indication has two different positions for each direction of movement; and assuming as illustrated that the sequence of scanning the fix panels for conflict detection is first panel A and then panel B, the circuit connections for these two different positions for each direction are selected by front and back points of contacts 80 and 81 of the display operating relay B—DOP for panel B. Thus, if the flight schedule includes the fix B, in which case relay B—DOP is energized, then the direction indicator is operated to the second or lowermost position for each direction of flight for purposes explained later; whereas, if fix B is not included in the proposed schedule, the direction indicator assumes the other position for each direction. In this connection, it should perhaps be explained that, if the fix panel A shown in Fig. 1 represents the extreme end fix for the control area governed by the flight controller, then strictly speaking, all flights coming to that fix must come from the fix B, and there is no need for the circuit connection for operating the direction indicator to its upper position for plane movements toward the left.

The operation just explained for positioning the indicators of the check display unit for the fix panel A is true for all other fix panels involved in the particular route designated by actuation of the fix identifying push buttons. The flight controller can tell from the display in the check display units whether or not the proper fixes have been included in the tentative proposed flight schedule under consideration; and also can make such preliminary survey of the times and altitudes of the proposed flight appearing in the check display units and compare them with the various previously scheduled flights to any extent as may be expedient.

In the particular organization shown, the indicators in the check display units are closely coupled, so to speak, with their setting dial contacts on the control panel, so that a change in altitude and time may be made by merely shifting these setting contacts. For example, if the altitude indicator in Fig. 3B is set in position 5 to indicate 5000 feet, it remains in this position by reason of the energization of its correspondence relay ALCR which opens the circuit for its operating magnet OM If the altitude setting dial A—ALT is shifted to position 6, for example, the circuit for the correspondence relay ALCR is broken and the operating magnet OM acts to move the indicator to the new position. The same would be true if the setting dial were moved backwards to a smaller number, except in this case the indicator would have to turn completely around past the blank position to reach the new position.

It may be explained at this point how the indicators in the check display units are restored to the blank position. This occurs (except for the flight number and direction indicators) when the data in a check display unit has been properly posted in the fix panel, or when for some reason the indicators of an individual panel are restored. The flight number and direction indicators are governed from master buses and are restored when the data displayed in all fix panels has been posted. A cancel button CNB may be used to cancel an entire flight schedule; and when this happens all of the indicators for all fix panels are restored to the blank position at the same time.

Considering a typical example of such restoration operation, and referring to Figs. 3A and 3B, assume that the flight controller wishes for some reason to restore the indicators for the check display unit of fix panel A individually without disturbing the indicators of the check display unit for panel B and pulls out the button A—PB to release the relay AS by opening its stick circuit. The opening of the front contact 76 of relay AS disconnects (—) from the setting contacts for the four digits of time and altitude, thereby deenergizing the correspondence relays CR for these indicators and energizing their operating magnets OM to initiate their movement. The closing of the back contact 82 of relay AS establishes a connection from (—) through front contact 83 of relay A—DOP to a blanking bus connected to the blank position contact points of all the indicators of the check display unit for panel A. Consequently, as each of the time and altitude indicators move to the blank position, the associated correspondence relay CR is energized to stop their operation. The opening of a front contact 68 of relay AS breaks the pick-up circuit for the relay A—DOP, but this relay is held up by a stick circuit including its front contact 84 and empty-full contacts 85, 86, 87, 88, 89, 90, 91 and 92 of all of the indicators in multiple to (—), these contacts being closed to hold up this relay until all of the indicators are in the blank position. Consequently, relay A—DOP remains energized under the conditions being described, because flight number and altitude indicators remain unchanged inasmuch as relay MS is maintained energized through a front contact of relay BS assumed to be picked up for the next fix panel (see Fig. 4).

When the master setting relay MS is deenergized at the end of a posting operation as later described, the flight number and direction indicators are restored to blank in a similar way; and then the display operating relays, such as relay A—DOP, are deenergized.

When the flight controller desires to cancel or wipe-out an entire proposed flight schedule appearing in the check display units, and actuates the cancel button CNB, the stick circuits for all of the fix identifying stick relays, such as relay AS, are broken, and all these relays and the master relay MS release, thereby initiating operation of all of the indicators to the blank position.

*Automatic conflict detection.*—Assuming the data for a tentative proposed schedule set up in the check display units for panels A, B and C in the manner just described, the next step in the operation of scheduling flights in accordance with this invention relates to checking the times and altitudes of this proposed schedule with the times and altitudes at corresponding fixes of all previously scheduled flights to detect if there is any potential conflict in time or space that should be avoided.

As will later appear, provision is made to employ visual check for conflict, as well as the automatic conflict detection, to any extent the flight controller may desire. Also, the detection of a potential conflict in altitude and time by the automatic means does not bar scheduling of the flight, if the flight controller so decides.

Figure 18:
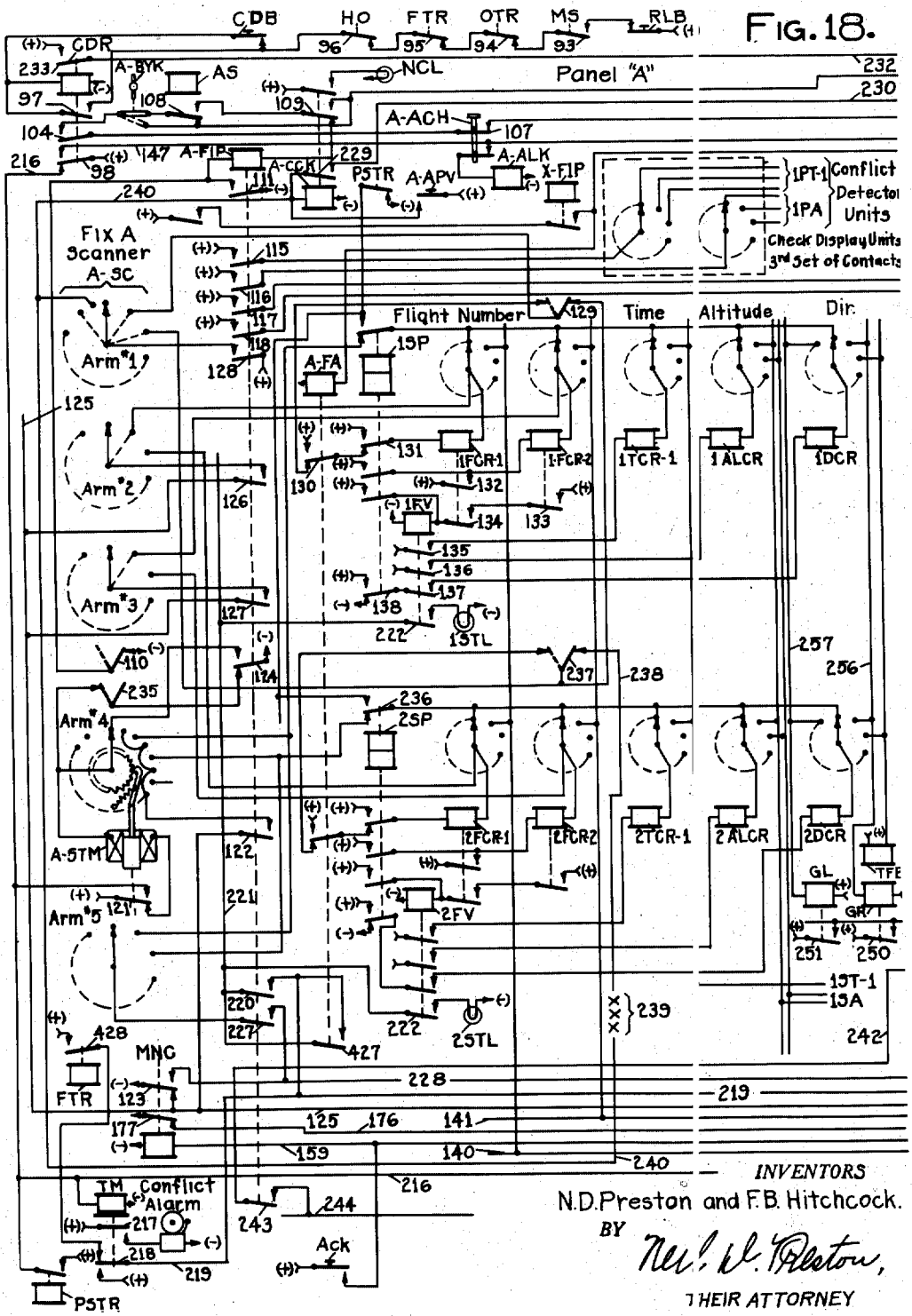
Fig. 18 illustrates the relation of the conflict detection control circuits to the posting organization for one typical fix panel.

Before considering the functions and operation of the specific structures illustrated, it is convenient to survey the conditions and factors involved in detecting conflict between flight schedules. In the first place, it is evident that there is dangerous conflict if two flights are scheduled to use exactly the same altitude at the same fix, or at some point between two fixes, at the same time. If, however, the flights are assigned to different altitudes at and between the fixes, there is no conflict regardless of the scheduled time, it being obvious that two flights may pass over the same point on the ground at exactly the same time provided they are at different altitudes. Similarly, if flights are scheduled for times sufficiently far apart at any given point, there is no conflict, even though exactly the same altitude has been allocated to these flights. In short, there must be a conflict in both altitude and time to create a dangerous condition, and the absence of such conflict in either altitude or time is sufficient to justify scheduling the proposed flight. The desired comparison between proposed and scheduled altitudes and times for conflict detection is made by master comparators or detectors operating successively for each pair of adjacent fixes. As indicated in Fig. 18, the buses for proposed altitude and time which are energized from a third set of position contacts on the check display units, and also the scheduled time and altitude buses from the posting indicators of the fix panels are arbitrarily assigned to different groups of master buses, conveniently designated group 1 and group 2 buses, in such a manner that the altitude and time buses for any pair of adjacent fixes in any given route belong to different group 1 and group 2 master buses.

The master group 1 and group 2 buses for scheduled time have their corresponding buses normally connected together through back contacts of coupling relays CPR to have a common control of a schedule coder or transmitter, but are separately connected to relays of the two master time detector units when these coupling relays are energized. Similarly, the master group 1 and group 2 buses for scheduled altitudes have their corresponding buses normally connected together through back contacts of the coupling relays CPR to the schedule transmitter, but are separately connected to the relays of the master altitude conflict detector when these coupling relays CPR are energized. The time and altitude buses thus connected to this bus system of group 1 and group 2 master buses are rendered effective for each pair of adjacent fix panels in turn by the operation of the sequence relay group of Fig. 4, and energization of fix interval relays A—FIP, B—FIP, etc.

There is a conflict detection scanner for each fix panel, as diagrammatically illustrated in Fig. 17 for the two panels A and B, and each scanner has a number of contact arms and at least as many active positions as there are registration spaces in the associated fix panel. These scanners are set into operation one at a time by the sequence relay group of Fig. 4. It may be helpful to outline briefly the general plan of operation, referring to Figs. 4 and 17, and assuming a proposed flight schedule has been set up in the check display units for fix panels A and B. When the conflict detecting operation is initiated by actuation of the push button CDB and energization of a relay CDR, current is supplied to the circuits of the sequence relay group of Fig. 4 and partly shown in Fig. 17 to cause energization of the fix interval relay for the first fix in the route, i. e. relay A—FIP in the case assumed. This initiates operation of the conflict scanner A—SC for this panel, and also renders the indicators of the check display units of panels A and B effective to respectively govern the energization of the proposed time and altitude group 1 and group 2 buses for the time and altitude detector units. The scanner A—SC takes each one of schedule postings in the fix panel A in turn, starting, say at the top; and renders active the flight number indicators to govern the energization of the flight number buses; and also renders active the schedule time and altitude group 1 buses for the time and altitude detector units. Then, after the schedule posting (if any) for the corresponding flight number has been located in the adjacent fix panel B by flight number correspondence, the schedule time and altitude group 2 buses for the time and altitude detector units are energized. With these four sets of buses energized (namely, group 1 proposed time and altitude buses; group 1 scheduled time and altitude buses; group 2 proposed time and altitude buses; and group 2 scheduled time and altitude buses), certain relays are picked up, provided the scheduled altitudes at the two fixes for the flight schedules being checked are either both above or both below the proposed altitude, or provided the scheduled times at the fixes are both either earlier or later by at least more than the proposed times with their ten minute (+) and (—) margins.

If such check of the postings for this selected scheduled flight with the proposed flight show no conflict in either time or altitude, a master no-conflict relay MNC is energized and the scanner advances to the next posting in the panel A. After checking each posting in the panel A in this manner, then the sequence relay group of Fig. 4 initiates operation of the scanner B—SC for the next adjacent panel B, where the same operation is repeated, and so on until all of the fixes involved in the proposed flight schedule have been checked over.

If a conflict in both altitude and time should exist with respect to a particular posted schedule, there is no energization of the master no-conflict relay MNC; and the organization illustrated when such conflict exists requiring consideration by the flight controller, the scanner stalls, an alarm is given, and the particular schedule postings involved are distinctly identified by lighting their individual indicating lamps.

If the conflict thus indicated can be obviated by special instructions to the pilots, or for other reasons, is not prohibitive in the opinion of the flight operator he may approve and accept the proposed schedule by manual actuation of a master acknowledging push button ACK, whereupon the operation of the scanner continues. If, however, the conflict cannot be tolerated, either the proposed base departure time and resultant estimate times may be changed, or the allocated altitudes altered by appropriate manipulation so as to obviate the condition of conflict. If necessary, the proposed flight schedule may be abandoned in whole or in part and cleared out of the check display units by actuation of the appropriate manual control devices later described in detail.

Considering these various operations more in detail and referring to Fig. 4, when the flight operator actuates the push button CDB to initiate the conflict detecting operation, a relay CDR is energized over a circuit which may be traced from (+), through a front point of release push button RLB, front contact 93 of relay MS (now energized due to the presence of a display in the check display units), back contact 94 of relay OTR, back contact 95 of relay FTR, back contact 96 of relay HO, push button CDB in an actuated position, relay CDR, to (—). The closing of the front contact 97 of relay CDR provides a shunt for the push button CDB, thereby maintaining the relay CDR energized by a stick circuit until the relay MS is released at the end of the posting operation, to open its front contact 93, or until the release button RLB is actuated.

The circuits for relay CDR are shown in Fig. 4 where it can be seen that the energization of relay CDR cuts off at its back contact 60 the supply of current to the master bus connected to the fix identifying push buttons, so that accidental or careless actuation of such a push button will not energize the associated fix relay such as relay AS BS, etc. The closing of the front contact 98 of the relay CDR energizes a bus 147 supplying current to suitable lock magnets for the flight number, time and altitude setting dials on the control panel. Typical flight number dial locks have been designated FLK—1 and FLK—2 for the two digits of flight number; while a single lock designated TDLK is typical for all four digits of time. The energizing circuits for the lock magnets A—ALK, B—ALK and C—ALK for the altitude dials also respectively include a normally closed contact 99, 100 or 101 of a spring return altitude change push button belonging to the corresponding fix panel, such as the buttons A—ACH, B—ACH, etc. Thus, while the automatic conflict detection is in operation, the dials determining the position of the time and altitude indicators of the check display units for the proposed flight schedule, together with the master flight number setting dials, are locked against accidental or careless displacement.

The energization of relay CDR also closes a front contact 104 to supply current to a sequence or hunting circuit to pick up the fix interval relay of the first fix panel in the arbitrary series chosen which has its relay such as relay AS energized (see Fig. 4). For example, assuming the fix A to be included in the proposed flight schedule and relay AS is energized, then closing the front contact 104 of relay CDR closes a circuit to pick up the fix interval relay A—FIP.

The picking up of the relay A—FIP initiates the operation of the conflict detection apparatus (not shown in this application) to cause the operation of the conflict detector scanner for the fix panel A. When all of the postings in the fix panel A have been checked, or approved by the operator, the arm No. 1 of the scanner A—SC completes a circuit for picking up the conflict check relay A—CCK (see Fig. 4). This relay A—CCK illuminates the lamp NCL indicating that there is no conflict existing for the panel A, and also release the relay A—FIP as well as passes energy on for effecting the picking up of the relay B—FIP to initiate the conflict detection operation in connection with the panel B. This operation of checking conflict for each fix panel having its stick relay, such as relay AS, picked up, continues until all of the designated fix panels have been checked, and their corresponding conflict check relays, such as relay A—CCK, are picked up. When this occurs, the system initiates a posting operation, as will be presently described.

*Changing the sequence of scanning at fix panels for conflict detection.*—The individual scanners for the fix panels for conflict detection are operated successively in a predetermined arbitrary sequence, say from left to right, in accordance with the way in which the circuits for the sequence group of relays of Fig. 4 are connected. This sequence once chosen remains the same regardless of the fixes involved in a given route, and it may happen that a point of congestion due to a large number of postings for prior flight schedules will exist at a fix which under the normal scanning sequence would not be reached until a number of other panels have been previously scanned. The proposed flight schedule cannot be used, however, until it is free from conflict at such point of congestion, or can be readily made free of conflict by a change in altitude as distinctive from a change in base time; and hence if an unavoidable conflict exists at the point of congestion, it is an idle operation and a waste of time to scan other fix panels first.

In view of these conditions, it is proposed in the interests of facilitating the scheduling of flights to provide means for enabling the operator to manually change the sequence of fix panel scanning as he may find expedient. This is done by actuating by-pass keys A—BYK, B—BYK, etc. There is one of these by-pass keys for each fix panel, and referring to Fig. 4, it can be readily seen that the movement of any one of these keys from the normal position shown to the dotted line position by-passes the hunting circuit around the front contact of the corresponding fix panel identifying relays AS, BS, etc. For example, by-pass key A—BYK actuated to a dotted line position by-passes contact 108 of relay AS. The flight controller can set these by-pass keys in a way to cause the conflict check to be made first at some particular panel where the number of postings or other conditions indicate that a conflict is most likely to exist, and then check at other panels for conflict in any desired order by the restoration of the by-pass keys to their normal positions. As presently explained, the posting operation cannot occur until the conflict detection check has been made for all of the fix panels involved in the route, resulting in the picking up of relays such as A—CCK for each of those panels. In this connection the lighting of the scanning lamps SCL and the no-conflict lamps NCL controlled by the energization of the relays FIP and CCK respectively serve to help the operator determine the condition and progress of the scanning operation.

*Visual conflict check and approval.*—Where the number of postings in a given fix panel are few in number, or when the scheduled times posted are radically different from the proposed time, an experienced operator can often determine if conflict exists by a visual check of the postings with the proposed flight schedule in the check display unit. Accordingly, in the interests of saving time provision is preferably made as shown for the flight controller to actuate an approval button such as A—APV, for a given panel, after such visual check for conflict and thereby energize a conflict check relay, such as A—CCK for this panel by a circuit readily traced in Fig. 4, the same as if the scanner A—SC for this panel had operated to its last half-step position.

The flight operator may make a visual check of conflict for some panels (often done quickly where a few postings are involved) at the same time scanners are operating to automatically detect conflict at other panels.

*Posting of approved flight schedules*

When the conflict check relays such as A—CCK, B—CCK, etc. in Fig. 4 have been energized for each of the fix panels involved in the route for the proposed flight as indicated by the energization of their associated fix relays AS, BS, etc. energized, a posting relay PSTR is automatically energized. For example, assuming the proposed flight to include fixes A and B, a circuit is closed from (+), through a front contact 260 of relay CDR, a front contact 261 of the check relay A—CCK in multiple with open back contact 265 of relay AS, through a front contact 263 of relay B—CCK in multiple with open back contact 266 of relay BS, and so on for all of the fix panels involved, posting relay PSTR, back contact 264 of a relay SFP, to (—). In other words, each fix included in the route has its identifying stick relay picked up opening a back contact, such as back contact 265 of relay AS, included in the circuit for the posting relay PSTR, which thus requires the picking up of its associated conflict checking relay CCK to close a contact, such as contact 261 of relay A—CC, in order for relay PSTR to be energized.

In the particular organization shown, the energization of relay PSTR to initiate the posting operation occurs immediately after the conflict detection is completed, and without any additional manual manipulation; but if desired a self-restoring push button or equivalent manually operable means may be provided to require an additional manual act after completion of the conflict detecting operation to initiate the posting operation.

Generally speaking, the data for a proposed flight schedule as it appears in the check display units for the various fixes involved is transferred or posted into a registration space of the corresponding fix panels, one panel at a time, and in an order corresponding with the order of the fixes encountered for the established direction of flight. As illustrated, the posting of the approved flight data is made in the first vacant or empty registration space of the fix panel starting from the top down. As each flight advances and its postings are automatically wiped out in the rear in the manner later described, an empty space is created in which the data for the next new flight schedule may be posted. It can be seen that the postings made in this way in the first vacant space from the top down will not be arranged in sequence according to time or altitude; but the provision of means for automatically detecting time and altitude conflict makes it unnecessary to arrange postings in any time or altitude sequence for the purpose of determining conflict. The posting operation is the same for different panels and for different spaces of a panel, once the particular space for posting has been identified, so that a description of the operation for posting the data from one check display unit into one space of one fix panel will be sufficient for an understanding of all such operations.

Referring to Figs. 3A and 4, the energization of the posting relay PSTR and opening of its back contact 267 releases a master slow release relay SL and after a time, for reasons later explained, a chain-stitch posting circuit is energized from (+), through a limiting resistance 255, front contact 267 of relay PSTR, back contact 268 of relay SL, contact 269 of the direction key; and assuming the direction key DRK set to the right as shown, so that the fix panel A is the first in the series, and also assuming there is flight data in the check display unit for this panel and relay AS is energized, current flows through the front contact 270 of relay AS, back contact 271 of relay A—SF, back contact 272 of relay AP, to an empty-full contact 273 of the upper registration space in the panel, to perform the functions of a vacant space selecting circuit.

Assuming the upper or first registration space in panel A shown in Figs. 3A, 3B and 3C is empty, and the empty-full contact 273 is in the position shown, current is supplied from the circuit above traced through the lower winding of the space relay ISP of this space for panel A, to (—). This vacant space selection can probably be best seen in Fig. 20 where three spaces are shown. For example, if the first space is filled, that is, already has a flight schedule posted therein, the contact 273 is in a left-hand position so that energy is passed on through back contact 274 of relay ISP to the empty-full contact 275 of space 2 which if in a right-hand position indicating its space to be empty provides for the picking up of the space relay 2SP. But if this second space should also be full, then the contact 275 would be in the left-hand position so that energy would be passed on through back contact 276 of relay 2SP to the empty-full contact 277 to provide for the picking up of the relay 3SP if such third space is empty. It can thus be seen that the vacant space selection is made by a chain-stitch circuit which acts to pick out the first vacant space from the top of the panel and effect the energization of the relay SP for that registration space. Although any of the spaces may be filled causing the selection of some space not specifically shown in the drawings, it is convenient in the consideration of the circuit organization to typically explain the posting operation with respect to the first registration space at the top of fix panel A, so that it is assumed that this first space is empty and that the relay ISP is picked up, as above pointed out.

The energization of the space relay ISP and the closing of its front contacts 280 and 281 completes a stick circuit through its lower winding in series with a space repeater relay AP for the panel, this stick circuit being readily traced from (+), relay AP, a panel bus 282, front contacts 281 and 280 of relay ISP in series, and through lower winding of this relay ISP, to (—).

It is noted that this stick circuit includes relay AP which in effect is in multiple with resistance unit 255 and both are in series with the lower winding of relay ISP, but sufficient current flows through the relay AP to immediately pick up its contacts.

The energization of the space relay ISP and closing of its front contact 283 also connects the master pulsing bus 70 to the operating magnets OM of the various indicators in this space through back contacts of their respective correspondence relays, so that movement of these indicators from the blank position is initiated, the blank position connections for these indicators through front contact 284 of relay ISP, blank position panel bus 285 to (—), through back contact 286 of relay PSTR being open at this time because relay PSTR is energized.

The energization of the space relay ISP closes front contacts 111 and 287 to connect (+) to the correspondence relay 1FCR—1 and 1FCR—2 for the flight number indicators; the closing of front contact 288 establishes an obvious circuit for energization of the relay 1FV to close its front contacts 135, 289, 190, 291, 136 and connect (+) to the correspondence relays TCR and ALCR for the four digits of time and altitude. The correspondence relay for the direction indicators is connected to (+) through front contact 137 of relay 1FV and front contact 138 of relay ISP. Thus, the correspondence relays of the indicators for this particular space in the fix panel are activated, so to speak, by being connected to the (+) terminal of the source of current used for the system.

The energization of the space repeater relay AP opens at its back contact 272 the empty space selecting circuit; and as shown, the connection from the empty-full contact 273 in the full position to the space below is also opened at the back contact 274 of the space relay ISP, so that notwithstanding movement of the flight number indicator with which this empty-full contact 273 is associated from its blank or empty position, and shifting of the empty-full contact 273, there can be no energization of space relays for any given spaces below or above the particular registration space selected. The energization of the space repeater relay AP, among other things, opens at its back contact 65, the stick circuit for relay AS to release this relay and close up the connection in the chain-stitch hunting circuit to the next panel this connection being broken, however, at the back contact 292 of relay AP, so that the chain-stitch circuit is not in fact passed onto the next panel until the relay AP is released. The closing of front contact 293 of relay AP maintains a supply of energy to the bus for the master storage relay MS, and the front contact 77 maintains a connection from (—) to the setting dials of the control panel so as to maintain the indicators in the check display unit in their set positions, and the stick circuit for relay A—DOP closed, the pick-up circuit for this relay A—DOP being opened at the front contact 68 of relay AS.

Finally, the closing of a series of front contacts 294, 295, 296, 297, 298 and 299 of the relay AP provides a connection from (+), through front contact 278 of posting relay PSTR, master bus 279, front contacts 301 to 308 of the correspondence relays of the check display indicators in series, and said front contacts 294 to 299 of relay AP to the arms of the position contacts of said check display indicators for time, altitude and direction. The arms of the position contacts of the check display flight number indicators are connected to buses 309 and 310 which are connected to (—) through front contacts 311 and 312 of the posting relay PSTR.

By reason of these relay operations and closure of circuit connections, the various panel buses for flight number, time and altitude and direction are selectively connected to (—) in accordance with the position of the indicators in the check display units, while the contact arms for the various indicators of the space selected are set into operation to successively pass over contact points connected to their respective set of panel buses. Consequently, as each indicator in the posting operation in question assumes a position matching that of the corresponding check display unit, its correspondence relay is energized to open the circuit for the associated operating magnet and stop further movement of that indicator.

As a typical example of such indicator setting circuits for the different digits of flight number, assume the first digit of the flight number to be 1. When the indicator for this digit in the first space in question is shifted by its operating magnet OM to its second position designated 1, a circuit is completed to energize correspondence relay 1FCR—1 from (+), front contact 131 of relay 1SP, correspondence relay 1FCR—1, indicator arm in position 1, panel bus 313 for this position, arm of check display indicator in the same position 1, flight number bus 309, front contact 311 of relay PSTR, to (—).

As a typical example of such indicator setting circuits for the time, the altitude and direction indicators, let us assume that the first digit of the time is to be 0 for the tens of hours, as in the time 09:50 o'clock. When the indicator for this digit in the first registration space in question is shifted by its operating magnet OM to its first position designated 0, a circuit is completed to energize the correspondence relay 1TCR—1 from (+), front contact 135 of relay 1FV, wire 316, windings of correspondence relay 1TCR—1, indicator arm in position 0, panel bus 317 for this position, arm of check display indicator in the same position 0, wire 318, front contact 294 of relay AP, front contact 308 of relay FCR—1, front contact 307 of relay FCR—2, wire 319, front contact 306 of relay TCR—1, front contact 305 of relay TCR—2, front contact 304 of relay TCR—3, front contact 303 of relay TCR—4, front contact 302 of relay ALCR, front contact 301 of relay DCR, master bus 279, front contact 278 of relay PSTR to (—).

From these two typical examples, it will be readily understood how each of the remaining indicators assume their proper positions. It may be noted in connection with the setting of the direction indicator that the (+) permanently connected to one terminal of the relays FFB, GL, GR and TFB has no effect on the picking up of the relay 1DCR because this relay 1DCR requires that negative energy be applied to the panel buses connected to it in order for it to be energized. The connection of the (—) energy to a panel bus associated with the direction indicator will of course cause one of these relays, such as relay GR, to be picked up, but no undesired operation results therefrom because no overtime posting can be in progress at this time, as will be described later.

After all of the indicators in the registration space in question have assumed the proper position, and the correspondence relays for all of these indicators are energized, a shunting connection for the lower winding of the space relay 1SP is established from (—), through contact 314 of schedule transmitter (Fig. 5B), master bus 315, front contacts 320, 321, 322, 323, 324, 325 in series, wire 326, front contacts 327 and 328, front contact 280 of the relay 1SP to its lower right-hand terminal. With both terminals of the lower winding of relay 1SP thus connected to (—), this relay releases and opens its front contacts 280 and 281 to deenergize the space repeater relay AP.

The deenergization of the space relay 1SP restores the parts and circuits for the associated space to normal, except that the indicators are left and held in positions to display the flight data, and the empty-full contacts 273 for this space are shifted from the normal position shown to the dotted line position to complete a circuit connection through back contact 274 of relay 1SP to the empty-full contact 275 in Fig. 20 for the space below. The empty-full contacts are of course shifted as soon as the associated indicator leaves its blank position, as previously discussed in connection with the structure of the proposed indicator.

The release of the space repeater relay AP and closing of its back contact 292 passes on the sequence circuit to the next panel B (see Fig. 4) and if there is flight data displayed in the check display unit for this panel and relay BS is energized, energy is applied to the vacant space selecting circuit for this panel to cause a posting operation similar to that described for panel A.

The release of relay AP and the opening of its front contact 77 disconnects (—) from the time and altitude setting dials for this particular panel, and consequently, the time and altitude indicators in the check display unit are caused to assume their blank positions. As shown the flight number and direction indicators which are common to all panels, are controlled from master setting dials, and hence these flight number and direction indicators in the check display unit remain in their operated positions until the posting has been completed for all panels involved, and the master relay MS is deenergized opening front contacts 74 and 79.

Finally the release of the space repeater relay AP opens front contacts 294 to 299 and thus disconnects (—) from the sets of position contacts for the time and altitude indicators in the check display units, with which the panel indicator setting buses are connected, so as not to interfere with the use of these buses for code transmission of clearances and recording operations for the flight data for the next fix panel B.

When the posting operation has been completed for all of the fix panels involved, and the relays such as AS and AP for each of these panels are deenergized, the master relay MS is released to open the stick circuit for the relay CDR at open front contact 93 (see Fig. 4), releasing this relay CDR and deenergizing all of the circuits of the sequence relay group, including the posting relay PSTR. The release of relay MS also disconnects (—) from the master flight number and direction setting devices (see Fig. 3A), so that the flight number and direction indicators in the various check display units are restored to their blank positions, whereupon with all of the empty-full contacts 85 to 92 of the check display indicators in the normal position shown, the stick circuit for the corresponding relay, such as relay A—DOP, is broken to restore it to the normal position.

The dropping away of the conflict detection relay CDR opens front contact 98 removing energy from the lock bus 147. This deenergizes the locks FLK—1 and FLK—2 for the two master flight number dials; the locks ALK for the altitude setting dials for all of the fixes; and the locks TDLK for each digit of time for all fixes. As described in connection with the structure of the setting dials, the deenergization of the lock magnets merely permits the dials to be free for manual setting, but during the pick-up time of the relay SL following the closure of back contact 267 of the posting relay PSTR, a circuit is closed from (+), through back contact 347 of relay PSTR, and back contact 347 of relay SL to the release magnet bus 348. This bus 348 supplies energy to the release magnets FRM for the various digits of flight number; the release magnets ARM for the altitude dials for all fixes; as well as the release magnets TRM for the setting dials for four digits of estimate time for each fix. It can be seen that this energization of the release magnets is only during the pick-up time for the restoration of the spring biased setting dials as explained in connection with the structure shown in Fig. 12.

As mentioned above, the posting operation is in sequence from panel to panel in the order that flight passes over the corresponding fixes, and for convenience in the illustration the detailed circuits have been shown in Fig. 4 illustrating how the contact 269 of the direction key DRK in a right-hand position causes the posting operation to occur at the panels A, B, C, etc. in that order. On the other hand, when the contact 269 is in a left-hand postion the posting operation occurs in the reverse order and this has been indicated by showing wire 349 going to the right-hand side of Fig. 4 and including a number of XX symbols indicating the contact selections of the later panels, but leading to the contacts 350 and 351 of relays BS and BP and then passing on to contacts 352 and 353 of relays AS and AP to show how these circuits are connected into the vacant selecting circuits and the chain stitch circuits provided for the other direction.

All circuit failures in connection with this posting operation are on the side of safety. If there is a bad contact or broken wire which prevents any one of the indicators in the selected posting operation from assuming a stable position in accordance with the position of the corresponding indicator of the check display unit, then all of the correspondence relays for this posting operation are not energized, and the circuit including in series the front contacts of these correspondence relays is not completed to shunt the associated space relay, such as relay ISP and in turn release the associated space repeater relay AP to pass on the posting operation to the next fix panel. In other words, in the case of a circuit failure, the normal posting operation is arrested, and in this way the failure is at once brought to the attention of the flight controller. The indicator at fault can be readily detected by the fact that its indicaing drum is in continuous motion; and if the indicator units are quickly detachable with a block coupler as proposed, such defective indicator unit may be quickly replaced to cure the contact troubles most likely to occur in apparatus of this character. Similarly, if the indicators for a check display unit should fail to assume the proper stable condition in conformity with its setting dial, the circuit connection including in series the contacts of the correspondence relays is not completed to supply current to the front contacts 294 to 299 of the space repeater relay in the corresponding panel, such as relay AP; and consequently, there is no energization of position buses to allow a completed posting operation so that the system stalls to manifest such failure.

*Posting revised schedules.*—Where flights are projected for some time ahead it may well happen that it is necessary to change a schedule already checked and posted for a flight, either to correct the estimated arrival times or perhaps change an allocated altitude at one or more fixes on account of a change in weather conditions since the flight scheduling was originally prepared. To make such a revision of a flight schedule already posted, the flight operator precedes the same as if for an entirely new schedule, setting up the desired route with the proper estimated times and altitudes for the fixes involved, and visually or automatically checking this revised schedule for potential time and altitude conflict When the proposed schedule in the check display units is for such a revision of a prior schedule already posted, it is important that the postings for the old schedule should be changed to the new, rather than post the revised schedule in another empty space, with the resultant confusion and inaccuracy of two different schedules posted for the same flight number, one of which is obsolete but both of which are displayed without distinction on the flight progress board and both affect the automatic conflict detectors. Accordingly, in the arrangement proposed, when the flight number set-up in a check display unit is the same as for some existing posting in the corresponding panel, the space containing such posting is the one automatically chosen to have its indicators operated to conform with those of the check display unit, instead of the first space that happens to be empty.

Further, in order that the flight operator may not accidentally or carelessly alter a posted flight schedule by mistake, due to the operation of this means, if he should happen to set up by mistake a flight number in the check display unit corresponding with some flight number previously posted, means is preferably provided to prevent any revision of a posted schedule, unless the controller actuates a special button PRS for such operation of posting a revised schedule.

As a typical example of this operation, assume there is a posting in the first space in fix panel A for the same flight number appearing in the check display unit, presumably because the data in the check display unit is a revision of the prior posting. During the operation of conflict detection, when (—) is connected to the contact arms of the flight number indicators for this space through the arms 2 and 3 of the scanner A—SC (see Fig. 18), a relay SFP—1 is energized from (+), through front contact 330 of relay CDR (see Fig. 31), relay SFP—1, back contact 311 of relay PSTR, to the third set of position contacts for the first digit of flight number, panel buses and the contacts of the indicator in question, through arm 2 of scanner A—SC of Fig. 18, front contact 126, bus 125, back contact 123 of relay MNC, to (—). In this way, the relay SFP—1 is energized in multiple with the correspondence relay IFCR—1 to signify that the same flight number in the check display unit has been previously posted so far as the first digit is concerned. The energization of relay SFP—1 by such correspondence in the first digit of the flight number and the closing of its front contact 331 connects energy from (+), through the lower winding of relay SFP—2, front contact 331 of relay SFP—1 and back contact 312 of relay PSTR to the arm of the check display indicator for the second digit of flight number, so that the relay SFP—2 is energized if as assumed there is a posting in the panel having second digit of flight number the same as that in the check display unit. The relay SFP—2 is held up by an obvious stick circuit through its upper winding including front contact 332 and front contact 333 of relay CDR, so as to remain up until the conflict detection and posting operation is completed.

It should be noted here that a proposed schedule that is the revision of a schedule already posted may be of such a character that the conflict detection units will indicate conflict conditions and the conflict scanner, such as scanner A—SC, will not move to the next registration space. Since the data already posted is to be revised, no conflict can in fact exist, and such stalling of the scanner should be manually cancelled or obviated by the actuation of the acknowledging button ACK, to cause energization of the master no-conflict relay MNC and the continuation of the scanning operation.

The energization of the same flight posted relay SFP—2 opens at its back contact 264 the energizing circuit for the relay PSTR, so that the posting operation normally occurring after the conflict detection operation has been completed will not occur in this case. The picking up of relay SFP—2 also closes front contact 349 energizing the revision indicating lamp REV, thus bringing to the attention of the flight controller the fact that the proposed schedule is in part at least a revision of some prior schedule flight, and enabling him to correct any mistake that may have been made in setting up the flight number, if no such revision is in fact intended. If a revision of a posted schedule is intended, the controller actuates the push button PRS for the purpose of posting the revised schedule which closes a circuit through a front contact 334 of relay SFP—2 to energize a relay PRSR to close its front contact 335 and permit energization of the posting relay PSTR. The relay PRSR is held up by an obvious stick circuit including front contact 229 until the relay SFP—2 is dropped by the release of relay CDR at the end of the posting operation. The energization of relay PRSR completes a circuit through its front contact 336 and front contact 337 of the posting relay PSTR, through a front contact 338 of fix relay AS, to a bus 339, to pick up the flight number activating relay A—FA for the corresponding fix panel A, which connects (+) through its various front contacts to the correspondence relays 1FCR—1, 2FCR—1, 3FCR—1, etc. for the first digit of flight number for all of the spaces in this panel.

The picking up of the relays PRSR and PSTR energizes a similar circuit for the flight number activating relay FA for each panel having its fix identifying relay, such as relay AS, picked up. This can best be seen by referring to Fig. 11, where the circuits for the flight number activating relays A—FA and B—FA are shown in detail as typical of all such relays.

When the posting relay PSTR is energized, it closes front contacts 311 and 312 to connect (—) to the master buses 309 and 310 which supply energy to the contact arms of the flight number indicators in each of the check display units.

Under the conditions assumed, where the flight number appearing in one or more of the check display units is the same as the flight number also posted in one or more of the fix panels, this application of negative energy (—) to the flight indicator units of the check display causes the application of negative energy (—) to selected buses of both digits of flight number corresponding to the position of the flight number indicators of some space in one or more of the panels. Consequently, the correspondence relays FCR—1 and FCR—2 for both digits of the flight are energized for the space of each panel having the same flight number in question; and the energization of these relays closes the same circuit above described to energize the flight verification relay FV for this space of each panel. Assuming relay 1FV for the first space shown in Fig. 3A to be energized in this manner, it closes a front contact 340 to connect (—) to a panel bus 341 for energizing the same flight relay A—SF for the panel in question through front contact 286 of relay PSTR, to (—). The energization of this same flight relay A—SF opens at its back contact 271 the vacant space selecting circuit for this panel A, so that the normal operation of posting in the first vacant space will not occur.

This operation just described occurs to pick up a relay, such as relay A—SF, for each of the various fix panels having a schedule posted with a flight number corresponding to the flight number in the check display unit, and during the release time of the slow-acting relay SL, so that when this relay SL closes its back contact 268 to supply energy to the chain-stitch posting circuits, the empty space selecting circuits for the panels in question have been rendered ineffective. Under these conditions, the closure of back contact 268 causes the panels to be selected one at a time for a posting operation to effect the revision of the data in that registration space of each panel having its flight verification relay picked up. Considering panel A of Fig. 3A as typical, and as the first panel in the sequence to have a posting to be revised, the drop away of relay SL causes a circuit to be completed to energize the space relay 1SP for a corresponding space which may be traced from (+), limiting resistance 255, front contact 267 of relay PSTR, back contact 268 of relay SL, contact 269 of direction key DRK in a right-hand position, front contact 270 of relay AS, panel bus 342, front contact 343 of relay 1FV, lower winding of relay 1SP, to (—). This energization of the relay 1SP for this space assumed to have posted therein the same flight number appearing in the check display units causes the relay AP to be picked up and the time and altitude indicators for this space to be operated as required to match the indicators in the check display unit in the same manner as for a regular posting operation previously described, thereby revising the posting to conform with the revised flight schedule. The same operation would occur if the posting should happen to be in some other space of the panel; and the same operation is true for other panels where there are postings for the same flight number appearing in the check display units.

It may happen that the schedule in the check display units is in part a revision of a prior posted schedule and in part a new schedule for additional fixes. In such a case the system operates automatically to revise the old postings in the fix panels; wherever they may appear, due to the energization of an associated same flight relay, such as relay A—SF; and yet the postings for the new part of the flight schedule are automatically inserted in the first vacant space of the associated fix panel, due to the fact that no same flight relay such as relay A—SF is energized for such panel or panels, and the normal empty-space selection is effective.

*Transmitting and recording flight schedule clearances.*—While the approved flight plan or schedule may be read off from the check display units and communicated to the pilot in any desired manner, in the preferred organization illustrated, means is provided for automatically converting the data of this approved flight schedule into the conventional Teletype code for the purpose of transmitting such schedule or clearance automatically over line circuits to any desired number of remote printers, and at the same time actuating a local printer for record purposes.

An organization of circuits and apparatus for accomplishing this purpose is illustrated diagrammatically in Figs. 5A and 5B; and certain portions of the system previously described have been shown in block form to illustrate the interrelationships. This schedule code transmitter has two transmitting scanners including a flight number scanner TSC—1 and a schedule scanner TSC—2; and these two scanners are used to take the different combinations of bus energization selected in accordance with the flight data being posted and convert such different combinations into the proper code arrangements in the correct sequence to provide the different characters of the desired Teletype message.

With reference to Fig. 5A, it can be seen that the flight number buses from the flight number dials FN—1 and FN—2 (see Fig. 3A) terminate in suitable flight code forming relays, of which the time relays 0—FC, 1—FC and 2—FC are shown for the tens digit flight number, and these relays are assumed to be typical of a similar group of relays and contact selections for the unit digit of flight number, so that the relays for such unit digit have not been shown but have been merely indicated by a dotted rectangle with suitable legends.

Referring to Fig. 5B it will be seen that the scheduled time and altitude buses for group 1 and group 2 are interconnected through back contacts of the coupling relays CPR. The tens-of-hours time buses 1ST—1 and 2ST—1 are shown interconnected through back contacts of the coupling relay CPR to suitable tens of hours digit relays 0—TH, 1—TH, and 2—TH. This group of relays and connections are assumed to be typical of the various other digits of scheduled time which are not shown.

In a similar way the altitude buses 1SA and 2SA are interconnected through back contacts of the coupling relays CPR to altitude coding relays 2—AL, 3—AL, 4—AL, etc.

The scanners TSC—1 and TSC—2 are assumed to be of the usual type having an operating magnet designated by suitable legends which when energized prepares the scanner contact arms for operation by a biasing spring as soon as it is deenergized. Each of the scanners is provided with five contact arms, besides the usual driving or control arm and certain auxiliary arms, which five contact arms 1 to 5 correspond with the five elements of the conventional Baudot code used for Teletype operation. These five arms of each scanner connects with a contact in each of the scanner's positions, and these contacts have buses connected thereto in such a way that the buses for the five contacts for the second position of scanner TSC—1, for example, form a group of five buses which is governed in accordance with the condition of energization of the posting relay PSTR and the cancellation relay WOR. In a similar way the buses from the third position of the five arms of the scanner TSC—1 form a group of buses which are governed in accordance with the flight number coding relays 0—FC, 1—FC and 2—FC. In a similar way these various sets of five buses for the several positions of each scanner are controlled by relays or direct circuit connections to make up the particular code combination to be transmitted.

In other words, each position of the scanner arms corresponds to a code combination provided for transmission over the Teletype system, and the combination in which these contacts are supplied with energy determines this particular code, and in this way with each position of the scanner provided with distinctive energizations of these contacts in accordance with the particular digit of the flight number time or other character of the code to be transmitted, the various combinations of the entire message are caused to be transmitted in a particular sequence. The codes for shift to numbers and letters, for spaces, for the end-of-message, and for other characters desirable for a printed record, are determined by permanent energy connections to the appropriate position contacts of the scanner arms.

Figs. 6 and 7 illustrate typical clearance and cancellation messages, and indicate what message characters are transmitted for the different positions of the scanner for the message arrangement assumed. The clearance and cancellation messages are distinguished from each other by symbols arbitrarily chosen and transmitted at the beginning of the message in response to the condition of the system when the posting relay PSTR or the wipe-out relay WOR are energized. For example, the English pounds symbol (£) has been selected for the flight plan symbol, and the dollars sign ($) has been used for the cancellation symbol.

With reference to Fig. 5A, it will be seen that the picking up of the relay PSTR, or the picking up of the relay WOR supplies positive energy (+) through front contact 350, or through back contact 350 and front contact 351 respectively to the initial or zero position of the driving arm of the flight scanner TSC—1 to energize the operating magnet of that scanner for initiating operation. After the flight scanner TSC—1 steps to the first position, it then receives positive energy directly from a contact closed in that position and on each successive position until it reaches the fifth position which is maintained deenergized by reason of open back contact 350 or 351 of the posting relay PSTR or the cancellation relay WOR then energized. Thus, the first four characters of the message are transmitted by the flight scanner TSC—1 which then holds or stops in the fifth position in which energy is then supplied through arm 352, wire 353, through front contact of the particular fix identifying relay then picked up, such as front contact 354 of relay AP, or the front contact 355 of the cancellation relay WOR, as the case may be, to wire 356 which supplies energy to the operating magnet of the schedule scanner TSC—2 in the initial position 0. It is of course understood that a fix identifying relay is picked up if a posting operation is in progress, while the relay WOR is picked up if the operation of the system is for cancellation of a schedule. This initiates the schedule scanner TSC—2 which then receives energy directly through its driving arm contacts so as to operate in succession through the various positions of the scanner up to the position 11 where it stops and holds until the fix repeating relays AP, BP, etc. or the cancellation relay WOR is deenergized at the end of the operation.

If it is a schedule posting operation that is in progress and the transmitter is effective to convert into code the condition of the buses under such operation, then the arm 351 of the schedule scanner closes a circuit from (+) to contact 314 in position 11, to master bus 315 so that as soon as the indicators of the particular posting space then being positioned have come into correspondence with the indicators of the check display, this (—) energy connection can cause the space relay, such as ISP, for that space to be shunted and released as previously described, which in turn releases the fix repeating relay, such as relay AP, followed by the release of the posting relay PSTR. This causes the restoration of the system to normal conditions in a manner that will be described more in detail presently.

In brief, the operation of the schedule transmitter occurs during the posting time (or during the cancelling operation time) and it is desirable that a panel repeater relay, such as relay AP, should not drop to deenergize the buses or pass on the chain-stitch circuit to the next fixed panel for the posting operation at that panel, until the schedule scanner has completed its operation. Accordingly, the connection of the (—) terminal to provide a shunting of the space relay ISP, for example, and the consequent release of its panel repeater relay, such as AP, for example, when the indicators of the associated space are properly positioned, is derived from a master bus connected to (—) through contact 314 only when this scanner is in its last active holding position or is in its normal position. The normal position supplies this negative energy so as to provide proper operation of the space relays such as ISP during automatic wipe-out operations in connection with over-time posting, as will be described later.

In this way, the schedule transmitter and the posting apparatus is co-ordinated so that either finishing its operation first is held in a holding position until the other has completed its operation and is ready to be restored to a normal condition.

The five code buses connected to the arms of these transmitting scanners TSC—1 and TSC—2 may act directly on a transmitter of the usual stop-start type for transmission to local or distant printers at the rate determined by the operating rate of the scanners. If, however, the line facilities over which such clearance and cancellation messages are transmitted to distant points are also intended to be used for other purposes, such as transmission of weather reports and the like, the code buses from these scanners are preferably used to actuate a tape perforator so as to register and store the desired message as and when the posting or cancellation operations occur ready for transmission when the line facilities are free. This has been indicated diagrammatically in Fig. 5A by a dotted line rectangle 580 having a suitable legend indicating that the apparatus can be either a "transmitter" or can be a combined "perforator and transmitter."

The operation of these scanners will now be considered somewhat more in detail considering the transmission of a typical flight plan with reference to Fig. 6. Assuming the flight plan or schedule to have been properly set up in the check display with the conflict detecting completed, the posting relay PSTR is picked up which supplies energy to the operating magnet of the flight scanner TSC—1 to operate the arms of such scanner to position 1. From Fig. 6, it can be seen that the flight scanner TSC—1 causes a "no shift" code to be transmitted. For this reason, the message arms 1, 2, 4 and 5 supply positive energy directly to the corresponding wires 1, 2, 4 and 5 of the transmitter or combined perforator and transmitter so as to create the numbers shift symbol. The driving arm of scanner TSC—1 arriving in position 1 receives positive energy directly to energize the operating magnet to move the arms of the scanner to position 2. Front contacts 383 and 384 of relay PSTR are closed, so that the message arms 3 and 5 supply energy to the corresponding wires leading to the transmitter or perforator-transmitter to create the flight plan symbol which, merely for convenience in illustration, is shown as the English pounds symbol £.

The operating magnet again receives energy in position 2 to move the arms to position 3 where the contacts of the message arms are energized selectively in accordance with the particular flight number coding relay FC of the tens digit then picked up. For example, if the flight number is 22, then the bus 2 from the flight number dial FN—1 is energized to pick up relay 2—FC which in turn energizes the buses for position 3 of the corresponding arms of the scanner. This selective energization is in accordance with the conventional well-known Baudot code; namely, for a zero it is the energization of buses 2, 3 and 5; for a figure 1 it is the energization of buses 1, 2, 3 and 5; and so forth for each of the numerals. In a similar way, the flight scanner TSC—1 steps to each of its positions and energizes the "message buses 1, 2, 3, 4 and 5" in combination depending upon the different bus energizations provided by the flight number, which in some cases may have several digits only two being shown for the sake of simplicity.

On the last position of the scanner for flight number, shown as position 4 for the flight scanner TSC—1, energy is supplied to the operating magnet to move the arms to position 5, where there is no energy supplied to the operating magnet because relay PSTR is picked up and back contact 350 is open.

In the position 5 of the transmitting flight number scanner TSC—1, energy (+) is supplied through contact 352, wire 353, front contact of the fix identifying relay for the particular fix panel at which the posting is then occurring, such as through a front contact 354 of the relay AP, wire 356, to the operating magnet of the schedule scanner TSC—2 in the position 0. This initiates operation of scanner TSC—2 and moves the scanner arms to position 1 in which the message buses are energized in accordance with the letter shift code combination which, as ordinarily used in a teletype system, provides for the energization of all five "message buses 1, 2, 3, 4 and 5." The schedule scanner TSC—2 is then operated to the position 2 in which a space code combination is inserted into the message by the energization of bus 3, and then the scanner is operated to position 3.

In this third position of the schedule scanner TSC—2, the message buses are energized in accordance with a combination corresponding to the fix identification, such as the letter A for fix A, the letter B for fix B, etc., but in practice probably a combination of letters would be used, such as LG for La Guardia. This would require that two or more positions would be provided on the schedule scanner TSC—2 for such fix identification and the contacts of each such position would be controlled by the same fix identification relays, such as relays AP, BP, CP, etc. Considering that the posting operation assumed is occurring at panel A, then the relay AP energizes message buses 1 and 2 through front contacts 358 and 359.

After the fix identification (see Fig. 6), it is necessary to shift to numbers so that position 4 of the schedule scanner TSC—2 causes the message buses 1, 2, 4 and 5 to be energized in accordance with the numbers shift code combination.

The schedule scanner TSC—2 is of course operating at its regular rate from position to position, and the positions 5, 6, 7 and 8 have their respective contacts controlled in accordance with the particular number for the corresponding digit of schedule time so as to properly energize the message buses. For example, the contacts of the arms 1 to 5 of scanner TSC—2 are selectively energized when in position 5 in accordance with the particular relay TH for the tens-of-hours digit which is then energized from the buses 1ST—1 and 2ST—1 for the panels belonging to groups 1 and 2. In the typical message, the tens-of-hours digit is 0 indicated so that relay 0—TH is assumed to be picked up closing front contacts 360, 361 and 362 to energize the message buses 2, 3 and 5 for this fifth position of the schedule scanner TSC—2. The contacts for positions 6, 7 and 8 of the scanner TSC—2 are similarly controlled in accordance with the unit hours, tens of minutes, and unit minutes respectively, but their control has not been shown for the sake of simplicity in the drawings.

Referring to Fig. 6 it can be seen that the "space" code combination is transmitted for position 9 of the schedule scanner TSC—2 in a manner readily understood from the explanation of the transmission of a space code combination for position 2 of this scanner.

The position 10 of the scanner TSC—2 is allocated to the transmission of a code combination selected by the altitude bus repeating relays 2—AL, 3—AL, etc. These relays are governed by the buses 1SA and 2SA from the panels belonging to groups 1 and 2 which sets of buses have corresponding buses for the two groups connected together through back contacts of the coupling relays CPR. If the relay 2—AL is picked up, for example, then the message buses 1, 2 and 5 are energized, but if the relay 5—AL is picked up only the message bus 5 is energized. These selective energizations of the message buses are of course made in accordance with the usual Teletype code arrangement.

The operating magnet of the schedule scanner TSC—2 after a proper interval moves the arms of the schedule scanner TSC—2 to the position 11, in which it is held until the posting circuits and apparatus for the panel where the posting operation is taking place are restored to their normal conditions. As previously mentioned, contact arm 357 in position 11 applies (—) energy to bus 315 so that the space relay, such as relay 1—SP, and its associated fix relays, such as relay AP, can be dropped away when the indicators of the space where the posting is taking place, have assumed their proper positions.

It will be noted that the flight scanner TSC—1 and a schedule scanner TSC—2 are employed so that the flight number may be transmitted only once, while the fix identification, schedule time, and altitude may be transmitted repeatedly by the schedule scanner for as many fixes as may be involved in a route or flight plan. With reference to Fig. 4, it will be seen that the posting relay PSTR does not drop away until the complete flight plan or schedule set up in the various check display units has been posted, so that when the schedule scanner TSC—2 reaches the position 11 energy is supplied to cause the space relay for the particular fix at which the posting is then occurring, to be dropped away which in turn causes the fix identifying relay to drop away. This causes the schedule scanner TSC—2 to receive energy from (+), through a circuit including back contact 363 of cancelling relay WOR, wire 365, back contacts 366, 367, 368, 369, etc. of each of the fix identifying relays, to position 11 of the driving arm of the schedule scanner TSC—2 through the operating magnet to (—). This causes the schedule scanner TSC—2 to be restored to its normal position in which it would remain if it were the end of the posting relay PSTR, would then drop away and cause the "end of message" symbol to be transmitted by the light scanner TSC—1, but the posting relay PSTR may remain up due to the fact that a part of the schedule may still have to be posted in another panel so that the picking up of the next panel relay, such as relay BP, starts the schedule scanner TSC—2 on another cycle of operation in which the fix, identification, time, altitude, etc., are transmitted as posted in such another panel, and this operation occurs repeatedly until all of the schedule for the proposed flight has been posted. Since the posting of a schedule in the different fix panels takes place in an order corresponding to the direction of the flight, and likewise since the transmitting of the different portions of the schedule occurs in the same order as the posting operation, it is apparent that the clearance message transmitted is in a proper order for a pilot to follow and it is not necessary to specify the direction of the flight in the clearance message.

When the posting has been effected at the last fix panel and the schedule transmitter TSC—2 has operated to transmit the message, as above described, then the schedule scanner TSC—2 assumes the normal position and the dropping of the relay PSTR completes a circuit from (+), through back contact 350 of relay PSTR, back contact 351 of relay WOR to the operating magnet of the flight number scanner TSC—1, thus causing it to operate to position 6 in which the arm 2 causes the message bus 2 to be energized and effect the transmission and/or perforation of an end-of-message symbol, such as a period (.). The driving arm of scanner TSC—1 receives energy directly in position 6 so that this flight number scanner is restored to the normal position in which it remains until another posting or cancelling operation is initiated.

A similar operation takes place when the flight controller performs a cancellation operation. Such a cancellation operation will be later described in detail with reference to Figs. 3A, 3B and 3C, but it is sufficient for an understanding of the operation of the code transmitter of Figs. 5A and 5B to know that for such cancellation operation the operator actuates a flight tracing key FT which causes relay FTR (see Fig. 3A)

to be picked up and also results in the lighting of a schedule tracing lamp STL opposite the space of each panel where data is displayed for the flight having its identifying number set up on the dials TFN—1 and TFN—2 (see Figs. 2 and 3A). The operator selects the particular fix at which the cancellation is to take place by setting the fix selecting dials FS (see Figs. 2 and 3A) and then he actuates the schedule cancelling button SCB. The actuation of this button SCB energizes the cancelling relay WOR (see Fig. 5A) from (+), through front contact 370 of relay FTR, back contact 371 of button SCB in an actuated position, windings of relay WOR, to (—). As soon as the relay WOR picks up, a stick circuit is closed from (+), through front contact 374 of relay WOR, back contact 373 of relay WORP, front contact 372 of relay WOR, windings of relay WOR, to (—).

The picking up of the relay WOR closes front contact 351 to initiate the operation of the flight number scanner TSC—1 as previously described. In position 1 of this scanner TSC—1 the message buses are energized with the numbers shift code combination in the same way as for the transmission of a clearance message (compare Figs. 6 and 7), but with reference to Fig. 7 it will be seen that in position 2 a cancellation symbol ($) is transmitted instead of the flight plan symbol (£). This is accomplished because in position 2 of the flight number scanner TSC—1, the message buses 1 and 4 are energized with the relay WOR picked up closing front contacts 375 and 376. The scanner TSC—1 continues to operate through its various positions to transmit the flight number as previously described and when it reaches the position number 5 it is held in the same way. In this position 5 the arm 352 of the scanner TSC—1 closes the circuit through front contact 355 of relay WOR, and wire 356 to initiate the schedule scanner TSC—2. This schedule scanner TSC—2 is initiated and operates through its various positions in the same way as previously described, but with reference to Fig. 7 it will be noted that no time or altitude is transmitted, and this is because the relays, such as relays 0—TH, 1—TH, etc., for the time buses and the relays, such as relays 2—AL, 3—AL, etc., for the altitude buses are deenergized. Thus, the message buses are not energized in positions 5, 6, 7, 8 and 10 of the schedule scanner TSC—2 during such an operation.

Since a cancellation operation can be performed by the operator for only one fix panel at a time, when the schedule scanner TSC—1 reaches the position 11, a circuit is closed to energize relay WORP through front contact 363 of relay WOR, windings of relay WORP, wire 377, contact arm 378 of schedule scanner TSC—2 in the position 11, to (—). The picking up of this relay WORP opens its back contact 382 to remove energy from the flight number buses as supplied through the flight number dials TFN—1 and TFN—2 so as to permit the corresponding indicators of the selected fix to be restored to their blank positions which is effected by the momentary energization of the associated space relay. For example, the closure of front contact 379 of relay WORP, supplies energy through the fix selector dial FS to a wire belonging to the selected fix, such as wire 380 for fix A, which then supplies energy through a front contact of the flight verification relay for the space having the flight number corresponding to the one set up on the dials FN—1 and FN—2, as for example, front contact 381 of relay 1FV for the first space of panel A, to the upper winding of the relay 1SP for the space, to (—).

It will be noted that the picking up of the relay WORP opens its back contact 373 deenergizing the relay WOR, which is slow in releasing but after a time opens its front contact 373 so that the relay WORP is also deenergized. This removes energy from the relay 1SP so that it can drop away as soon as all of the indicators of its corresponding space have assumed their blank positions. When such blank positions have been assumed, the space relay, such as relay 1SP, is deenergized, and the space repeating relay, such as relay AP, is also deenergized. A circuit is then closed through back contact 363 of relay WOR for causing the schedule scanner TSC—2 to be restored to its normal position. Also, the dropping of the relay WOR and the closure of its back contact 351 causes the flight number scanner TSC—1 to be operated to position 6 in which the "end-of-message" code combination is applied to the message buses, as previously described, and then the flight number scanner TSC—1 operates automatically to its normal position. It is thus seen that the same positive operation is provided between the different panels and this transmitting apparatus for both the transmission of a clearance message and the transmission of a cancellation message.

The circuits here described with respect to the control of the relay WOR and the relay WORP are provided when this automatic code transmitter is employed, but if such transmitter is not employed, then the relay WORP is omitted and the relay WOR effects the cancellation of a posting by circuits shown in Figs. 3A, 3B and 3C as will be later described.

*Flight tracing.*—When a flight is to pass through several different fixes, the data for its schedule is posted for the different fixes in the different spaces of the respective fix panels, and the operator may desire to have these postings distinctively displayed so that he may readily identify the schedule postings for such a flight. This is accomplished in the present system by the provision of flight number dials TFN—1 and TFN—2 (shown to the right of the control panel in Fig. 2), which may be actuated to positions corresponding to the flight number identifying the flight in question, followed by the actuation of a flight tracing key FT (see the control panel of Fig. 2 and also the lower left of Fig. 3A). The operation of the flight tracing key FT energizes the flight tracing relay FTR providing that there is no conflict detection, posting, or over-time posting operation in progress. More specifically, the actuation of the flight tracing key FT closes a circuit for relay FTR from (+), through a circuit including back contact 415 of relay HO, back contact 416 of relay OTR, back contact 417 of relay CDR, actuated contact 418 of key FT, windings of relay FTR, to (—).

Figure 11:
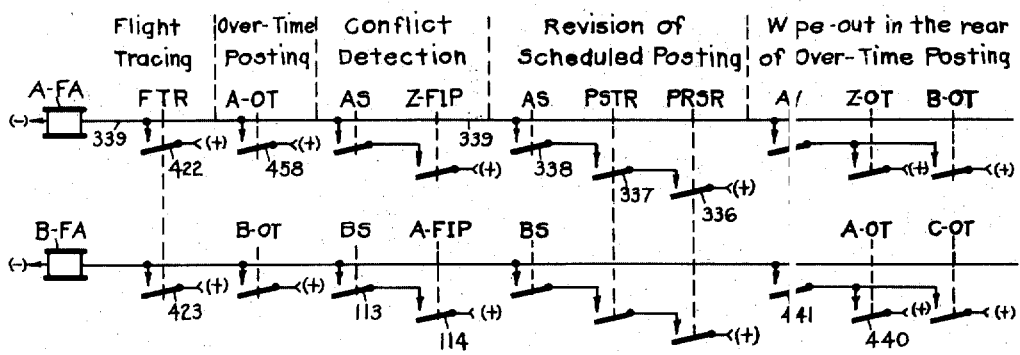
Fig. 11 shows in written circuit form the circuits for the relays FA for a plurality of fix panels.

The picking up of the relay FTR closes front contacts 419 and 420 which causes negative potential (—) to be applied through back contact 421 of relay WOR to the flight number buses in accordance with the positions of the flight number dials TFN—1 and TFN—2 which negative potential causes the correspondence relays FCR—1 and FCR—2 to be energized for the particular space of each fix panel in which that flight number is posted. This is accomplished because the picking up of the flight tracing relay FTR closes a group of front contacts, one for each fix panel, which energizes the FA relay for all the fix panels. For example, the relay A—FA of Figs. 3A and 11 is energized through front contact 422 of relay FTR; (see Fig. 11) relay B—FA is energized through front contact 423; and similarly each of the relays FA is picked up. Thus, front contact 130 of relay A—FA (see Fig. 3A) applies positive energy through back contact 131 of relay ISP to the left-hand side of the correspondence relay IFCR—I, and a similar contact on relay A—FA and associated circuit is provided for each space of corresponding fix panel A. Thus, the negative energy (—) applied to the selected master flight number buses by the flight number dials TFN—I and TFN—2 is then effective to pick up the correspondence relays for the particular space in which that flight number is posted. The picking up of the correspondence relays for any given space of a panel causes the flight verification relay FV for that space to be energized. With reference to Fig. 3A, it can be seen that the relay IFV has an energizing circuit including front contacts 133 and 134 of relays IFCR—2 and IFCR—I respectively.

When the relay IFV is picked up closing front contact 222, its associated lamp ISTL is energized from panel bus 221, which receives energy from the master bus 219, through front contact 427 of relay A—FA. The master bus 219 is supplied with (+) energy through front contact 428 of relay FTR and front contact 218 of timing magnet TM. A panel bus similar to bus 221 is thus energized for all fix panels because all FA relays are picked up. This of course causes a lamp STL to be lighted for each fix panel where the flight number in question is posted so that the operator can readily trace the desired flight.

It is noted that the picking up of the relay A—FA completes a circuit from a bus 426 supplied with (+), through a front contact 428 of relay FTR, and a front contact 218 of the timing relay TM to energize the lamps of the fix panels. These circuits are thus controlled so that (+) energy may be placed upon these lamps STL either during flight tracing or during conflict detection when a conflict occurs and the timing relay TM is released closing back contact 218.

The difference between these two conditions is that during the flight tracing operation by the operator a lamp STL is lighted at the space on each fix panel where the designated flight number appears; while, during the conflict detection operation when a condition of conflict occurs, a lamp STL is only lighted for that space of a fix panel which is then selected by the conflict scanner for that panel, and for that space of the next adjacent panel having the same flight number posted thereon.

It will therefore be apparent, that this manually controlled flight tracing feature is not essential for conflict detection purposes, since such conflict detection and the indication of conflicts is automatically accomplished, but is useful more particularly in connection with the cancellation of schedules, as will be presently described.

*Schedule cancellation.*—It may happen that a flight controller will for some reason, such as weather conditions, or other conditions involving a particular flight, want to cancel the schedule for that flight beyond a particular fix. Before doing this he will want to ascertain what fixes are involved in the complete schedule of that flight, which he can conveniently do by using the flight tracing key FT to locate the postings involved in that schedule. The system, as proposed, provides facilities for cancelling the postings of a scheduled flight, one fix at a time, in such a manner as to tend to avoid the accidental cancellation of postings for fixes desired to be maintained in the schedule.

This manual cancellation of a posting is accomplished by first tracing the flight by the actuation of the flight tracing key FT and then positioning a fix selector dial FS to a position corresponding to that fix at which the posting is to be cancelled followed by the actuation of the cancellation button SCB. This actuation of the cancellation button SCB energizes the relay WOR by a pick-up circuit including front contact 370 of relay FTR and contact 371 of SCB in an actuated position. The picking up of the relay WOR and closure of front contact 429 while the button SCB is actuated closing contact 430, renders effective the fix selector dial to energize a cancellation or wipe-out bus for the selected fix, such as bus 380 for fix A, for picking up the space relay for the particular posting space of that selected fix having its flight verification relay FV picked up, as for example, relay IFV closing front contact 381 to energize relay ISP. Relay IFV, for example, is picked up in a manner above pointed out in connection with flight tracing.

As soon as the space relay, such as ISP, is picked up, its associated space repeating relay, such as relay AP, for its fix panel is picked up and applies (+) energy through its front contact 431 to master 432 supplying energy to a holding stick circuit for the relay WOR including front contact 372. The energization of bus 432 is continued until all of the indicators for the corresponding fix posting space assume the blank position to shunt the space relay ISP and drop the fix repeating relay AP, as will presently be described.

It should be noted that the picking up of the relay WOR opens back contact 421 to cut off the supply of negative energy (—) as selectively applied to the flight number buses through the flight number dials TFN—I and TFN—2. The various sets of buses for all the other indicators are also deenergized as will be apparent because the posting relay PSTR is deenergized opening front contact 267. The picking up of the space relay ISP, closes front contact 283 so that the operating magnets OM of all the indicators of the space start the operation of the indicators which cannot stop at an active position because the buses are all deenergized as above mentioned. However, the blank position of all the indicators of this space have (—) energy applied to their contacts while the associated space relay ISP is picked up closing front contact 284 by reason of the fact that the bus 285 is energized with negative potential (—) through back contact 286 of the posting relay PSTR.

When each indicator reaches its blank position, its correspondence relay is picked up by negative energy received over the blank position bus. It may be noted that positive energy is applied to the left-hand terminals of the correspondence relays IFCR-I and IFCR-2 through front contacts 131 and 287 of relay ISP. Also, while the relay ISP is picked up, front contact 288 is closed energizing the relay IFV, so that the correspondence relays of the other indicators of this space also have positive energy (+) applied to their left-hand terminals as will be obvious from the drawings.

When all of the indicators have picked up their correspondence relays, the circuit previously pointed out as including front contacts of each of the correspondence relays of the space, effects the shunting of the lower stick winding of the relay ISP which causes it to release and in turn releases the relay AP, which of course restores the relay WOR to a deenergized condition by reason of the opening of front contact 431. In this way, the indicators of any space are caused to assume the blank positions in which positions their correspondence relays are picked up to effect the shunting of the associated space relay and the consequent dropping away of the space repeating relay, such as relay AP. The dropping of the cancellation relay WOR of course restores the apparatus to its normal condition, so far as the cancellation operation is concerned. If no other portion of the schedule is to be cancelled, the operator restores the key FT to its normal inactive positions.

The actuation of the schedule cancelling button SCB may be momentary, but in any event it must be sufficiently long to cause the picking up of the space relay, such as relay ISP, following the picking up of the relay WOR. The picking up of the relay WOR opens back contact 421, as above described, to allow the flight number indicators to be restored to their blank positions. Thus, the relay WOR is made slow releasing so as to give these indicators time to assume their blank positions even though the button SCB is immediately released after the picking up of the relay ISP, for example.

If desired, the flight number dials TFN—1 and TFN—2 may be provided with lock and release magnets the same as the other dials on the control panel. As shown in Fig. 3A the actuation of the cancelling button SCB closes back contact 432 and energizes the associated lock magnets TRLK of these flight number dials, so that they cannot be moved inadvertently to different positions while the cancellation operation is being performed. When the button SCB is released, then a circuit is closed for the release magnets of these dials from (+), through front contact 433 of push button SCB, front contact 434 of relay WOR, to the release magnets TRRM of the flight number dials TFN—1 and TFN—2. This circuit is of course maintained energized only during the release period of the relay WOR. This organization provides that the flight number dials are restored to their blank position, and must be positively set before another flight tracing or flight cancellation operation can be performed.

It has been pointed out above how the system may have an automatic schedule transmitter and recording printer applied thereto as shown in Figs. 5A and 5B. The disclosure of Fig. 3A shows how the system may operate without the schedule code transmitter and recording printer, but it is to be understood that this has been done merely to facilitate in the disclosure, and the preferred form of the invention is that in which the system is provided with the automatic transmitter and printing recorder. Therefore, as previously described the apparatus of Figs. 5A and 5B are adapted for use with Figs. 3A, 3B and 3C by the following changes: the back contact 421 of the relay WOR in Fig. 3A is replaced by back contact 382 of the relay WORP of Fig. 11A, and front contact 379 of relay WORP replaces contacts 429 and 430 of relay WOR and button SCB, respectively.

*Over-time posting and automatic wipe-out in the rear.*—As a plane proceeds over an airway in accordance with a posted schedule, it is desirable that the pilot report the time at which he passes over each of the successive fixes or locations included in the flight plan or schedule that he is following. This so-called over-time report may be made via radio directly from the pilot to an over-time receiving operator in the central office, or it may be relayed by radio to a ground station and then transmitted by telephone or teletype communicating means to an over-time operator in the central office. The particular method of communication may be of any suitable character, one important feature being that the over-time reports may be received by a separate over-time operator and properly posted on the flight progress board adjacent the schedule time for the corresponding fix for the over-time just reported, and then the posting of such an over-time report is employed to automatically wipe-out or cancel the schedule postings for that flight at the fix or fixes in the rear. In this way the operator is advised as to the relative location of a plane because the fix location just passed has an over-time report associated with the schedule as posted on the corresponding fix panel while the plane is proceeding to the next fix in advance. These overtime reports serve as a basis for the control or flight operator to follow the progress of a plane, and in the event of undue variance from the schedule time to effect a revision of the schedule for the fixes in advance of the plane so as to provide a proper basis upon which further advance planning can be based. These over-time reports also provide a record of actual performance which may be used for calculating newly proposed schedules, so that the operator may more accurately schedule future flights travelling over the same airways within a reasonable length of time. As above mentioned, the automatic wipe-out of schedule postings in the rear of the fix last having an over-time report, relieves the operator of manually performing this function and provides that the fix panels of the progress board are maintained at their highest efficiency for accommodating a large number of flight schedules.

In the system of the present invention, the posting of over-time reports is organized so as to take place at a time when conflict detection and posting operation is not in progress; and similarly, if the over-time posting operation is in progress, an interlock is provided so that schedule postings and conflict detection cannot occur. However, it should be understood that this is due to the fact that the same set of position contacts are used on the schedule posting indicators for flight and altitude verification purposes in connection with over-time postings as are used for schedule posting, but if desired separate position contacts on the indicators may be employed together with duplicate correspondence relays so that the over-time posting operation may be going on at the same time as an operation for schedule posting, conflict detection, and the like. However, a short delay in posting over-time reports due to a conflict detection or posting operation in progress does not detract from the usefulness and purposes above pointed out for automatically posting over-time reports.

As shown in Figs. 3A, 3B and 3C, it is assumed that the over-time will be posted by a separate operator acting upon reports received by Teletype or over the radio; but as later pointed out, such over-time posting may be accomplished entirely automatically in response to Teletype messages. The over-time operator is preferably provided with a separate control panel having a group of setting dials including flight number dials OFN—1 and OFN—2, fix selector dial OFS, over-time dials OT—1 and OT—2, and an altitude dial O—ALT.

After the operator has set up the reported flight number, fix, altitude, and over-time on his setting dials provided for this purpose, he actuates the over-time relay OTR from (+), through a circuit including back contact 450 of relay HO, back contact 451 of relay CDR, actuated contacts 452 of over-time button OTB, windings of the over-time relay OTR, to (—). When relay OTR is picked up, it closes front contact 454 to complete a stick circuit including normally closed contacts 453 of the over-time button OTB as well as back contact 450 of relay HO. These contacts 453 may be opened by pulling outwardly the button OTB and thus manually release the over-time relay OTR, if an error has been made in positioning the setting dials.

This picking up of the relay OTR sets the system into operation to automatically locate the posting for the reported flight fix panel by flight number correspondence and to cause the altitude verification relay AV to be energized, if the reported and posted altitudes match, whereupon the over-time indicators for the corresponding space are operated to positions corresponding with the over-time dials OT—1 and OT—2 set by the operator.

While this over-time posting operation is occurring, the spaces containing the schedule posting for the same flight number in the panels to the right and to the left of the panel in question are located by the energization of their flight verification relays FV; and when the over-time indicators are fully set and the relay OTR is released to deenergize the buses for flight number, altitude, etc., current is supplied to direction indicator repeater relays for the panel in question where the over-time has just been posted, which in turn feeds current to the wipe-out bus for the particular panel constituting the fix in the rear. The energization of this wipe-out bus for the fix panel in the rear acts to pick up the space relays SP and OSP for the space of that panel having its flight verification relay FV energized, thereby initiating all of the indicators of this space into operation for restoration to their blank positions.

In the arrangement disclosed in Figs. 3A, 3B and 3C (also shown in Fig. 14), the posting of an over-time is effective to cause an automatic wipe-out only for the next panel in the rear and only provided an over-time has been posted for that flight in such panel in the rear. Such an organization affords a desirable check upon the transmission and posting of over-times, since an over-time must be properly reported and posted for a fix before a wipe-out operation can automatically occur at that fix panel.

More specifically, the picking up of the over-time relay OTR and closure of its front contact 455 immediately completes a circuit for picking up the relay identifying the fix, such as relay A—OT, as selected by the fix selecting dial OFS. At the same time the relay OTR closes front contacts 456 and 457 to place negative energy (—) on the flight number buses for the flight in question as set up on the over-time flight number dials OFN—1 and OFN—2, but this negative energy on the flight number buses cannot be effective until an associated FA relay is picked up for the fix panel in question. This is accomplished by the energization of bus 339 for the relay A—FA through a front contact 458 of the relay A—OT.

As soon as the relay A—FA picks up, positive energy (+) is applied to the left-hand terminals of the correspondence relays for the first digit of flight number for all the spaces of the entire panel, so that each correspondence relay, such as relay 1FCR—1, can be picked up providing the associated indicator is in a position corresponding to the first digit of flight number set up by the over-time operator on the flight number dial OFN—1. The picking up of the relay 1FCR—1 for example, closes front contact 132 and applies energy (+) to the left-hand terminal of the associated correspondence relay 1FCR—2 for the second digit and this relay is energized if it is in a position corresponding to the second digit of the flight number as set up by the over-time operator on the dial OFN—2. The picking up of the relays 1FCR—1 and 1FCR—2 closes front contacts 133 and 134 respectively, and energizes the associated flight verification relay 1FV which picks up and applies positive energy (+) to the left-hand terminals of the CR relays for the time and altitude indicators but applies negative potential (—) to the left-hand terminal of the CR relay for the direction indicator, this negative potential (—) being selected because the space relay 1SP is deenergized, closing back contact 138. The positive energy (+) applies to the altitude indicator contact arm through relay 1ALCR flows over the altitude bus in accordance with the position of the indicator, and if its position corresponds to the setting on the altitude dial O—ALT, then current flows through one winding or the other of the relay AV, front contact 460 of relay OTR, and back contact 461 of the landing relay LDR, to (—). It is noted that there are two contact arms which are positioned by the altitude dial O—ALT, one arm for connection to the altitude buses for the group 1 panels and the other arm for the group 2 panels, and these two groups of buses are maintained isolated by the provision of a double wound relay AV.

The picking up of the relay AV closes front contact 463 and completes a circuit for relay 1—OSP from (+), through a circuit including a resistor 459, back contact 462 of relay HO, front contact 463 of relay AV, back contact 464 of relay OTP, to the master over-time posting bus 465, front contact 466 of relay A—OT, to the over-time posting bus 467 for the fix panel A, front contact 468 of the particular flight verification relay 1FV, wire 469, to the lower winding of the relay 1—OSP, to (—).

The picking up of this over-time space relay 1—OSP sets the over-time indicators into operation by the application of pulsing energy through front contact 470 to the operating magnets OM for the respective indicators. With front contacts 471 and 472 of relays 1—OSP closed applying positive potential on the left-hand terminals of relays 1—OTCR—1 and 1—OTCR—2, the indicators operate to positions corresponding with the setting of the over-time dials OT—1 and OT—2 because negative energy (—) is placed on the over-time buses in accordance with the positions of these dials from (—), through back contact 461 of relay LDK, and front contacts 473 and 474 of the relay OTR for the respective digits of over-time.

As soon as the relay 1—OSP is picked up, a circuit is closed for the energization of the over-time repeating relay OTP in series with the lower winding of relay 1—OSP and in multiple with the resistor 459 from (+), through the winding of relay OTP, master bus 475, bus 476 for panel A, front contacts 477 and 478 of relay 1—OSP, lower winding of relay 1—OSP, to (—). The picking up of relay OTP opens back contact 464 and thus opens the pick-up circuit of the relay 1—OSP. Also, the picking up of relay OTP completes a pick-up circuit for the relay HO through front contact 479. The picking up of the relay HO creates another break in the pick-up circuit of the relay 1—OSP at back contact 462 which is maintained open until further operations in the over-time posting have been completed.

When the over-time indicators are properly positioned by the energization of their respective correspondence relays, a shunt is placed on the lower winding of the space relay 1—OSP by front contacts 480 and 481, which causes it to drop away and release the relay OTP. This indicates that the over-time has been properly posted in the space having the schedule for the flight corresponding to the flight number set up on the over-time flight number dials OFN—1 and OFN—2.

When the relay OTP picked up at the beginning of the over-time posting operation, it closed front contact 482 to maintain energy (+) on the stick circuit of relay OTR even though back contact 459 of relay HO is open as soon as relay HO picks up in response to the closure of front contact 479 of relay OTP. Also, relay HO has a stick circuit including its own front contact 483 and front contact 484 of relay OTR. This stick circuit also has supplementary energy supplied to it through front contact 485 of relay AV when it picks up for altitude verification, and also through the front contact of any relay, such as front contact 431 of relay AP, picked up during a wipe-out operation initiated by this over-time operation, as will be presently described. Thus, it can be seen that when relay OTP releases at the end of the over-time posting operation, the relay OTR is released while relay HO is still maintained energized through its stick circuit.

It should also be understood that during the over-time posting operation, the picking up of the relay AV also provides for the energization of the FA relay for the fix panels on each side of the fix involved in over-time posting, so that the flight number correspondence relays and flight verification relay FV for a particular space of such panels are picked up. For example, relay A—OT closes front contact 440 to feed positive energy (+) through front contact 441 of relay AV to pick up the relay B—FA (see Fig. 11).

At the time that the relay OTP drops away with the relay HO picked up a circuit is closed for energizing the master wipe-out bus 490 from (+), through a circuit including back contact 486 of landing relay LDR, front contact 487 of relay HO, back contact 488 of relay OTP, master wipe-out bus 490, front contact 491 of relay A—OT, for example, to the wipe-out bus extending to the right or the left panel from panel A (that is, the one to the rear) in accordance with the direction of the flight for which the over-time was being posted. This is determined by the picked up condition of the relays FFB, GR and TFB repeating the direction indicator of the selected space because at this time negative potential (—) is applied to the left-hand terminal of the relay 1DCR for the direction indicator through back contact 138 of the relay 1SP and front contact 137 of the relay 1FV which is picked up. If the scheduled flight having its over-time posted is proceeding to the right but stops or grounds at the corresponding fix A, then the relay is energized and the wipe-out energy will correspondingly be transmitted to the left through front contact 495 of relay GR; and similarly, if the flight is travelling to the right but continues past the corresponding fix A to fix B, then the relay TFB will be picked up and the wipe-out energy will be transmitted to the left through front contact 496 of relay TFB.

On the other hand, if the flight is travelling to the left from fix B to pass over or to stop at fix A, the relay FFB is picked up and front contact 497 passes energy to the wipe-out bus connected to the panel at the right.

Figure 14:
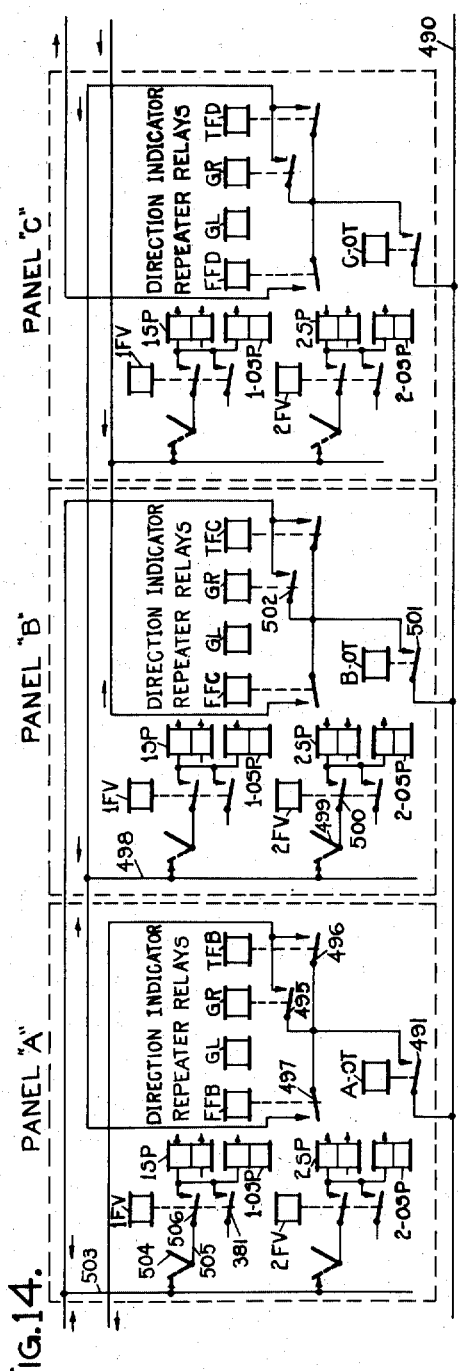
Fig. 14 illustrates the circuits for interrelating several fix panels for effecting the automatic wipe-out of the flight schedule at the next fix panel in the rear of the fix panel where an overtime report for that flight is last posted.

Assuming by way of further example, that the flight, for which the over-time has been posted at panel A, is travelling to the left from fix B, then the relay FFB is picked up closing front contact 497 to pass energy to panel B (see Fig. 14). This wipe-out energy is received at the rear panel B over the incoming wipe-out bus 498 for that panel and flows through the empty-full contact 499 of an over-time indicator for the second space (assuming that the flight in question has its schedule for fix B posted in the second space), through a front contact 400 of the relay 2FV, upper windings of the space relays 2SP and 2—OSP in multiple, to (—).

Referring to Fig. 14, the case can be considered where an over-time is being posted at panel B for a grounding flight which has come from fix A, in which case energy can flow from the master wipe-out bus 490 through front contact 501 of relay B—OT, front contact 502 of relay GR, over the wipe-out bus, to the next panel in the rear which in this case is panel A, panel wipe-out bus 503, empty-full contact 504 in a full position (see Figs. 14 and 3C), wire 505, front contact 506 of relay 1FV (see Figs. 14 and 3A, and assume the posting to be located in the first space of panel A), windings of relay 1SP and 1—OSP in multiple, to (—).

Energy flows in an automatic wipe-out circuit only during the drop away periods of the relays OTR and A—OT (or B—OT, C—OT, etc), but this time is sufficient for the picking up of the space relays SP and OSP and the closure of their stick circuits which of course includes their respective repeater relays. Assuming that the automatic wipe-out operation is taking place at panel A, then it can be seen that the closure of front contact 431 of relay AP (see Fig. 3A) in series with the stick circuit of relay 1SP, applies energy (+) to the master bus 432 which maintains relay HO picked up; while the relay OTP in series with the stick circuit of relay 1—OSP closes front contact 470 to also energize the pick-up circuit of relay HO. Thus, it will be apparent that relay HO cannot be released until all of the indicators of the space have been restored to their blank positions. For this reason, back contact 96 of relay HO can be included in the interlocking circuits to prevent the conflict detection and posting operations while it is picked up, and thus insure that no other functions of the system will take place until it has been entirely restored to normal following the posting of an over-time and the automatic wipe-out operation.

The relay OTR releases immediately upon the first release of relay OTP following the over-time posting operation, and for this reason the picking up of the relay OTP during the automatic wipe-out operation cannot effect the energization of relay OTR. Also, since relay OTR removes negative energy (—) from the over-time and altitude buses, all of the indicators of the space selected for the wipe-out operation may freely move to their blank positions with their space relays ISP and I—OSP picked up. It will be noted, that the schedule indicators have energy (—) applied to their blank position contacts because the posting relay PSTR is deenergized closing back contact 286, and the over-time indicators receive energy (—) for their blank positions from master bus 492 with front contact 493 of relay I—OSP closed, because relay OTR has been released closing back contact 494. It is noted that back contact 494 of relay OTR is open during the over-time posting operation so that the over-time indicators will not be held at their blank positions. When such blank positions are assumed by the indicators during a wipe-out operation, shunt circuits are closed which are effective in dropping the relays ISP and I—OSP as well as their repeater relays OTP and AP. Thus, the stick circuit for the relay HO is broken as well as its pick-up circuit, so that it is released marking the end of the over-time and wipe-out operation.

In the arrangement shown in Fig. 14, the wipe-out energy is applied to only the fix panel next in the rear of the panel at which the over-time is being posted, but in some cases it may happen that the over-time reports are omitted or occasionally skipped for some fixes, and this is permitted because of the characteristics of the airway and the rules applying thereto without any harmful results. If it is desired that the present system be applied to such an airway, a modified form of wipe-out bus organization is provided in Fig. 15, so that the posting of an over-time report in a particular panel will cause an automatic wipe-out operation in all panels to the rear having the same flight number regardless of the presence of an over-time posting at such panels for such flight numbers.

In this modified form of wipe-out bus organization, there are two master wipe-out buses 510 and 511 for feeding wipe-out energy to the rear, one for each direction of flight; and when a fix relay such as B—OT is energized to identify the fix where the over-time is being posted, wipe-out energy is fed over one or the other of these buses, as selected by a direction repeater relay associated with that panel, such as relays FFB, GL, GR and TFB for panel A, to all fix panels in the rear where it is effective to initiate a wipe-out operation for all postings having the same flight number. In connection with this modification, the flight number activating relays A—FA, B—FA, etc. (see Fig. 11) for all panels are picked up by the energization of the over-time posting relay OTR so that the flight number will be effective to pick up the flight verification relay FV for the particular space of each panel where such flight number is posted. Therefore, front contacts of the relay OTR replace the contacts of the relay AV and relays A—OT, B—OT, etc. of Fig. 11. Also the empty-full contacts, such as contact 504, are omitted for the reason above mentioned, that a wipe-out operation may be desired for a space having no over-time report posted in connection therewith.

Figure 15:
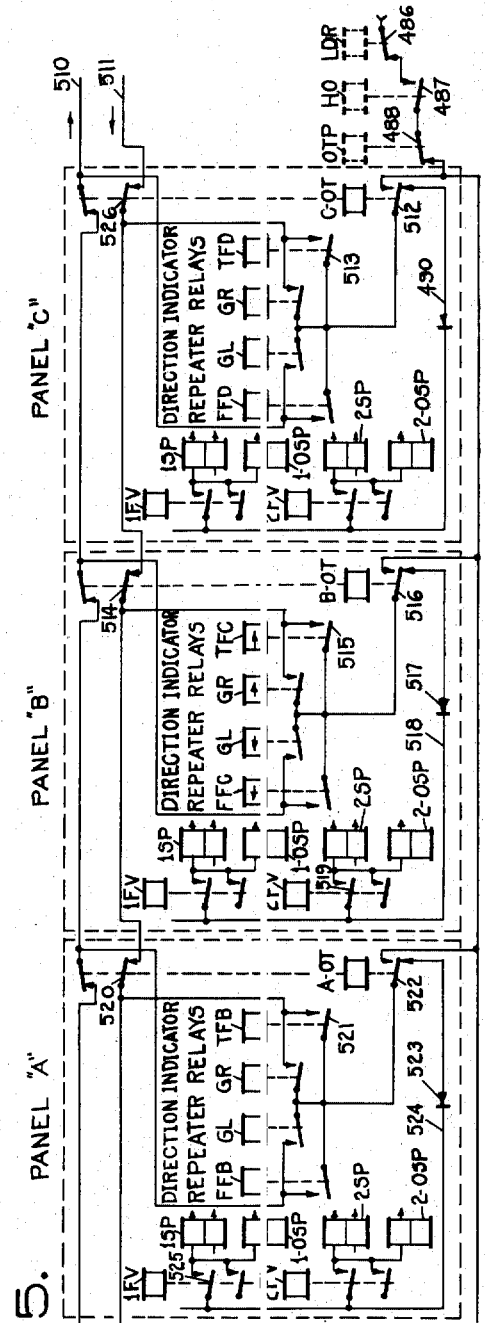
Fig. 15 illustrates a modification of circuits for interrelating several fix panels for automatic wipe-out of the flight schedule at all fix panels in the rear of the fix panel where an overtime report for that flight is last posted.

Referring to Fig. 15, let us assume that an over-time is being posted at panel C for a flight travelling to the right toward fix D (not shown) and assume such flight to have come from fix A but to have failed to report at either fix A or fix B. In such a case, relay C—OT will be picked up when the master wipe-out control bus 490 becomes energized, so that energy flows from bus 490 through front contact 512 of relay C—OT, front contact 513 of relay TFD, over master bus 511, through back contact 514 of relay B—OT, rectifier unit 517, panel bus 518, to the particular space having its flight verification relay FV picked up, such as front contact 519 of relay 2FV, windings of relays 2SP and 2—OSP in multiple, to (—). This of course initiates a wipe-out operation for the second space of panel B. Energy also flows over bus 511 through back contact 520 of relay A—OT, front contact 521 of relay TFB, back contact 522 of relay A—OT, rectifier unit 523, panel bus 524, front contact 525 of relay IFV, windings of relays ISP and I—OSP in multiple, to (—).

It will be apparent that energy can flow over buss 511 to all fix panels in the rear of panel C and wherever the same flight number is posted, a wipe-out operation will be initiated. On the other hand, energy cannot flow to any fix panels in advance of panel C because of open contact 526 of relay C—OT.

A similar operation occurs if the flight is traveling in the opposite direction, the only difference being that the relays GL are provided with front contacts so that the fix from which a flight originates can receive wipe-out energy. It will of course be apparent that energy will be applied to the wipe-out bus 510 for the opposite direction.

For the purpose of coordinating this modification with Figs. 3A, 3B and 3C, it should be understood that panel bus 524 has space wires such as wire 505 connected to it and that contact 525 of relay IFV in Fig. 15 is the same as contact 506 in Fig. 3A, these different reference characters having been applied for the purpose of clearly designating the various parts. Also, rectifier units 513, 517, etc. are used in this modification to prevent energy supplied to the space relays, such as relays ISP and I—OSP, under a manual cancellation operation from flowing to the master buses 510 and 511 for opposite directions of wipe-out. The other relationships and operations of the system as modified by this Fig. 15 are to be considered the same as previously described.

*Special wipe-out for landing flights.*—A special wipe-out of a posting is required when a flight passes from a radio fix to an airport and lands. In such a case, it is assumed that the over-time will be posted in the fix panel in question as reported for the radio fix, and the posting for the fix in the rear will be wiped out in the usual way following the over-time report made by the pilot when he passes the radio fix in question. Later, when the flight is reported as having landed, or as having been taken over by an approach control operator associated with the airport, the over-time operator, after having set up the flight number and fix identification, operates the landing key LDK to pick up relay LDR, and then actuates the over-time posting button OTB (see Fig. 3C) to energize the over-time relay OTH. Although the report of the landing plane may be in any desired form, it will probably take the form of the usual over-time report giving the flight number, fix identification, time and altitude which in this case is the ground level. The fix identification in such a landing flight report will probably be the designation of the airport where the plane is landing, but the operator knowing the radio fix adjacent such airport sets the dial OFS to select the proper panel for such adjacent radio fix. Since there is no over-time or altitude to be posted, the over-time operator may leave the dials O—ALT, OT—1 and OT—2 in their normal blank position, but this is not necessary in order to obtain the proper operation of the system since the setting of the over-time altitude dials in accordance with the report received over the telephone, by radio, or by Teletype line facilities will not in any way affect the operation of the system.

Let us assume that the flight reported as landed, had its schedule time and over-time report posted in the first space of a panel A, and that the operator sets the dials and operates the key LDK and button OTB, as above explained. The picking up of relay OTR closes front contact 455 and energizes the relay A—OT because the operator has set the fix selector dial OFS in the position for fix A. Also, the closure of front contacts 456 and of relay OTR completes a circuit from (+), through back contacts 517, 518 and 519 to the flight number dials OFN—1 and OFN—2 to apply (—) to the master flight number buses. This causes the flight verification relay FV for the proper space to be picked up as previously explained for a regular over-time posting operation. In the case assumed where the flight number in question is posted in the first space of panel A, the flight verification relay IFV is picked up.

No altitude correspondence is required for the wipe-out of the schedule for this flight, so that as soon as the relay A—OT is picked up, energy is immediately applied to the wipe-out bus 503 which effects the picking up of the relays I—SP and I—OSP. More specifically, the wipe-out bus 503 receives energy from (+), through front contact 486 of relay LDR, back contact 520 of relay HO, back contact 521 of relay OTP, and front contact 522 of relay A—OT, to the bus 503 to effect the pick up of relays ISP and I—OSP in the usual way. The relay I—OSP in picking up energizes the relay OTP in the regular way which cuts off energy from the wipe-out bus 503 at back contact 521 and also opens the circuit applying energy to the flight number buses at back contact 517 so that all indicator buses are deenergized and the indicators can operate to their blank positions. The picking up of the relay OTP also picks up the relay HO, and thus the wipe-out circuit is further opened and the relay HO is maintained picked up by the picked up condition of the relay OTP and because of energy applied to its stick circuit by the fix relay, such as by contact 431 of relay AP, as previously described.

All the indicators of the space begin operation towards their blank positions in which they are stopped by energization of their correspondence relays in the usual way. However, it should be noted that front contact 461 of relay LDR supplies energy (—) to bus 492 for the blank positions of the over-time indicators of this space since the back contact 494 of relay OTR is opened under these operating conditions. The schedule indicators receive energy (—) for their blank positions through back contact 286 of the relay PSTR in the regular way.

When all of the indicators reach their blank positions and pick up their respective correspondence relays, the space relays ISP and I—OSP are shunted and drop away. This, of course releases relay OTP which in turn opens front contact 482 to release relay OTR and then relay HO when front contact 484 is opened. This marks the end of the landing flight wipe-out operation.

A timing relay NPR is controlled through back contact 484 of relay OTR so as to begin its release period when an over-time posting or landing flight wipe-out operation is initiated, but this timing relay is sufficiently slow in releasing so as to maintain its back contact 523 throughout the over-time postings and wipe-out operation if it is complete within a predetermined time. This predetermined time is arbitrarily chosen to be long enough for the usual posting or wipe-out operation, but if for some reason the posting or wipe-out operation is not completed within the predetermined time due to the lack of altitude correspondence, failure, or the like, then this relay NPR is released closing back contact 523 which completes energizing circuits for visual and audible alarms as will be apparent from the illustration of Fig. 3C.

*Automatic over-time posting.*—It is contemplated that over-times may well be reported by radio from the plane to a ground station or airlines office, and then relayed as a Teletype message over line facilities to the central control office of the area; and in some cases it may be that most of the over-time reports for the area will be received at the central office in this manner. For this and various other reasons, it is proposed to provide means for automatically posting such over-time messages as are received over the Teletype lines without requiring an operator to act as an automaton to set dials in accordance with the message he reads from the tape made by the Teletype printer. In the event that some of the over-times are received directly by radio or telephone at the central office and have to be posted manually, it is assumed that the operator will create a Teletype message locally by the actuation of a suitable key board to act through the same Teletype instrumentalities as provided herein to automatically effect a posting operation.

With reference to Figs. 8A and 8B, it will be noted that the apparatus and circuit organization for this automatic over-time posting feature of the invention includes in general a Teletype receiver, automatic means for segregating the over-time messages from other messages, a tape perforator, a code distributor, a plurality of groups of code registering relays, and the control for governing the posting apparatus in accordance with the message set up in the registering relays the same as if a man had set dials and actuated an over-time button. In addition to this equipment just mentioned, it is also desirable to provide an over-time printer which makes a record of the over-time reports as perforated on the tape for the purpose of giving a permanent record as well as a means for providing readily readable information for an attendant in the event of some error which may cause the automatic posting operation to stall.

It is to be understood that, when the over-time messages are automatically posted as provided by this part of the invention, the automatic wipe-out in the rear of such posting is contemplated to operate the same as previously described in connection with the manual posting of over-time reports.

In the conventional stop-start Teletype system, the line circuit is normally energized and the normally at rest rotary receiver is set into operation upon the initial deenergization of the line which is indicated in Fig. 8A by the energization of the "start relay" through an obvious circuit including back contact 525 of relay LR and normally closed contacts 526. The code combination for each letter or figure includes the presence or absence of current in the line at each of five points in the revolution of the receiving arm which operates in synchronism with the transmitting arm, and these five code periods are followed by the energization of the line circuit and the stopping of the operation of the rotary receiver. During the rotation of the receiver arm between the fifth position and the normal position in which it is stopped, contacts 527 are momentarily closed for execution of the code combination just transmitted. The off-normal contacts 526 are included in the start relay circuit, as above mentioned, and are maintained open throughout the rotation of the receiving arm so that the closure of back contact 525 between the impulses will not affect the start relay. Also, contacts 528 are normally opened but are caused to close throughout the revolution of the receiving arm so as to maintain energized any of the decoding relays 1, 2, 3, 4 and 5 that may be picked up during a revolution until the receiving arm again reaches its normal position.

Thus, the reception of a conventional code combination results in the picking up of a combination of these decoding relays which are maintained energized until the receiver arm again reaches its normal position; and, while the arm is moving between the position 5 and the normal position, the execution contacts 527 energizes the circuit which has been selected by the particular code combination stored in the decoding relays 1, 2, 3, 4 and 5.

In accordance with the organization of the present invention, means is provided for automatically segregating the over-time messages from the other messages being transmitted over the Teletype line facilities, and this is accomplished by providing that the over-time message conforms to a particular pattern. With reference to Fig. 9, it is noted that the typical over-time message includes a figure shift code followed by an over-time symbol, such as an oblique (/); and these combinations of code elements at the beginning of each over-time message acts to cause the apparatus to segregate the over-time messages from all other messages. This apparatus includes a double wound relay SH of the mag-stick type; an over-time symbol relay OTSY; and a line feed code relay LFC. Referring to the typical over-time message of Fig. 9, it is noted that the message proper contains code elements for the different digits of flight number, fix identification, over-time and altitude information as well as suitable space codes to separate the letters and figures on the tape and on the overtime printer. At the end of the message a line feed code combination is used to pick up relay LFC to restore the over-time message symbol relay OTSY to its normal deenergized condition, as will be presently described.

More specifically, and with reference to Fig. 8A, the relay SH is of the double wound type having polar contacts which are positioned to the right upon the reception of the figure shift code and to the left upon the reception of the letters shift code, and these contacts remain in the positions to which they are last actuated. Assuming that an overtime-message is being received, the figure shift code combination stored on the receiver decoding relays 1, 2, 3, 4 and 5 will cause the relay SH to have its polar contact shifted to the right by reason of a circuit closed from (+), and including execution contacts 527, front contact 530 of relay 1, front contact 531 of relay 2, front contact 532 of relay 4, front contact 533 of relay 5, back contact 534 of relay 3, lower winding of relay SH, to (—). At the end of the received arm revolution, the receiver decoding relays are deenergized ready for another code combination.

The figure shift code is followed by an over-time symbol code combination, such as the code for an oblique (/), and the reception of this over-time symbol (/) is stored in the receiver decoding relays and causes energization of the relay OTSY by a circuit closed from (+), and including front contact 535 of relay 1, back contact 536 of relay 2, front contact 537 of relay 3, front contact 538 of relay 4, front contact 539 of relay 5, polar contact 540 of the shift relay SH in a right-hand position, winding of relay OTSY, to (—).

The picking up of this relay OTSY is continued by a stick circuit including a back contact 542 of the line feed code relay LFC and front contact 541 of relay OTSY. It is assumed that the relay OTSY is picked up immediately upon the picking up of the relay 5 while the receiver arm is in that position, so as to provide a circuit through front contact 543 of this relay OTSY, while the receiver arm is in the executing position to cause the over-time symbol code combination to be executed to the tape perforator in accordance with the picked up condition of the receiver decoding relays, which, of course, causes a combination of punched holes in the tape as shown in Fig. 9. In this way, each time the Teletype receiver receives a series of code combinations belonging to an over-time message, they are transferred to the tape perforator producing a message as shown in a typical way in Fig. 9.

It is noted that the last code combination of the over-time message is what may be termed an end-of-message code (preferably the code used for line feed on page printers and for a period on tape printers) and is used to energize the line feed relay LFC, which, when momentarily energized acts to release the over-time message symbol relay OTSY which in turn disconnects the perforator from the Teletype receiver until another over-time message is received.

In accordance with the present organization, an over-time message must conform to the arrangement of codes shown or the apparatus will stall and no automatic posting of an over-time will take place. However, it should be understood that although the apparatus is organized to require the over-time message to conform to a particular arrangement, that various changes in the arrangement of the message can properly be made within the scope of the present invention by merely making corresponding changes in the number of positions and connections to the code distributor.

It may be noted here that a tape perforator is used in this connection for the purpose of storing the over-time reports, since the system may not be ready for posting an over-time just at the instant that the Teletype message comes in, and also because the decoding and posting operation may perform at a slower rate and require a longer time interval between the successive messages than would otherwise be employed on the Teletype line circuit. In this same connection, the segregation of the over-time messages from other messages on the Teletype line circuit provides that the rate of over-time posting does not in any way interfere with the reception of the other types of messages over the line circuit, such as weather reports and the like, nor does the presence of such messages on the line interfere with the posting of the over-time messages.

Let us assume that an over-time message has been punched in the tape or is in the progress of being punched, and that a sufficient sag occurs in the tape to close a sag contact of the usual type; then this sag-contact completes a circuit for the over-time relay OTR¹ from (+), through a circuit including back contact 544 of relay HO, normally closed cancel contacts 545 (but capable of being manually opened), back contact 546 of relay CDR, back contact 547 of relay PSTR, back contact 548 of relay ER, tape sag contact 549, normal contacts 550 of the code distributor, windings of relay OTR¹, to (—). This circuit is, of course, closed only if the system is in condition for posting an over-time report. For example, a conflict detection and posting operation may be in progress with relay CDR picked up opening back contact 546; and if such is the case the relay OTR¹ cannot be picked up until such operation is completed. When the relay OTR¹ picks up, it closes front contact 551 completing a stick circuit shunting out the normal contacs 550 of the code distributor and the tape sag contacts 549 so that this relay OTR¹ (corresponding in function with the relay OTR of Fig. 3C) is picked up and stuck up until the over-time posting and wipe-out operation is completed or the apparatus is manually cleared out by the operation of the cancel contacts 545, as will be later explained.

Energization of the relay OTR¹ starts operation of the tape feed mechanism by a circuit which is closed from (+), through front contact 552 of relay OTR¹, normal contact 0 of arm 6 of the code distributor, contact 553 of the code distributor in a normal position, through the tape feed mechanism, to (—).

The energization of the tape feed mechanism causes the feeding device to operate, which is assumed to control the energization of a feeler magnet FM to lower and raise the contact feelers 561, 562, 563, 564 and 565 into and out of the holes in the tape, and then feed the tape to the next position while the contact feelers are raised. This mechanism thus operates in a step-by-step fashion at a suitable rate dependent upon the operating speed of the other devices involved.

In order to make a suitable printed record of the over-time report, a conventional Teletype printer is connected to the five feeler contacts, and distinctively responds to the different code elements represented by the rows of holes punched in the tape. The operation of this printer requires certain codes in the message for shifting from letters to figures, and vice versa, and the introduction of spaces for the printed record, although such codes are not introduced for the automatic over-time posting operations. It should also be understood that it is not necessary to have this over-time printer connected to these feeler contacts, but it may be a part of the perforator so as to make the printed record at the same time as the perforations are made. However, there is the advantage of having it connected to the feeler contacts in that such printer would then show the exact point in the message at which the apparatus became stalled if a failure occurred. It is also used to control by its decoding apparatus the over-time check relay OTC and the error relay ER, as will be described later.

When the first row of holes in the tape of the over-time message comes under the feelers, it of course comprises the combination for the special over-time symbol, and this code is delivered to the over-time printer and suitable decoding contacts (not shown) are closed to momentarily energize a relay OTC. The picking up of relay OTC completes a stick circuit from (+), through front contact 552 of relay OTR¹, contact arm 6 of the code distributor in its position 0, front contact 554 of relay OTC, tape feed contacts 555, front contact 556 of relay OTC, windings of relay OTC, to (—). This relay OTC also closes a circuit through the lower front contact 554 of this relay to energize the stepping magnet STM for the code distributor; and when the contact feelers are lifted for the next step and the tape feed contacts 555 open, the stick circuit for relay OTC is opened which deenergizes the stepping magnet STM causing the distributor to move its contact arms to the first active position 1. This code distributor has arms 1, 2, 3, 4 and 5 corresponding with the five elements of the code and these arms are connected directly to the feeler contacts 561, 562, 563, 564 and 565 respectively associated with the tape feeding mechanism. The closure of the feeler contacts in the combination for the over-time symbol (/) occurs while the code distributor is in position 0, so that no operation is effected by the supply of energy to the arms 1 to 5 at such time.

As soon as the code distributor moves out of the normal position 0 to position 1, this initiating circuit is opened by the contact arm 6 and the further energization of the stepping magnet STM is dependent upon the tape feed contacts 555 which are closed by the tape feed mechanism each time the contact feelers are lowered into the holes punched in the tape and is opened each time these contacts are raised so that the code distributor moves its contacts to new positions while the tape is in movement and the feeler contacts are raised. It should be noted that the code distributor actually moves only upon deenergization of its stepping magnet STM.

The dropping of the relay OTC closes back contact 556 which now completes a circuit for the tape feed device from (+), through a circuit including front contact 552 of relay OTR¹, contact arm 6 of the code distributor in position 1, back contact 556 of relay OTC, contact 553 of the code distributor in a right-hand position, through the tape feed mechanism, to (—). The contact 553 moves to the right-hand position as soon as the code distributor leaves its position 0 and is restored to its left-hand position only when the code distributor is restored to position 0. Thus, the tape feed mechanism continues its operation after the initial movement of the code distributor only if the relay OTC releases. When the contact feelers enter the next code combination punched in the tape (indicated for the distributor position 1 in the typical over-time message of Fig. 9), the registering relays 1, 2, 3, 4, and 5 for the first digit of flight number (see Fig. 8B) are caused to be picked up in accordance with that combination for the first digit of the flight number. For example, the feeler contacts 561, 562 and 565 are closed for the flight number 2 assumed for the first digit, while feeler contacts 563 and 564 are held open because of the absence of perforations in the tape. The feeler contact 561, for example, supplies energy (+) to arm 1 of the code distributor, which in position 1 energizes the registration relay 1 for the first digit of flight number (see Fig. 8B). In a similar way, the registration relays 2 and 5 of this group for the first digit of flight number are picked up so that the contacts of this group of registration relays will select the bus 2 for the flight number assumed. These relays being picked up in combination for this digit of the flight number are maintained picked up by stick circuits including front contact 557 of relay OTR¹. While this is occurring, a circuit is closed from (+), through front contact 552 of relay OTR¹, arm 6 of the code distributor in position 1, contact 555 on the tape feed mechanism, through the stepping magnet STM, to (—), but as soon as the tape feed mechanism operates to move the feeler contacts out of their released positions and open contacts 555, the stepping mechanism STM is deenergized and the code distributor operates to the position 2.

With the code distributor in the position 2, the registering relays 1, 2, 3, 4 and 5 (not shown but indicated by a dotted rectangle) for the second digit of flight number are respectively connected to the feeler contacts 561, 562, 563, 564 and 565 by the arms 1, 2, 3, 4 and 5 respectively of the code distributor, so that the lowering of certain feeler contacts into the corresponding holes of the tape selectively energizes the registering relays of the second digit of the flight number in accordance with the particular code combination. These registering relays for the second digit of flight number also have stick circuits including front contact 556 of relay OTR¹. At the same time, the tape feed contact 555 is closed and energizes the stepping magnet STM. After a time interval determined by the speed of operation of the tape feed mechanism, the feeler contacts are raised and the contact 555 opens deenergizing the stepping magnet STM and moving the code distributor contact arms to their next position 3.

This operation continues step by step until all of the essential code elements of the over-time message have been transferred to their respective sets of registering relays, it being noted that, for the space and shift code combination, the position contacts of the arms 1, 2, 3, 4 and 5 of the code distributor are blank or vacant, but that the position contacts for each of the essential code combinations, such as fix identification, time and altitude, are connected to their respective registering relay banks. This means that no connections are made to the arms 1 to 5 of the code distributor for its positions 3, 4, 6, 11 and 13. Also, it will be noted that only the unit minutes and tens of minutes of the overtime are assumed to be posted, although the over-time report includes the unit hours and tens of hours digits. Thus, the arms 1 to 5 of the code distributor also have their positions 7 and 8 vacant, but it is to be understood to be within the scope of the invention that the unit hours and tens of hours for an over-time may also be posted in which case suitable banks of registration relays would be controlled from these positions of the distributor in a manner that will be readily understood by analogy to the organization specifically shown.

The step-by-step operation of the tape feed mechanism, the code distributor, and the setting up of the respective code combinations on the registering relay banks continues until the altitude code combination has been stored and the tape feed mechanism opens the contacts 555 moving the code distributor to its position 13 at which time the line feed code combination comes under the feeler contacts. With the code distributor in this thirteenth position, the circuit for the tape feed mechanism is opened as well as the circuit for the stepping magnet STM so that both the tape feed mechanism and the code distributor mechanism stop at this thirteenth position. It might be noted here, that to get to this position, it may have been necessary for the tape feed mechanism to pull tape without perforated code combinations from the perforator device which is assumed to have a ratchet feed to allow for this operation which will occur in the event that a no following over-time message has been received.

As above mentioned, the picking up of the relay OTR¹ by the tape sag contacts 549 is the same as the manual operation of button OTB effecting the picking up of the corresponding relay OTR in Fig. 3C, while the positioning of the code registering relay banks is the same as the manual positioning of the respective dials by an over-time operator but these operations do not cause a posting of the over-time until on the twelfth step of the code distributor, when code registering relays for the altitude are properly picked up.

Referring to Fig. 8B, the contacts of the code registering relays for the first digit of flight number are connected to the master flight number buses for the first digit to replace the contacts of the flight number dial OFN—1 of Fig. 3C. This Fig. 8B shows all ten combinations which the registration relays may assume to select through their contacts any given one of the buses 0 to 9, although only buses 0 and 1 are shown in Figs. 3A, 3B and 3C. Also, the energy (+) supplied to these contacts is assumed to be properly selected as shown in Fig. 3C. Similarly, the contacts of each group of registration relays are used to replace the corresponding time, altitude and fix identification dials of Fig. 3C, and energy is assumed to be suitably selected as shown in such figure. In the case of the altitude registering group, two sets of contacts are required on the registration relays to replace the two sets of contacts on the altitude dial O—ALT.

When the registering relays for the altitude are set to energize a particular altitude bus, assuming that the altitude, fix and flight number as registered corresponds with the posted flight schedule, then the relay AV (Fig. 3C) is energized and the over-time registering relays is posted in the space in question and is followed by an automatic wipeout in the rear, in the same manner as in the case of manual control. During the automatic posting operation, relay OTP picks up and energizes relay HO in the regular way. Thus, front contact 558 is closed before back contact 544 opens (see Fig. 8A).

At the end of this posting operation, the release of the relay OTP with the relay HO picked up, breaks the stick circuit for the relay OTR¹ at front contact 558 and drops this relay OTR¹ to restore the stick relays of the registration relay banks to their normal condition as well as deenergizing the buses to permit a wipe-out operation to be effected. Also, the code distributor is advanced from its thirteenth holding position to the initial position 0 by an operating circuit for stepping magnet STM closed through its own back contact 570, a back contact 571 of relay OTR¹, and a contact 572 of the code distributor which is opened only when the code distributor is in its normal position 0. The relay OTR¹, however, cannot be picked up again until after the wipe-out operation is completed and the relay HO releases, as described in connection with the manual overtime and wipe-out operation, whereupon a similar automatic posting and wipe-out operation may again take place if another over-time message has been punched in the tape.

This proposed organization affords a desirable check upon the accuracy and integrity of the over-time messages because each over-time Teletype message must include the correct number of characters in the proper predetermined pattern or the automatic posting operation will not occur due to the lack of correspondence in flight number, fix identification, or altitude as the case may be. For example, if the operator in making up the over-time message should leave a code character out of the standard pattern, or a code character is lost in transmission, then the code character for the altitude comes in the wrong position of the code distributor and there is no energization of the altitude verification relay AV to initiate the automatic over-time posting operation. Similarly, if the message as received and punched should include an extraneous character for some reason, the code for the altitude would not occur on the position 12 of the code distributor and there would be no energization of relay AV. In other words, if an over-time message is mutilated, the posting operation fails, the alarm (see Fig. 3C) is sounded because the over-time operation does not occur within a limited time, and manual intervention is necessary to return the system to normal operation.

It is contemplated that, in the case of such a mutilated message, or in the case of a complete message which gives the wrong fix, flight number or altitude for proper posting, the attending operator upon hearing the alarm can examine the over-time message as it has been printed by the over-time printer and then ask for a repeat from the appropriate sending station. In some case, it may be possible for the operator to provide a corrected message himself for posting where the error is obvious from an examination of the flight progress board, or he may take such other action as may be expedient. However, before a subsequent or corrected message can be posted, the system must be cleared out, that is, restored to normal conditions. To do this, the operator opens the cancel contacts 545 to release relay OTR$^1$, whereupon the registering relay banks are deenergized and the code distributor is automatically restored to its initial position by reason of its own off-normal contact 572, and back contact 571 of relay OTR$^1$ supplying energy to back contact 570 and the windings of the stepping magnet STM of the code distributor. As soon as the normal position of the code distributor is reached, the contact 572 opens and the code distributor stops in that position in readiness for operation by the next message when the special over-time symbol marking the beginning of that message is brought under the feeler contacts by the tape feed mechanism.

A somewhat special operation is involved under the circumstances where an over-time message is short one or more code characters. For example, it may happen that the rows of punched holes for a second message may immediately follow the mutilated short message on the tape, so that, if the tape were operated for the full thirteen steps, part of the second message would be drawn under the feelers, thereby mutilating the second message although it presumably is correct.

To avoid this mutilation of a second message merely because the first message has been short a character, the operating circuit for the tape feed mechanism, once the distributor has been moved from its initial position, includes the back contact 557 of relay OTC; and if the first message is short and the over-time symbol marking the beginning of the second message occurs, the relay OTC is immediately energized by suitable circuits (not shown but controlled by the overtime printer) and stops the tape feed mechanism as well as the distributor even though it has not reached the thirteenth holding position. This leaves the feeler contacts in the holes representing the over-time symbol so that when the attendant manually releases the relay OTR$^1$, by opening cancel key contacts 545, the dropping of this relay OTR$^1$ restores the registering relay banks and the code distributor to its initial position. The tape feed mechanism and the distributor are then in readiness to be initiated by the then existing energization of the relay OTC, assuming that the relay OTR$^1$ is again picked up due to the tape sag contacts 549 when the cancel contacts 545 are restored. Thus, the tape feed mechanism and code distributor start operation in synchronism with the first row of holes in the tape constituting the second over-time message.

In this way, mutilated over-time Teletype messages are automatically detected and brought to the attention of an operator, and furthermore, the mutilation of one message will not prevent the proper decoding of subsequent messages even though these messages are transmitted in quick succession and are punched in the tape without any intervening blank paper.

Since the over-time messages transmitted by Teletype in the manner under consideration are likely to be made by actuation of a typewriter keyboard in the usual way, and are thus subject to error, it is proposed to provide means to enable mistakes made by a Teletype operator to be immediately corrected during the transmission of the message, and thereby facilitate the operation of automatic posting which would otherwise fail for each wrong message and require manual intervention at the receiving end. Assume that the operator typing out a Teletype over-time message at a remote point makes a mistake in one digit of flight number or time, and notices his mistake by reference to the printed tape, which is being made at the sending station in the usual way at the same time that the code is being transmitted. The sending operator then actuates the key for some special character arbitrarily selected as presenting a special error or correction code, as for example, the code combination for the character (?), and then repeats the entire over-time message including the special symbol (/) required for an over-time report.

The error code is punched in the tape in the regular way, and then is followed by a new series of punched holes representing the correct message. When the tape is fed through the feeler contacts of the retransmitter, the error code combination causes the momentary energization of an error relay ER in a suitable manner, indicated by the dash line as connected to and controlled by the over-time printer. In other words, this relay ER, as well as the relay OTC, may be suitably controlled by the decoding means of the over-time printer so as to be momentarily energized when the proper code combination comes under the feeler contacts, or separate decoding means may be employed if desired. The energization of this error relay ER drops the over-time relay OTR[1] to release all registering relay banks then picked up and thereby wiping out all of the previously stored message and stopping operation of the tape feed mechanism. At the same time, the release of the relay OTR[1] closes a circuit through its back contact 571, as previously pointed out, to restore the code distributor to its normal position in readiness for another message. As soon as this normal position is reached, the stick circuit for the relay ER is opened by off-normal contacts 573. In this way, all of the parts are restored to the initial condition ready to decode the corrected message upon energization of the relay OTR[1] Thus, it is possible for the sending operator at a remote point to correct the errors which he has made and thereby eliminate the necessity of manual intervention at the receiving end except for errors occurring in actual transmission.

It may be that a report of a landing flight will be transmitted over the Teletype facilities to the central office of the control area, the over-time of the flight at the last radio fix already having been posted, such report of a landing flight is arranged to automatically effect the wipe-out of the schedule and over-time posting for the fix panel where such flight last reported. Such a report will be in the usual form of the overtime report giving the flight number, the fix identification, the time and altitude of the flight, but in this case the altitude will be a special Teletype code reporting that the plane has landed which for convenience may be termed zero altitude. This code for the altitude is effective through the medium of the altitude registering relays to pick up the landing flight relay LDR[1] (see Fig. 8B), which relay then functions with the relay OTR[1] to initiate the wipe-out operation, as previously described in detail in connection with Figs. 3A, 3B and 3C, assuming of course that the registering relay banks of Figs. 8A and 8B are taking the place of the setting dials of Fig. 3C. Also, the fix identification in such a landing report would be the code designation of the landing field adjacent the radio fix where the plane left the airways, and this code controls the fix registering relays to select the fix panel corresponding to said adjacent radio fix. This not only gives proper wipe-out control of the panels but also provides that a record is made of the destination and time of arrival of the flight on the Teletype printer.

It should be noted that relays OTR[1] and LDR[1] of Figs. 8A and 8B have the same functions to perform with respect to the Figs. 3A, 3B and 3C as described in connection with those relays of Fig. 3C having the same letter reference characters without the distinctive exponents. But since the pick-up controls of these relays are quite distinctive from the prior figures, the reference characters have been given distinctive exponents for clarity in the description.

*Different layouts.*—That portion of the disclosure thus far discussed, assumes a simple arrangement of fixes in a single route, so that there is at most only one adjacent fix on any side of a given fix to or from which any flight may go. However, it will be readily appreciated that the layout of airways in practice may include various routes converging or diverging in various ways; and certain adaptations in the control circuits are required. Generally speaking, various arrangements of layouts include different airways which converge and diverge with respect to a common fix; and Fig. 10 illustrates the adaptation of the control circuits for a typical arrangement of converging and diverging routes.

Figure 10:
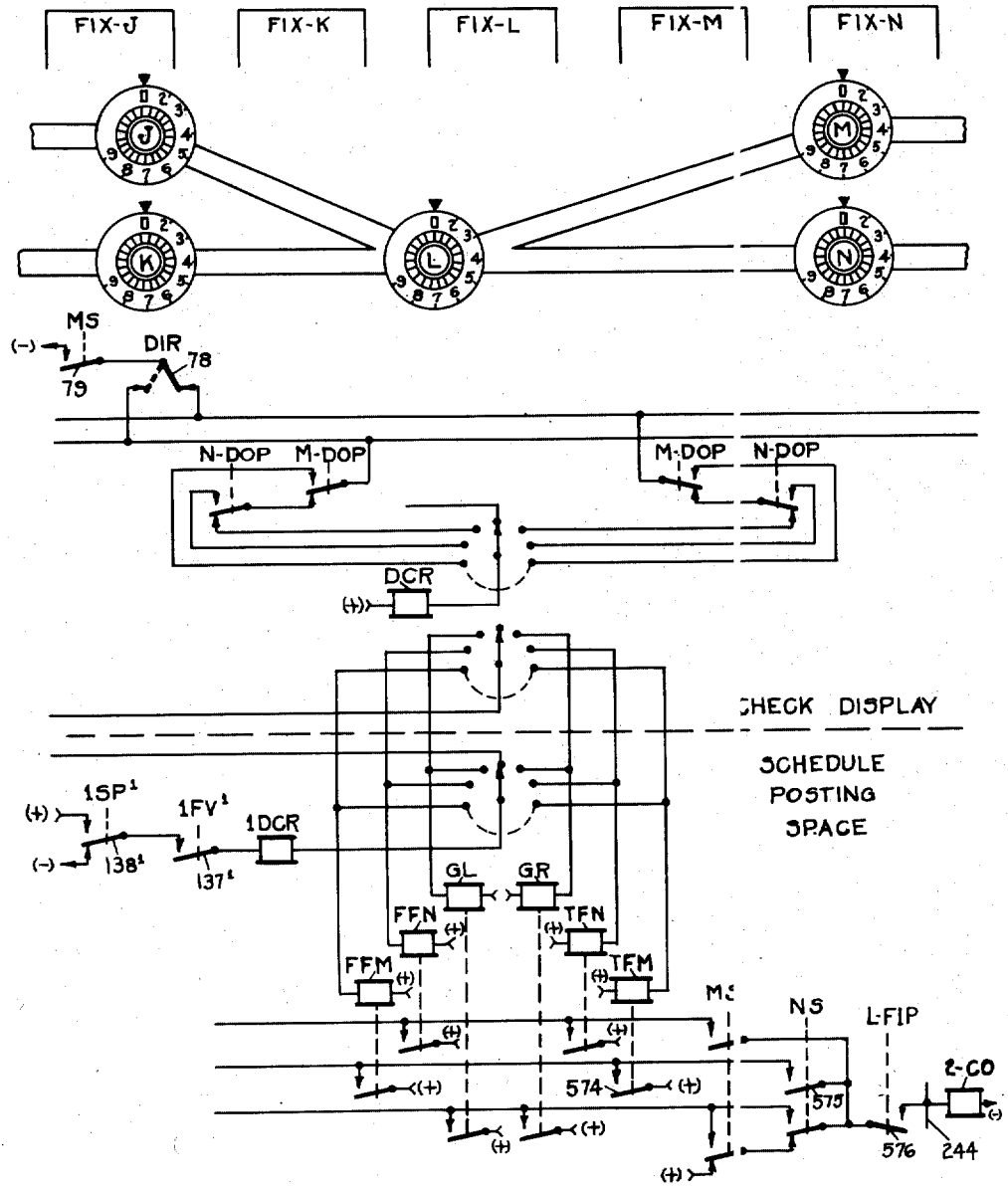
Fig. 10 illustrates the arrangement of panels and the necessary modification of the circuits for the control of the direction indicators when the airways for a control area or sector involves converging and/or diverging routes.

With reference to Fig. 10, a common fix L may have routes converging and diverging with respect to fixes J, K, M and N as shown on a typical control panel layout. The various circuits for performing the functions previously described with respect to panel A are assumed to apply directly to the panels for fixes J, K, M and N, but in the case of the common fix L it is necessary that the circuits for the direction indicators be slightly modified in order to obtain the proper control during the conflict detecting operation. Accordingly, the direction indicators for the common fix panel L have three different positions for each direction of flight so as to identify whether a flight for a plane travelling to the right is to be grounded at fix L, or proceed to fix M; but for a flight to the left to indicate whether a flight is to originate at fix L, or whether it has come from the fix N or the fix M. To accomplish this, the relays GR, TFN, TFM, GL, FFN and FFM have been employed thus providing two additional relays one for each direction of flight for the diverging routes in the predetermined direction of scanning during conflict detection operation.

These different positions for the direction indicators of the common fix L are determined for the check display unit of this fix in accordance with the route and direction of each proposed flight prior to its posting by the condition of relays M—DOP and N—DOP associated with the fix panels (not shown in detail) in a manner readily understood from the illustration of the circuits shown in Fig. 10 and by analogy to the circuits shown in Figs. 3A, 3B and 3C. From Fig. 10 it will be seen that the contacts of these relays M—DOP and N—DOP receive their energy selectively in accordance with the direction of the proposed flight schedule as determined by contact 78 of the direction key DRK and including front contact 79 of the master relay MS, in a manner previously described. The other details of the means provided for positioning the direction indicator of the check display unit have not been shown, it being understood that it is initiated into operation the same as the direction indicators previously described, and is stopped when the correspondence relay DCR is energized. The posting operation for transferring the positions set in the check display to the proper space of the panel is accomplished in a manner similar to that previously described in connection with Figs. 3A, 3B and 3C, each direction indicator having its correspondence relay DCR controlled by its associated flight verification relay and space relay by contacts, such as contacts 137[1] and 138[1] of relays FV[1] and SP[1]. The same reference characters have been given to these contacts and relays with distinguishing exponents as used in Figs. 3A, 3B and 3C, so that the corresponding parts may be readily identified in the other figures of the disclosure.

It will also be noted that this Fig. 10 is merely an extension of the principles disclosed in the prior discussed drawings, but this figure has been included so as to clearly illustrate that the principles of the present invention are applicable to any type layout in the airways and to the various operating conditions which may be encountered in actual practice.

Thus, a rather complex organization has been shown and described for facilitating the scheduling and control of flights over the airways of a control area, and in so doing provides means for checking against a possible conflict between a proposed flight and those flights which have been previously scheduled. This organization has been created to include the closed circuit principle throughout so as to obviate any possibility of failure of apparatus to cause a dangerous and unsafe condition. In order to facilitate the disclosure of this rather complex organization, various component parts and features have been segregated into groups of drawings for easy discussion of the features relating to such component parts; but it is to be understood that the system of airway traffic control proposed in accordance with the present invention contemplates the composite use of all the features disclosed herein. On the other hand, the features and component parts of the invention may be used in various combinations, and certain features may be omitted without detracting from the utility of the various other portions of the system.

Having thus described one form of an airway traffic control system and certain auxiliary subcombinations thereof as one specific embodiment of the present invention, it is to be understood that various modifications, adaptations, and alterations may be applied to meet the requirements of practice without in any manner departing from the spirit or scope of the invention except as limited by the appended claims.

What we claim is:

1. In an airway traffic control system, a plurality of fix panels each including a plurality of rows of changeable indicators for registering the data for different scheduled flights, a check display unit associated with each fix panel and having a single row of changeable indicators for registering the data relating to that fix for a given proposed flight, a control panel having a plurality of manually operable fix identifying buttons one for each fix, means including said manually operable fix identifying buttons for setting up the data for a given proposed flight in the appropriate check display units for the fixes included in the route of such flight, and posting means for directly transferring the data for such proposed flight from such check display units to their respective fix panels and into a particular row of indicators automatically selected by said posting means.

2. In a traffic control system for airways, a fix posting panel for each fix of an airways layout including a plurality of rows of changeable indicators for registering flight data for different flights scheduled over such airways, a check display unit associated with each fix posting panel and having a single row of changeable indicators for registering the data for a given proposed flight, a control panel having a plurality of manually operable fix identifying buttons one for each fix located in accordance with the geographic location of said fixes in the airways layout, manually operable means associated with each fix identifying button for designating the proposed altitude of the proposed flight at the corresponding fix, means governed by said fix identifying buttons and said manually operable altitude designating means for registering the data for a given proposed flight in the appropriate check display units for the fixes involved in the route of that flight, and circuit means operable after comparison of the data for the proposed flight registered in such check display units with the data for previous flight schedules posted in the corresponding fix posting panels for automatically transferring the flight data for such proposed flight from such check display units into their corresponding fix posting panels, said circuit means including means for automatically selecting a vacant space in said fix posting panels and operating the indicators therein to positions corresponding with the positions of the indicators in its associated check display unit.

3. A flight progress board for airway traffic control systems comprising a plurality of fix panels each having a number of horizontal rows of changeable indicators operable to different indicating positions to display flight data for scheduled flights, a check display unit for each fix panel having a single row of changeable indicators corresponding to the number in any of said horizontal rows, means for positioning said indicators in said check display units in accordance with the data for a proposed flight schedule, each of said indicators in said check display units being arranged in the same vertical column with corresponding indicators in the corresponding panel, thereby facilitating a visual comparison of the flight data for a proposed flight with the data for previously scheduled flights, and circuit means associated with each check display unit and governed by the positions of its changeable indicators for positioning the corresponding indicators in an automatically selected vacant horizontal row of the corresponding fix panel.

4. In a system of traffic control for airways, a plurality of fix panels each having a number of rows of changeable indicators operable to display data for a flight schedule, a check display unit for each fix panel having a number of changeable indicators corresponding to the number in any of said rows, control means governing the position of the indicators in said check display units to conform with a desired proposed flight schedule, and means for operating the indicators of a row automatically selected in each of the fix panels involved in such proposed flight schedule to conform with the indicating position of the indicators of said check display units.

5. In a traffic control system for airways, a flight progress board comprising a plurality of fix panels each having a number of rows of changeable indicators for displaying flight data for different schedule flights, a check display unit located adjacent each fix panel and having a single row of changeable indicators operable to different indicating positions in accordance with a time and altitude for the corresponding fix, setting means for designating an estimated arrival time and a proposed altitude for each of the particular fixes involved in any given route for a proposed flight, separate control means for each of said check display units for controlling the operation of the indicators thereof, selecting means including fix designating devices for selectively operating the particular control means for the check display units of the fixes involved in the proposed route to cause the indicators of these check display units to be operated in accordance with the proposed times and altitudes designated by said setting means, and circuit means associated with each fix panel for causing automatic operation of the changeable indicators in a vacant row of that fix panel to positions corresponding with the existing positions of the corresponding indicators of the associated check display unit, said circuit means acting to select such vacant row of indicators automatically.

6. In a flight progress board for airway traffic control systems; a fix panel having a plurality of rows of changeable indicators for displaying numbers for flights identification, estimated arrival time, and scheduled altitude, each of said indicators having a blank position and a plurality of indicating positions; a check display unit having changeable indicators displayed vertically above like indicators in said fix panel; control means associated with each row of indicators in said fix panel for initiating movement of all the indicators of that row from normal blank positions; space selecting means for rendering active the control means of any desired row; corresponding means associated with each of the indicators of such fix panel for separately stopping the movement of that indicator only when a circuit is closed and energized by reason of that indicator moving into a position corresponding with the position of the corresponding indicator of said check display unit; and means governed by said correspondence means associated with the indicators of any selected row for causing said control means for that row to be rendered inactive following the operation of all of said indicators of such row into correspondence with their respective indicators of said check display unit and thereafter rendering said correspondence means for that row also inactive.

7. In an airway schedule posting system, a fix panel comprising a plurality of registration spaces and a single check display space, each space having a plurality of changeable indicators for displaying different elements of flight data, a set of control busses for the check display indicators relating to each element of flight data, means for energizing a selected bus in each set of buses in accordance with the flight data to be displayed, initiating means for initiating operation of all of the indicators of said check display space and causing them to be operated to positions corresponding to the particular buses then energized in their respective sets of buses, said means maintaining the indicators in those positions until said buses are deenergized, means for causing the flight data to be transferred from said check display space to a vacant registration space in the fix panel when the flight data in said check display space has been approved, said means then acting to deenergize said buses, means associated with each indicator of said check display space for stopping that indicator in a blank position when said buses are all deenergized, and means for restoring to normal said initiating means only when all of the indicators of said check display space have been operated to their blank positions.

8. In an airway schedule posting system, a posting panel having a number of registration spaces and also having a check display space of indicators in which data for a proposed flight must be displayed and approved before it is posted in a registration space of said panel, a plurality of movable dials capable of being set in positions representative of the different elements of the data for the newly proposed flight schedule, a set of control buses for the indicators relating to each element of the flight data, means including said dials for energizing a selected bus in each set of buses in accordance with the flight data to be displayed, means for initiating operation of all of the indicators for said check display space, means associated with each indicator for stopping operation of that indicator in a position corresponding to the particular bus then energized in its associated set of buses, said means maintaining such indicator in that position until said particular bus is deenergized, means associated with each indicator for stopping that indicator in a blank position when said buses are all deenergized, and means for restoring to normal said initiating means only when all of the indicators of said check display space have been operated to their blank position.

9. In an airways traffic control system, a flight progress board including a plurality of fix panels each comprising a number of horizontal rows of changeable indicators operable to different indicating positions to display data for a flight schedule, a set of buses for each panel common to the corresponding indicators in all rows in that panel, each set of buses having a bus for each position of the associated indicators, control means for each panel for selectively energizing buses of different sets in accordance with the desired position of corresponding indicators in said rows, means for simultaneously initiating operation of all of the indicators in an automatically selected row in each of said panels, other means associated with the indicators of the panels for individually stopping operation of each of the indicators in such selected row only if a circuit is closed and energized by movement of that indicator into a position corresponding with the associated control bus then energized, and a circuit for each row of indicators closed only if the operation of all of the indicators in that row has been stopped by said other means.

10. In an airway schedule posting system, a panel having a plurality of rows of changeable indicators, each being operable to a plurality of different positions, and each having a set of contacts including contacts for each different position of its indicator, driving means for each indicator acting when initiated to operate that indicator and its set of contacts to their different positions, posting relay means associated with each row of changeable indicators for initiating simultaneous operation of the driving means for all of the indicators belonging to that row, a plurality of sets of buses, one set for each of the different indicators of said rows, said sets of buses being common to such corresponding indicators in all rows, each set of buses having a bus for each position of the associated indicator, circuit means for connecting the contacts of each indicator to the bus wires of its set, the contact for each position of that indicator being connected to a different bus whereby the contacts for corresponding positions of the corresponding indicators in the different rows are all connected to the same bus of the associated set, control means associated with each indicator for stopping operation of the driving means of that indicator at any selected position when such control means is energized by energy received over its contacts for that position from the corresponding one of said bus wires, and means for at times concurrently energizing bus wires of the different sets and the posting relay means for a selected row, the thereby selectively position simultaneously the changeable indicators of that selected row.

11. In a schedule posting arrangement for airways traffic control systems, a fly panel having a number of rows of changeable indicators each operable to a blank position or to different active indicating positions, sets of control buses for the indicators in said rows, means for selectively energizing one of the buses of each set for posting the desired flight data or restoring the indicator to the blank position, operating means for driving each indicator, space selecting means associated with each row for initiating operation of the operating means for all of the indicators in the selected row, control means associated with each indicator for rendering its operating means individually ineffective when that indicator has been moved to the position corresponding with the particular bus of the associated set of control buses then energized, and means selectively permitting the energization of said buses either for posting flight data or for restoring said indicators to their blank positions but not both at the same time.

12. In an airway schedule posting system, a panel having a plurality of rows of indicators each being operable to a number of different indicating positions, a set of contacts associated with each of said indicators and provided with contacts for each position of its indicator, driving means for operating each indicator and its associated set of contacts continuously in one direction through their different positions when such driving means is initiated, initiating means for at times initiating simultaneously operation of the driving means for all of the indicators of any selected row, control means associated with each indicator for stopping operation of its driving means at any selected position when such control means is energized through its associated set of contacts for the corresponding position, and means governed by said control means when all of the indicators of the selected row have assumed selected positions for rendering said initiating means inactive.

13. In an airway schedule posting system, a fix panel comprising a number of registration spaces, each having a plurality of changeable indicators capable of being set to positions for displaying the different elements of flight data for a scheduled flight, a single check display space having a plurality of changeable indicators capable of being set to positions for displaying the different elements of flight data for a proposed flight, posting means acting when initiated to automatically cause the indicators of the next vacant space of said panel with respect to one end to be set to positions corresponding to the positions of the indicators for corresponding elements of data displayed by said check display space, and means for initiating operation of said posting means when the proposed flight data has been approved as a proper schedule.

14. In a schedule posting arrangement for airways traffic control systems, a fix panel having a number of registration spaces, each including a plurality of changeable indicators operable to a blank position or different indicating positions, a set of control buses for each group of like indicators in said rows, means including a space relay for each registration space for initiating operation of all of the indicators for the corresponding space and for stopping each indicator in the position corresponding with the bus of the associated set then energized, empty-full contact means for each space operated by movement of the indicators in that space from the blank positions, and circuit means governed by said empty-full contacts for energizing that one of said space relays belonging to the first vacant space in the panel with respect to one end.

15. A fix panel for posting flight data for airways traffic control systems comprising, a plurality of registration spaces each including a number of indicators for posting the desired flight data, a set of control buses associated with each group of the like indicators in said registration spaces, a space relay for each registration space, operating means including said space relay for initiating operation of all of the indicators in a selected space to positions corresponding with the control buses then energized, empty-full contact means for each space operated when the corresponding indicators have been moved from the blank position, space selecting means normally acting to energize that one of said space relays belonging to the first empty space with respect to one end, and means for rendering said space selecting means inactive and energizing the space relay for that registration space having posted therein a flight identification number corresponding with the flight identification buses then energized.

16. In an airway schedule posting system for a flight progress board, a fix panel comprising a number of registration spaces, each having a plurality of changeable indicators for posting different elements of the data for a flight schedule including identification of the flight, a check display unit having a plurality of changeable indicators for registering different elements of the data for a proposed flight schedule including identification of the flight, posting means for causing the indicators of a selected registration space in said panel to be operated to positions corresponding to the positions of the indicators in said check display unit, and means for selecting for such posting operation any registration space regardless of its relative order in the spaces of said fixed panel then having a flight identification corresponding to the flight identification then registered in the check display unit, but acting to select the next vacant registration space in the absence of such a flight identity.

17. In an airway traffic control system, a flight progress board divided into a plurality of panels one for each fix and each fix panel comprising a plurality of rows of changeable indicators for displaying the different elements of a flight schedule, a single check display unit for each panel comprising a row of changeable indicators for displaying the different elements of a tentative flight schedule, scheduling means for specifying the characters of the different elements of a tentative flight schedule for each of the several fixes constituting the desired route, fix identifying means associated with each fix panel, means for selectively governing said fix identifying means to identify those fixes involved in a desired route and cause the indicators of the corresponding check display unit to assume positions for displaying the elements of the tentative flight schedule as specified by said scheduling means, and means for automatically causing the elements of the tentative flight schedule for each of the several fixes of the desired route to be transferred from its check display unit to a vacant row of indicators in its respective fix panel.

18. A flight progress board comprising a plurality of changeable indicators for posting flight data, each of said indicators being operable from a blank position to different active indicating positions, a set of control buses for each indicator including a blank position bus and a setting bus for each active indicating position, means for operating said indicator to the position corresponding with the particular control bus then energized, and means for alternately energizing either a selected one of the setting buses or said blank position bus.

19. A fix panel for posting flight data for an airways traffic control system comprising, a plurality of changeable indicators operable to a blank position and to different indicating positions for posting different flight data, a set of control buses for each of said indicators including a bus for the blank position and a bus for each active indicating position, means for initiating operation of all of said indicators and automatically stopping each indicator individually in the position corresponding with the particular bus of its set then energized, and means for energizing a selected one of the buses of each set for the active indicating positions of the indicators and at the same time rendering ineffective said control bus for the blank position of said indicators.

20. In an airway schedule posting system, a fix panel comprising a number of registration spaces, each having a plurality of changeable indicators for displaying different elements of flight data, a set of control buses for the indicators relating to each element of flight data, means for energizing a selected bus in each set of buses in accordance with the flight data to be posted, means for initiating operation of all the indicators for a selected registration space, correspondence relay means associated with each indicator for stopping that indicator in a position corresponding to the particular bus of its associated set of buses then energized, and means governed by said correspondence relay means of the indicators of the selected space for restoring the normal said initiating means only when all the indicators of that space have been operated to positions corresponding to the buses energized in their respective sets.

21. In an airway schedule posting system, a flight progress board divided into panels one for each fix and each having a plurality of rows of changeable indicators capable of displaying data identifying a flight and representing its scheduled time and altitude for the corresponding fix, a check display row of changeable indicators associated with each fix panel and capable of displaying data identifying a scheduled flight and representing the revised time and altitude allocated to such scheduled flight for the corresponding fix, circuit means associated with each panel for selectively locating the particular row of changeable indicators identifying the same flight as identified in its associated check display row of the changeable indicators, and posting circuit means associated with each panel for causing the time and altitude indicators of the selected row of that panel to be operated to positions corresponding to the positions of the time and altitutde indicators of the check display row of changeable indicators associated with the corresponding fix panel.

22. In an airway schedule posting system, a fix panel comprising a number of registration spaces, each having a plurality of changeable indicators for displaying different elements of the data for a flight schedule including identification of the flight, a set of control buses for the indicators relating to each element of the flight data, means for energizing a selected bus in each set of buses in accordance with the flight data to be posted and including the identification of the flight, posting means for causing the indicators of any selected registration space to be operated to positions corresponding to the particular buses then energized in their respective sets of buses, vacant space selecting means normally acting to select said posting means for the next vacant registration space for causing a posting operation, and means effective when the flight identification buses are energized to identify a flight already having data posted in some particular registration space of said panel to render said vacant space selecting means ineffective and automatically select said posting means for said particular space for causing a posting operation, said means acting regardless of the relative order of said particular space with respect to the vacant spaces in said panel.

23. In an airways traffic control system, a fix panel having a number of registration spaces each comprising changeable indicators for posting flight data including flight number identification, a set of control buses for each group of like indicators in the several registration spaces, a check display unit having a single registration space comprising changeable indicators for registering data for a proposed flight including an identifying flight number, posting means for operating the indicators in a selected space to positions corresponding with the buses then energized in accordance with the positions of the changeable indicators of said check display unit, vacant space selecting means normally acting to select for posting operation the next vacant space with respect to one end of the panel, same flight relay means automatically operating whenever any posting in said panel includes the same flight number then registered in said check display unit for rendering said vacant space selecting means ineffective, and means including a manually operable device for rendering said posting means effective with respect to a registration space having posted therein the same flight number that is registered in said check display unit.

24. In an airway schedule posting system, a flight progress board divided into panels one for each fix and each panel comprising a number of registration spaces including a plurality of changeable indicators for displaying different elements of scheduled flight data, a check display space for each fix panel including a plurality of changeable indicators for displaying the different elements of proposed flight data, posting means associated with each fix panel effective when rendered active to cause the indicators of the next vacant space of that panel to be operated to positions coresponding to the positions of the indicators of the associated check display space relating to corresponding elements of flight data, and means rendering the posting means active for the several fixes in a proposed route one fix at a time in a sequence.

25. A flight progress board for airways traffic control systems comprising a plurality of fix panels each having a number of registration spaces for posting flight data, each of said registration spaces having a plurality of changeable indicators, including indicators for the different digits of a flight identifying number, a set of buses for each group of like indicators in said different spaces for the several fix panels, manually operable means for selectively energizing the sets of buses for flight number to conform to the different digits of a given flight number, flight number verification means associated with each registration space of each panel and energized only if the position of all of the flight indicators in that registration space correspond with the flight number buses then energized, and means associated with each registration space and controlled by the flight number verification means associated with that space for distinctively identifying the spaces in the several panels containing a posting relating to the same flight number set up by said manually operable means.

26. In a traffic control system for airways, a plurality of fix panels each having a number of registration spaces for posting flight data, each of said registration spaces including flight identification number indicators and a space indicating lamp, a set of buses associated with each panel for each digit of flight number, means for interconnecting corresponding buses of said sets for the different panels, means for selectively energizing the sets of buses for flight identification to conform with the different digits of a given flight number, flight number verification means associated with each registration space and rendered effective only if the position of the indicators in that space for all digits of flight number correspond with the flight number buses then energized, and circuit means controlled by said flght number verification means for each space for governing the lighting of the associated space indicating lamp.

27. In an airways traffic control system, a plurality of fix panels each comprising a number of registration spaces, each having a plurality of changeable indicators for posting flight data including a flight identifying number, flight number buses for each panel, means for interconnecting corresponding buses of the different panels, flight number verification means associated with each registration space and energized only if the flight number indicators in that space are in position corresponding with the flight number buses then energized, manually operable means for selectively energizing said flight number buses in accordance with a desired flight identification, and means including a manually operable fix selector for restoring to the blank position all of the indicators in a registration space in the selected fix panel having its flight number verification means energized.

28. In an airway schedule posting system, a fix panel comprising a number of registration spaces, each having a plurality of indicators for displaying the different elements of flight data including the flight identifying number, a set of control buses for the indicators relating to each element of flight data, flight number verification means associated with each space and energized only when the indicators for flight number in that space are in positions corresponding with the buses relating to flight identifying number then energized, and manually controlled wipeout control means for restoring to the blank position all the indicators of a space having its flight number verification means energized.

29. In a traffic control system for airways, a fix panel having a number of registration spaces each comprising a plurality of changeable indicators for posting flight data including a flight identification number and overtime, a set of control buses for each group of like indicators in said different registration spaces, flight number verification means for each registration space energized only if the indicators in that space for all digits of flight number are in positions corresponding with the flight number buses then energized, said flight number verification means for any space being energizable upon the occurrence of said correspondence condition regardless of its location with respect to the vacant and filled spaces of said panel, overtime posting means for each registration space governed by the associated flight number verification means for operating the overtime indicators of that space to positions corresponding with the overtime buses then energized, and means for selectively energizing said buses for flight identification number and overtime in accordance with a reported plane identity and its overtime to be posted.

30. In an airway schedule posting system, a fix panel comprising a number of registration spaces, each having a plurality of changeable indicators for displaying different elements of flight data including a plurality of digits of flight identification and overtime reports, a set of control buses for the indicators appertaining to each element of flight data, each set of buses including a bus for each position of the corresponding indicator, means for energizing a selected bus in each set appertaining to flight identification to designate a given flight, overtime posting means associated with each space for initiating operation of the overtime indicators for that space only when the indicators in that particular space for the different digits of flight identification are all in the positions corresponding with the then energized buses of said flight identification sets of buses, means associated with each overtime indicator for stopping that indicator in a position corresponding to the particular bus then energized in its set of buses, and means for restoring to normal said overtime posting means only when all of the overtime indicators of the selected space have been operated to positions corresponding to the buses then energized in their respective sets.

31. In a traffic control system for airways, a fix panel having a number of registration spaces each comprising a plurality of changeable indicators for posting flight data including flight identification number, altitude and overtime; a set of buses for each group of the like indicators in said registration spaces; means for selectively energizing said sets of buses in accordance with the flight number, altitude and overtime reported; and means for automatically selecting the particular registration space in which the corresponding flight number is posted and for operating the overtime indicators for that space in accordance with the energization of the overtime buses only if the position of the altitude indicator for that space corresponds with the altitude buses then energized.

32. In an airways traffic control system, a plurality of fix panels each having a number of registration spaces, each space comprising a plurality of changeable indicators for posting flight data including a flight identification number, direction and overtime; sets of panel buses for each group of like indicators in the registration spaces of that panel, means for interconnecting the corresponding buses of the sets relating to flight identification number, a flight number verification means associated with each registration space in the several panels and energized only if the position of all of the flight number indicators for that particular space correspond with the flight number buses then energized, means for selectively energizing said sets of buses to correspond with the fix identification, flight number and overtime included in an overtime report; means responsive to the energization of a flight number verification means associated with a registration space in the panel for the designated fix for operating the overtime indicators in that space in accordance with the energized condition of the overtime buses, and means governed by the direction indicator for such space receiving an overtime posting and by the flight verification means for some posting in a fix panel in the rear of said designated fix panel for automatically wiping out the entire posting in that space in said panel in the rear.

33. In an airways traffic control system, fix panels having rows of indicators for posting data for scheduled flights including overtime, each of said rows including indicators for flight identification number, means for setting up the fix identification, flight number and overtime in accordance with an overtime report; means for automatically operating the overtime indicators in a space of the designated fix panel where the same flight number is posted, and means for automatically wiping out the entire posting relating to the same flight number in a fix panel in the rear only if an overtime has been posted in connection with such posting.

34. In a flight schedule posting system of the character described, a flight progress board including changeable indicators for posting the estimated arrival times and reported overtime at the various fixes for scheduled flights identified by different flight numbers, sets of buses for selectively governing the operation of said indicators, Teletype apparatus for receiving code messages of overtime reports including the designated fix, flight number and overtime; and means including a distributor and decoding relay groups for governing the energization of said sets of buses to conform with the successive code elements of the different overtime messages, and thereby cause automatic posting of the overtimes as reported.

35. In an airways traffic control system, a plurality of fix panels relating to the different fixes of an airway layout and each comprising a number of registration spaces, each of said spaces including a plurality of indicators for posting flight data including an identifying flight number and overtime, a set of panel control buses for each group of like indicators in the several spaces, flight number verification means for each registration space energized only if the flight number indicators in that space are in positions corresponding with the flight number buses then energized, overtime posting means for each registration space governed by the associated flight number verification means for operating the overtime indicators of that space to conform with the overtime buses then energized, Teletype apparatus for receiving code messages of overtime reports including a fix designation, flight number and overtime, and decoding means governed by said Teletype apparatus for automatically actuating the overtime posting means for the registration space in the particular panel for the designated fix in which the same flight number as reported is posted.

36. In an airways traffic control system, a plurality of fix panels each comprising a number of registration spaces having indicators for posting flight data including an identifying flight number and reported overtime, sets of buses for governing the operation of said indicators, Teletype apparatus for making a punched tape record of code messages for overtime reports including fix designation, flight number and reported time, and decoding means controlled by said punched tape for governing the energization of said buses to cause operation of the overtime indicators in the registration space of the designated fix panel having posted therein the same flight number.

37. In an airways traffic control system of the character described, a plurality of fix panels each having a number of registration spaces, each of said registration spaces comprising indicators for posting flight data including flight number and overtime, a set of buses for each group of like indicators in the several registration spaces in each panel, overtime posting means governed by said buses for operating the overtime indicators of a registration space in a designated fix panel only if the flight number posted therein corresponds with the flight number buses then energized, Teletype apparatus for receiving code messages of overtime reports including a fix designation, flight number and overtime, decoding means for such significant characters of said overtime messages for automatically governing the operation of said overtime posting means, the code elements for said significant characters being in a predetermined position in the sequence of the code elements in a normal message, a distributor governed by said Teletype apparatus for controlling said decoders in accordance with the successive code elements of the message as received, and indicating means operated automatically when an automatic overtime posting operation fails to occur within a limited time.

38. In an airways traffic control system, a fix panel comprising a number of registration spaces each having a plurality of indicators for posting flight data including flight identification number and overtime each of said indicators including position contacts selectively closed in its different indicating positions, a set of buses for each group of the like indicators in the several registration spaces of said panel, setting means for energizing said sets of buses in accordance with the flight number and time included in an overtime report, means for automatically posting an overtime in a registration space of said panel only if position contacts of the indicators for the flight number in that space are closed to conform with the energization of the flight number buses, and means for indicating when said automatic posting operation does not occur within a limited time after such operation is initiated.

39. In a flight scheduling system for airways traffic control, a fix panel comprising a number of rows of changeable indicators for registering flight data, a set of buses for each group of like indicators in the several rows, means for selectively energizing said buses in accordance with the flight data at said fix for a proposed flight schedule, posting means for operating the indicators of a selected space to correspond with the buses then energized, and means governed by the energization of said buses for making a printed record of the flight data for each posting operation.

40. In a flight scheduling system of the character described for airways traffic control, a flight progress board comprising changeable indicators for posting flight data, posting means for posting data of an approved flight schedule on said flight progress board, manually controlled wipeout means for wiping out a selected posting on said flight progress board, and means for making a printed record of the flight data for each operation of said posting means and said wipeout means, said means including in said record a distinctive symbol for each of said operations.

41. In an airways traffic control system, a plurality of fix panels each comprising a number of registration spaces having indicators for posting flight data, a check display unit for each panel having indicators for registering data for a proposed flight, a set of buses for each group of like indicators in the registration spaces for said panels, means for interconnecting corresponding buses of said sets for the different panels, means for selectively energizing the buses in said panels one panel at a time in accordance with the flight data registered in the corresponding check display unit and for automatically posting that data in a selected registration space in such panel, automatic coding means for forming the successive code elements of a Teletype code to conform with the energization of said sets of buses taken in a predetermined sequence, and a printer operated by said code, whereby a printed record may be made locally or at a remote point of the flight schedule in the check display units as this schedule is posted from the check display units into the fix panels.

42. In an airways traffic control system of the character described, the combination with fix panels and associated check display units and means for posting an approved flight schedule from said check display units into the corresponding fix panel, sets of control buses for said panels selectively energized one panel at a time in accordance with the data registered in the corresponding check display unit, means governed by the energization of said buses and including a scanning device for forming the code elements of a Teletype message, said message comprising a flight identification number and a scheduled time and altitude for each of the fixes involved in succession and in the order in which said fixes will be encountered by the flight, and a printer operated by said code elements.

43. In a schedule posting system of the character described for airways traffic control, the combination with registration units for a plurality of fixes each comprising changeable indicators to register the data for a flight schedule, sets of buses selectively energized in accordance with the indicating position of said indicators in said registration units one unit at a time, and coding means including a scanner device and governed by said sets of buses for forming the code elements of a Teletype message, said scanner device acting in certain positions to render said sets of buses effective to determine the character of the code elements and providing in other positions code elements of a fixed character for the shift between letters and figures and for the designation of spaces.

44. In an airway traffic control system for a control area having a complex geographic layout of fixes forming converging and diverging routes, a fix panel for each of the fixes for registering the data for scheduled flights, said panels being located side by side to form a flight progress board, one of the fix panels being used for the common fix in the diverging routes and being located between the panels relating to adjacent fixes on opposite sides of said common fix in such routes, a check display unit located adjacent each panel for registering the data for a proposed flight, whereby the proposed flight data for the respective fixes of any desired route is displayed in said check display units for said panels in an order corresponding to the order in which those fixes occur in that route and in close association with the data of the scheduled flights in said panels for such fixes, and circuit means operable for transferring the flight data for a proposed flight registered in any given check display unit to the corresponding fix panel when the proposed flight is approved as a properly scheduled flight.

45. In an airway traffic control system for a control area having a complex geographic layout of fixes forming converging and diverging routes, a fix panel for each of the fixes having indicators for registering the data for scheduled flights, said panels being located side by side and the fix panel for the fix common to the different routes being located such that flight data for any one of the different routes will appear in panels in the same order of corresponding fixes involved in that route, a check display unit for each panel having indicators for registering the data for a proposed flight, means for setting up the data for a proposed flight in the appropriate check display units including fix identifying push buttons located on a geographic layout of the routes at points corresponding to the location of the respective fixes, and means for transferring the data for a proposed flight from the check display units to the corresponding fix panels.

46. In an airway schedule posting system, a fix panel comprising a number of registration spaces, each having a plurality of changeable indicators for displaying different elements of flight data including flight identification and over-time reports, a set of control buses for the indicators appertaining to each different element of flight data, blank position control buses, means for energizing a selected bus in each set except those appertaining to the over-time indicators in accordance with the data of a scheduled flight, said means at the same time deenergizing said blank position buses, schedule posting means associated with each space for initiating operation of all of the indicators of that space except those appertaining to over-time, over-time posting means associated with each space for initiating operation of the over-time indicators for that space when the buses appertaining to flight identification and over-time are selectively energized to identify the flight having data already displayed in that space and to set the over-time indicators to display the reported over-time, said means at the same time deenergizing said blank position buses, means associated with each indicator for stopping that indicator in a position corresponding to the particular bus then energized when such indicator is set into operation, and means for rendering both said schedule and said over-time posting means for a selected space active to initiate their respective indicators into operation when all of said sets of buses are deenergized, said means at the same time energizing said blank position buses, whereby the over-time indicators of a space are operated separately to post over-time reports but are restored to blank positions at the same time with the other indicators of that space.

47. In an airway traffic control system, a plurality of fix panels each comprising a number of registration spaces having a plurality of changeable indicators for posting flight data including a flight identifying number, a set of buses for like indicators of each space and including flight number buses for each panel, means interconnecting the corresponding flight number buses of the different panels, a correspondence relay for each indicator energized when its indicator is in a position corresponding to the bus then energized in its associated set of buses, means for initiating operation of the indicators of a selected space of any selected panel to perform a posting operation, means for energizing a selected bus of each set in accordance with the position desired for the indicators of the space selected for that panel during a posting operation, means for stopping operation of each indicator individually during a posting operation when its correspondence relay is energized, flight number verification means associated each space of each panel and energized only if the correspondence relays for the flight number indicators of that space are energized, and means operable for selectively energizing the flight number buses in accordance with a desired flight number to thereby effect the energization of the flight verification means for the space in each panel in which that flight number is posted, whereby the correspondence relay associated with each flight number indicator is used both for positioning its indicator and for locating the flight number displayed by its associated indicators.

48. In an airway traffic control system, a plurality of fix panels one for each fix in a route and each having a number of rows of changeable indicators operable to different positions for displaying the data for scheduled flights, and means associated with each panel for controlling one indicator of each row, when data for a flight is posted therein, to a distinctive position dependent upon whether an adjacent fix is involved in the route for that flight.

49. In an airway traffic control system, a plurality of fix panels one for each fix in a route and each having a number of rows of changeable indicators operable to different positions for displaying the data for scheduled flights, each row of each fix panel including one direction indicator operable to different positions for the different directions of a flight and dependent upon whether an adjacent fix is included in a route passing through the corresponding fix, and means associated with each panel for controlling the direction indicator of any selected row of that panel to a particular position depending upon the direction of the flight for which data is being posted in such selected row and also depending upon whether a particular adjacent fix is included in its route.

50. In an airways traffic control system, a plurality of fix panels having rows of indicators for posting data for scheduled flights, each of said rows including indicators for flight identification numbers, scheduled time, altitude and over-time, means for selectively controlling the indicators of any row of any selected one of said panels for posting a flight number and its scheduled time and altitude, and means for automatically operating the over-time indicators in that row of a selected fix panel where the same flight number is posted as given in a landing flight report, said means acting automatically when such overtime has been initially posted for such landing flight to operate all of the indicators of that row to the blank positions.

51. In an airways traffic control system, a plurality of fix panels having rows of indicators for posting data for scheduled flights, each of said rows including indicators for flight identification, scheduled time, altitude and over-time, Teletype apparatus for making a punched tape record of code messages received over a line circuit, decoding means including groups of code registration stick relays for storing the codes of one message at a time taken from said tape, means controlled by an error code punched on said tape for causing said decoding means to be restored to normal in readiness for another message to be taken from said tape, and means governed by said decoding means for governing the indications of a selected row of a selected panel to post data received by said Teletype apparatus.

52. A system for posting flight schedules for aircraft, a flight progress board having a plurality of different fix panels each having a plurality of rows of electro-responsive indicators assignable at different times to different flights, each row of indicators having at least one indicator actuatable to different settings for displaying a flight identity and other indicators actuatable to different settings for displaying a plurality of different kinds of data relative to a flight, control means actuatable to different conditions to designate for a given fix the data of a given flight schedule including flight identity and other kinds of flight schedule data, circuit means governed by said control means in accordance with the designated flight identity for automatically finding and seizing a particular row of indicators in the corresponding fix panel having a flight identity setting in its indicator relating to flight identity corresponding to the flight identity then designated by said control means, said circuit means checking all existing postings for such agreement in flight identity irrespective of the number or location of vacant rows of indicators, circuit means controlled by said control means for actuating simultaneously the proper ones of the indicators of the seized row for displaying said different kinds of data with regard to the flight and also the flight identity when an idle row of indicators has been seized, and means for maintaining the seizure of any row of indicators until all of the indicators of that row have assumed positions corresponding to the respective different kinds of data designated by said control means.

53. A system for posting flight schedules for aircraft, a flight progress board having a plurality of different fix panels each having a plurality of rows of electro-responsive indicators assignable at different times to different flights, each row of indicators having at least one indicator actuatable to different settings for displaying a flight identity and other indicators actuatable to different settings for displaying a plurality of different kinds of data relative to a flight, control means actuatable to different conditions to designate the data of a flight schedule including flight identity, and other kinds of flight schedule data, circuit means governed by said control means in accordance with the designated flight identity for automatically finding and seizing a particular row of indicators in the corresponding fix panel having a flight identity setting in its indicators relating to flight identity corresponding to the flight identity then designated by said control means, said circuit means checking all existing postings for such agreement in flight identity and locating a posting having the same flight identity regardless of its location in the panel or its location with respect to other vacant rows of indicators, other means operative thereafter if said circuit means has not located a row of indicators having the same flight identity for automatically finding and seizing an available vacant row of indicators, and means controlled by said control means for actuating the proper ones of the indicators of the seized row for displaying said different kinds of data with regard to the flight and also the flight identity when an idle row of indicators has been seized.

54. A system for posting flight schedules for aircraft, a flight progress board having a plurality of different fix panels each having a plurality of rows of electro-responsive indicators assignable at different times to different flights, each row of indicators having at least one indicator actuatable to different settings for displaying a flight identity and other indicators actuatable to different settings for displaying a plurality of different kinds of data in regard to a flight including an overtime, means for selectively setting the flight identity displaying indicators of any selected row for any given fix to display a given flight identity, control means actuatable to different conditions to designate the data of a flight schedule including the identity of the flight, a given fix and the time at which the flight passed over such fix, circuit means governed by said control means for automatically finding and seizing the particular row of indicators of the designated fix panel in which the designated flight identity is already displayed, said circuit means acting independently of the presence or location of vacant rows of indicators, posting means controlled by said control means and effective only if such row of indicators with said same flight identity has been found for operating the overtime indicators of the seized row to positions to display the time designated by said control means, and alarm means governed by said circuit means for giving a distinctive indication in the event said circuit means fails to find the designated flight identity already displayed in the designated fix panel.

NEIL D. PRESTON.
FOREST B. HITCHCOCK.

REFERENCES CITED

The following references are of record in the file of this patent:

UNITED STATES PATENTS

| Number | Name | Date |
|---|---|---|
| 748,941 | Fessenden | Jan. 5, 1905 |
| 1,849,694 | Saunders | Mar. 5, 1932 |
| 1,935,910 | Levy | Nov. 21, 1922 |
| 2,155,825 | Haselton | Apr. 25, 1939 |
| 2,246,449 | Marshall | June 17, 1941 |
| 2,344,761 | Wight | Mar. 21, 1944 |
| 2,386,743 | May | Oct. 9, 1945 |
| 2,399,777 | Wight | May 7, 1946 |
| 2,474,438 | Schmidt | June 28, 1949 |